(12) United States Patent
Kobayashi et al.

(10) Patent No.: US 12,487,670 B2
(45) Date of Patent: Dec. 2, 2025

(54) INFORMATION PROCESSING DEVICE, INFORMATION PROCESSING METHOD, AND PROGRAM

(71) Applicant: FUJIFILM Corporation, Tokyo (JP)

(72) Inventors: Masaru Kobayashi, Saitama (JP); Shinya Fujiwara, Saitama (JP); Yukinori Nishiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/610,237

(22) Filed: Mar. 19, 2024

(65) Prior Publication Data

US 2024/0220014 A1 Jul. 4, 2024

Related U.S. Application Data

(63) Continuation of application No. PCT/JP2022/019584, filed on May 6, 2022.

(30) Foreign Application Priority Data

Sep. 30, 2021 (JP) ................................ 2021-161792

(51) Int. Cl.
*G06F 3/01* (2006.01)
*G06F 3/041* (2006.01)
(Continued)

(52) U.S. Cl.
CPC .............. *G06F 3/013* (2013.01); *G06F 3/041* (2013.01); *G06T 7/70* (2017.01); *G06T 7/90* (2017.01); *G06V 40/18* (2022.01)

(58) Field of Classification Search
CPC . G06F 3/013; G06F 3/041; G06F 3/01; G06F 3/0346; G06F 3/038; G06T 7/90; G06T 7/70; G06T 2207/20084; G06V 40/18; G06V 40/19; G06V 40/193; G03B 7/00; G03B 17/20; G03B 13/02
See application file for complete search history.

(56) References Cited

U.S. PATENT DOCUMENTS

| 7,248,300 B1 | 7/2007 | Ono |
| 2004/0170397 A1 | 9/2004 | Ono |

(Continued)

FOREIGN PATENT DOCUMENTS

| JP | H05333405 | 12/1993 |
| JP | H07104170 | 4/1995 |

(Continued)

OTHER PUBLICATIONS

"International Search Report (Form PCT/ISA/210) of PCT/JP2022/019584", mailed on Jul. 26, 2022, with English translation thereof, pp. 1-7.

(Continued)

*Primary Examiner* — Muhammad N Edun
(74) *Attorney, Agent, or Firm* — JCIPRNET

(57) ABSTRACT

An information processing device includes a processor, in which the processor acquires first image data and second image data, outputs any of the first image data or the second image data to a display, acquires gaze data in a period in which the second image data is output to the display, and detects a gaze position with respect to the display based on the gaze data.

20 Claims, 38 Drawing Sheets

(51) Int. Cl.
  *G06T 7/70* (2017.01)
  *G06T 7/90* (2017.01)
  *G06V 40/18* (2022.01)

(56) References Cited

U.S. PATENT DOCUMENTS

| | | | |
|---|---|---|---|
| 2014/0347282 | A1 | 11/2014 | Woo |
| 2019/0261027 | A1* | 8/2019 | Hawke ............. H04N 21/23424 |
| 2020/0394408 | A1* | 12/2020 | Sydorenko ........... G06V 30/142 |
| 2021/0052156 | A1 | 2/2021 | Mukai et al. |
| 2021/0081074 | A1 | 3/2021 | Sugihara et al. |
| 2021/0125375 | A1 | 4/2021 | Ehira |
| 2022/0035480 | A1 | 2/2022 | Sugihara et al. |
| 2022/0334636 | A1* | 10/2022 | Miettinen ............... G06F 3/013 |
| 2023/0217096 | A1 | 7/2023 | Sugihara et al. |

FOREIGN PATENT DOCUMENTS

| | | |
|---|---|---|
| JP | 2000347278 | 12/2000 |
| JP | 2005296382 | 10/2005 |
| JP | 2014094186 | 5/2014 |
| JP | 2019159982 | 9/2019 |
| JP | 2019161322 | 9/2019 |
| JP | 2021069008 | 4/2021 |
| WO | 2020003862 | 1/2020 |

OTHER PUBLICATIONS

"Written Opinion of the International Searching Authority (Form PCT/ISA/237) of PCT/JP2022/019584", mailed on Jul. 26, 2022, with English translation thereof, pp. 1-6.

"International Preliminary Report on Patentability (Form PCT/IPEA/409) of PCT/JP2022/019584", completed on Jun. 23, 2023, with English translation thereof, pp. 1-12.

"Written Opinion of the International Preliminary Examing Authority (Form PCT/IPEA/408) of PCT/JP2022/019584", mailed on Feb. 28, 2023, with English translation thereof, pp. 1-10.

* cited by examiner

INFORMATION PROCESSING DEVICE, INFORMATION PROCESSING METHOD, AND PROGRAM

This application is a continuation application of International Application No. PCT/JP2022/019584, filed May 6, 2022, the disclosure of which is incorporated herein by reference in its entirety. Further, this application claims priority under 35 USC 119 from Japanese Patent Application No. 2021-161792 filed Sep. 30, 2021, the disclosure of which is incorporated by reference herein.

BACKGROUND OF THE INVENTION

1. Field of the Invention

The present invention relates to an information processing device, an information processing method, and a program.

2. Description of the Related Art

JP2019-159982A discloses a gaze detection device including an imaging unit that images a face of a person, a projector that projects predetermined pattern light onto the face of the person, a controller that controls presence and absence of projection of the pattern light by the imaging unit and the projector, and a gaze detection processing unit that detects a visual line from an image of the face of the person imaged by the imaging unit.

JP1995-104170A (JP-H7-104170A) discloses a gaze detection device including at least first and second projecting units that project light to an eyeball of a photographer, a light receiving unit that receives reflected light of the light projected by the first and second projecting units from the eyeball of the photographer, a projection control unit that controls a light emission pattern and a light emission timing of the first and second projecting units so as to include different portions and a common portion in time series, and a feature extraction unit that processes a gaze signal received by the light receiving unit as a result of projection by the first and second projecting units based on the light emission pattern and the light emission timing controlled by the projection control unit and extracts a feature signal from the gaze signal.

JP2019-161322A discloses a photographing device that has an imaging room and images a subject in the imaging room, the photographing device including an imaging unit that images at least a face of the subject in the imaging room, a light source unit that irradiates the subject in the imaging room with light, a gaze sensor that detects a gaze of the subject in the imaging room, and a controller that controls the imaging unit, the light source unit, and the gaze sensor, in which the controller includes a gaze direction determiner that determines whether the gaze of the subject is in a predetermined direction based on a signal from the gaze sensor, and a still image acquirer that operates the imaging unit and the light source unit based on a signal from the gaze direction determiner and obtains a still image.

SUMMARY OF THE INVENTION

One embodiment of the technology of the present disclosure provides an information processing device, an information processing method, and a program capable of improving detection accuracy of a gaze position, for example, as compared to a case where the gaze position with respect to a display is detected based on gaze data acquired in a period in which first image data is output to the display.

A first aspect of the technology of the present disclosure provides an information processing device comprising: a processor, in which the processor acquires first image data and second image data, outputs any of the first image data or the second image data to a display, acquires gaze data in a period in which the second image data is output to the display, and detects a gaze position with respect to the display based on the gaze data.

A second aspect of the technology of the present disclosure provides the information processing device according to the first aspect, in which the processor selectively outputs the first image data and the second image data to the display.

An information processing device according to a third aspect of the technology of the present disclosure provides the information processing device according to the first or second aspect, further comprising: a first image sensor, in which the first image data is image data obtained by imaging performed by the first image sensor.

A fourth aspect according to the technology of the present disclosure provides the information processing device according to any one of the first to third aspects, in which the processor does not detect the gaze position in a period in which the first image data is output to the display.

A fifth aspect according to the technology of the present disclosure provides the information processing device according to any one of the first to fourth aspects, in which the second image data is first gaze detection image data for detecting the gaze position.

A sixth aspect according to the technology of the present disclosure provides the information processing device according to the fifth aspect, in which a gaze detection image indicated by the first gaze detection image data includes an achromatic region.

A seventh aspect according to the technology of the present disclosure provides the information processing device according to the sixth aspect, further comprising: a second image sensor, in which the gaze detection image includes an image region obtained by imaging performed by the second image sensor and the achromatic region, and the processor changes a position of the image region and a position of the achromatic region for each frame of the gaze detection image.

An eighth aspect according to the technology of the present disclosure provides the information processing device according to the seventh aspect, in which the processor sets the position of the image region based on the gaze position for each frame of the gaze detection image.

A ninth aspect according to the technology of the present disclosure provides the information processing device according to any one of the sixth to eighth aspects, in which the achromatic region is a black region or a gray region.

A tenth aspect according to the technology of the present disclosure provides the information processing device according to any one of the first to ninth aspects, further comprising: a light source that emits light to an eye that is a gaze detection target, in which the processor, when an object is absent at a position through which the light passes, outputs the second image data to the display in a state where the light is emitted from the light source, and outputs, when the object is present, the second gaze detection image data to the display in a state where the emission of the light from the light source is stopped.

An eleventh aspect according to the technology of the present disclosure provides the information processing device according to the tenth aspect, in which the second gaze detection image data is image data including a pattern for detecting the gaze position with respect to the display.

A twelfth aspect of the technology of the present disclosure provides the information processing device according to the tenth or eleventh aspect, in which the processor detects the gaze position based on a degree of difference between first gaze data as the gaze data acquired when the object is present and the eye is closed and second gaze data as the gaze data acquired when the object is present and the eye is open.

A thirteenth aspect according to the technology of the present disclosure provides the information processing device according to any one of the first to twelfth aspects, further comprising: a third image sensor, in which the processor detects a first gaze direction of a subject appearing in a first image indicated by the first image data, and acquires third image data obtained by imaging performed by the third image sensor based on a second gaze direction corresponding to the gaze position and the first gaze direction.

A fourteenth aspect according to the technology of the present disclosure provides the information processing device according to the thirteenth aspect, in which the processor acquires the third image data when the first gaze direction and the second gaze direction match each other.

A fifteenth aspect according to the technology of the present disclosure provides the information processing device according to any one of the first to fourteenth aspects, in which a first frame number that is a frame number of the first image data output to the display per unit time is larger than a second frame number that is a frame number of the second image data output to the display per unit time.

A sixteenth aspect according to the technology of the present disclosure provides the information processing device according to the fifteenth aspect, in which the processor sets a ratio of the first frame number and the second frame number per unit time in accordance with reliability related to a detection result of the gaze position.

A seventeenth aspect according to the technology of the present disclosure provides the information processing device according to any one of the first to sixteenth aspects, in which the processor sets luminance of a third image indicated by the second image data in accordance with luminance of a second image indicated by the first image data.

An eighteenth aspect according to the technology of the present disclosure provides the information processing device according to any one of the first to seventeenth aspects, further comprising: an acceleration sensor, in which the processor generates orientation information related to an orientation of the information processing device based on acceleration data of the acceleration sensor and the gaze position.

A nineteenth aspect according to the technology of the present disclosure provides the information processing device according to the eighteenth aspect, further comprising: a fourth image sensor, in which the processor adds the orientation information to fourth image data obtained by imaging performed by the fourth image sensor.

A twentieth aspect according to the technology of the present disclosure provides the information processing device according to any one of the first to nineteenth aspects, further comprising: a touch panel, in which the processor executes first determination processing of determining whether a left eye or a right eye is a gaze detection target based on the gaze data, and second determination processing of determining an orientation of the left eye or the right eye determined to be the gaze detection target in the first determination processing based on the gaze position, and sets a valid region and/or an invalid region of the touch panel based on a first determination result by the first determination processing and a second determination result by the second determination processing.

A twenty first aspect of the technology of the present disclosure provides the information processing device according to any one of the first to twentieth aspects, in which the processor detects a size of a pupil based on the gaze data, and adjusts brightness of the display based on a detection result of the size of the pupil.

A twenty second aspect according to the technology of the present disclosure provides the information processing device according to any one of the first to twenty first aspects, in which the information processing device is an imaging device.

A twenty third aspect according to the technology of the present disclosure provides an information processing device comprising: a processor, in which the processor determines whether a display is in a first state or a second state, acquires gaze data in a period in which the display is in the second state, and detects a gaze position with respect to the display based on the gaze data.

A twenty fourth aspect according to the technology of the present disclosure provides an information processing method comprising: acquiring first image data and second image data; outputting any of the first image data or the second image data to a display; acquiring gaze data in a period in which the second image data is output to the display; and detecting a gaze position with respect to the display based on the gaze data.

A twenty fifth aspect according to the technology of the present disclosure provides a program that causes a computer to execute processing comprising: acquiring first image data and second image data; outputting any of the first image data or the second image data to a display; acquiring gaze data in a period in which the second image data is output to the display; and detecting a gaze position with respect to the display based on the gaze data.

DESCRIPTION OF THE PREFERRED EMBODIMENTS

Hereinafter, an example of an embodiment of an image processing device, an image processing method, and a program according to the technology of the present disclosure will be described with reference to the accompanying drawings.

First, terms that are used in the following description will be described.

I/F is an abbreviation for "interface". CPU is an abbreviation for "central processing unit". NVM is an abbreviation for "non-volatile memory". RAM is an abbreviation for "random access memory". EEPROM Is an abbreviation for "electrically erasable and programmable read only memory". HDD is an abbreviation for "hard disk drive". CMOS is an abbreviation for "complementary metal oxide semiconductor". CCD is an abbreviation for "charge coupled device". SSD is an abbreviation for "solid state drive". EL is an abbreviation for "electro luminescence". LED is an abbreviation for "light emitting diode". OLED is an abbreviation for "organic light-emitting diode". Fps is an abbreviation for "frames per second". GPU refers to an abbreviation for "graphics processing unit". TPU is an abbreviation for "tensor processing unit". USB is an abbreviation for "universal serial bus". ASIC is an abbreviation for "application specific integrated circuit". FPGA is an abbreviation for "field-programmable gate array". PLD is an abbreviation for "programmable logic device". SoC is an abbreviation for "system-on-a-chip". IC is an abbreviation for "integrated circuit". AI is an abbreviation for "artificial intelligence".

In the description of the specification, the term "parallel" refers not only to completely parallel, but also to parallel in the sense of including an error that is generally allowed in the technical field to which the technology of the present disclosure belongs and that does not contradict the gist of the technology of the present disclosure. In the description of the specification, the term "match" refers to, in addition to a perfect match, a match in the sense of including an error that is generally allowed in the technical field to which the technology of the present disclosure belongs and that does not contradict the gist of the technology of the present disclosure.

First Embodiment

First, a first embodiment will be described.

Figure 1:
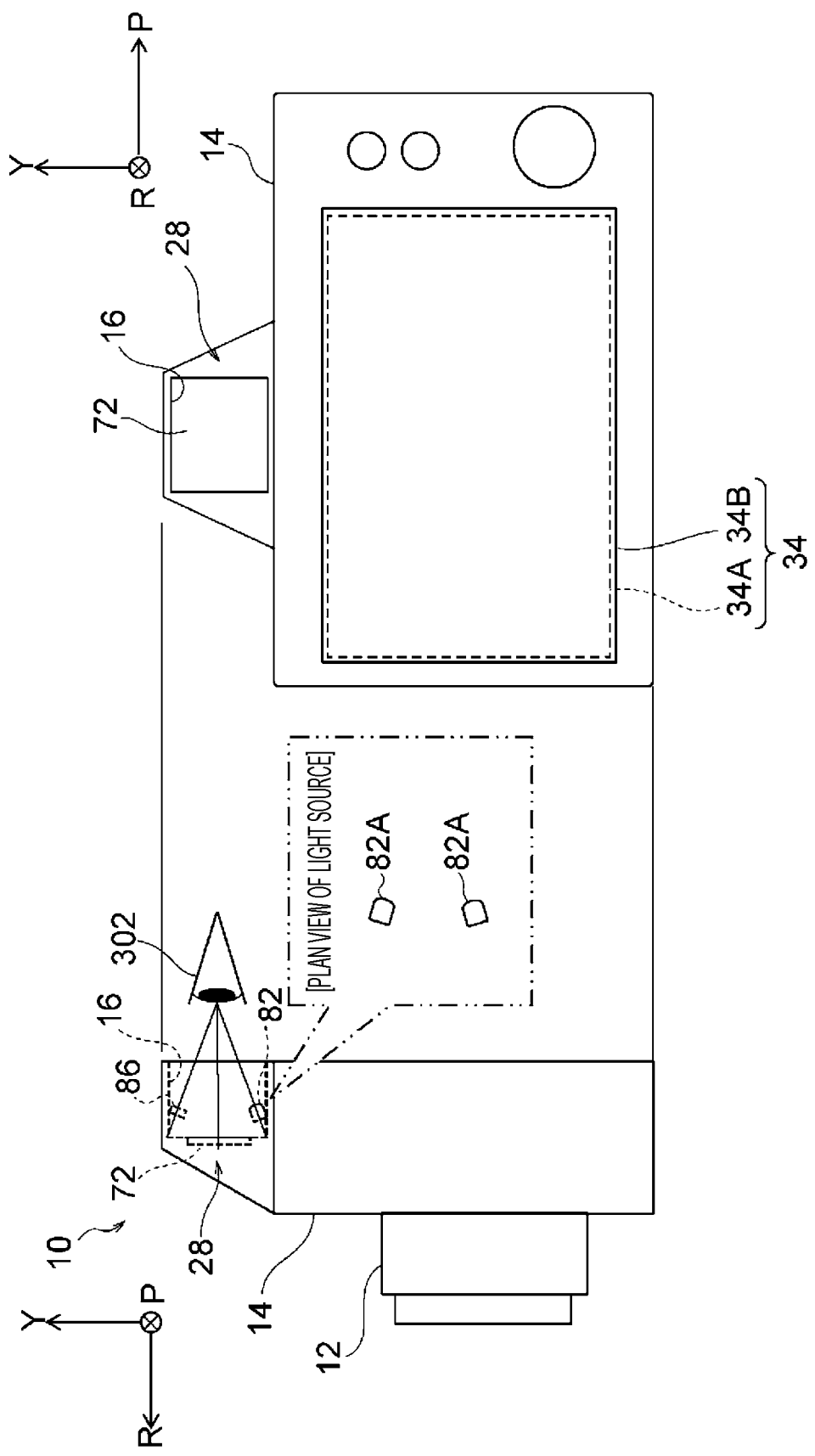
FIG. 1 includes two diagrams showing an example of a side surface and a rear surface of an imaging device.

As shown in FIG. 1 as an example, an imaging device 10 is a digital camera and includes a lens unit 12 and an imaging device body 14. The imaging device 10 is an example of an "information processing device" and an "imaging device" according to the technology of the present disclosure. A pitch axis, a yaw axis, and a roll axis are defined in the imaging device 10. In the example shown in FIG. 1, an axis P indicates the pitch axis of the imaging device 10, an axis Y indicates the yaw axis of the imaging device 10, and an axis R indicates the roll axis of the imaging device 10. In the following description, a lateral direction of the imaging device 10 corresponds to a direction of the pitch axis, and a longitudinal direction of the imaging device 10 corresponds to a direction of the yaw axis.

The lens unit 12 is attached to the imaging device body 14. A touch panel display 34 is provided on a rear surface of the imaging device body 14. The touch panel display 34 is formed by a touch panel 34A and a display 34B, and for example, the touch panel 34A is superimposed on the display 34B. The touch panel 34A is an example of a "touch panel" according to the technology of the present disclosure.

An electronic view finder 28 is provided on an upper portion of the imaging device body 14. The electronic view finder 28 includes a display 72. A finder opening portion 16 is provided in an upper portion of the imaging device body 14, and the display 72 is provided inside the finder opening portion 16. The display 72 is disposed at a position where a user can see the display 72 with an eye 302 when the user looks into the finder opening portion 16. The display 72 is an example of a "display" according to the technology of the present disclosure.

A light source 82 for gaze detection and a gaze sensor 86 are provided inside the finder opening portion 16. The eye 302 of the user looking into the finder opening portion 16 is a gaze detection target. The light source 82 includes a plurality of light emitters 82A. The plurality of light emitters 82A are disposed side by side in a lateral direction of the imaging device 10, for example.

The light source 82 is disposed at a position where the light source 82 can irradiate the eye 302 of the user with light when the user looks into the finder opening portion 16. The light source 82 emits near-infrared light as an example. The gaze sensor 86 is disposed at a position where the eye 302 of the user can be imaged when the user looks into the finder opening portion 16. The light source 82 is an example of a "light source" according to the technology of the present disclosure. The gaze sensor 86 is an example of a "gaze sensor" according to the technology of the present disclosure.

Note that a half mirror (not shown) may be disposed inside the finder opening portion 16. The display 72 may be disposed on a passing optical axis of the half mirror, and the gaze sensor 86 may be disposed on a reflection optical axis of the half mirror.

Figure 2:
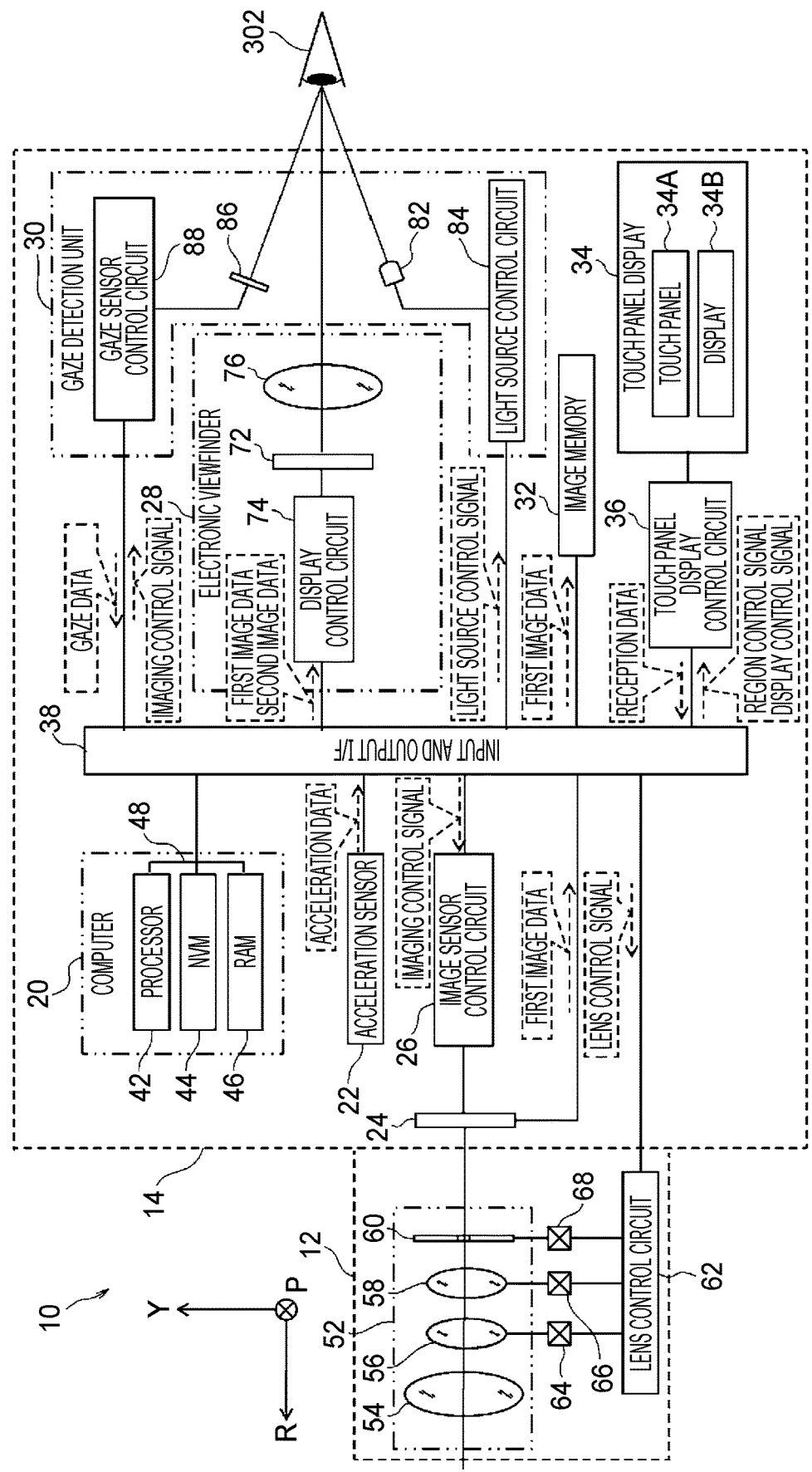
FIG. 2 is a block diagram showing an example of a hardware configuration of the imaging device.

As shown in FIG. 2 as an example, the imaging device body 14 includes a computer 20, an acceleration sensor 22, an image sensor 24, an image sensor control circuit 26, the electronic view finder 28, a gaze detection unit 30, an image memory 32, the touch panel display 34, a touch panel display control circuit 36, and an input and output I/F 38. The acceleration sensor 22, the image sensor 24, the image sensor control circuit 26, the image memory 32, and the touch panel display control circuit 36 are connected to the input and output I/F 38.

The computer 20 includes a processor 42, an NVM 44, and a RAM 46. The processor 42 controls the entire imaging device 10. The processor 42 is, for example, a processing device including a CPU and a GPU, and the GPU operates under the control of the CPU and executes processing related to an image. Here, a processing device including a CPU and a GPU has been described as an example of the processor 42. However, this is merely an example, and the processor 42 may be one or more CPUs into which a GPU function is integrated, or may be one or more CPUs into which a GPU function is not integrated. The processor 42, the NVM 44, and the RAM 46 are connected via a bus 48, and the bus 48 is connected to the input and output I/F 38. The computer 20 is an example of a "computer" according to the technology of the present disclosure. The processor 42 is an example of a "processor" according to the technology of the present disclosure.

The NVM 44 is a non-transitory storage medium, and stores various parameters and various programs. The NVM 44 is, for example, a flash memory (for example, an EEPROM). This is, however, merely an example, and an HDD or the like may be applied with a flash memory as the NVM 44. The RAM 46 temporarily stores various types of information and is used as a work memory.

The processor 42 reads a necessary program from the NVM 44 and executes the read program in the RAM 46. The processor 42 controls the acceleration sensor 22, the image sensor 24, the image sensor control circuit 26, the electronic view finder 28, the gaze detection unit 30, and the image memory 32 in accordance with the program executed in the RAM 46.

The acceleration sensor 22 detects acceleration in each axis direction of the pitch axis, the yaw axis, and the roll axis of the imaging device 10. The acceleration sensor 22 outputs acceleration data corresponding to the acceleration of the imaging device 10 in each axis direction. The acceleration sensor 22 is an example of an "acceleration sensor" according to the technology of the present disclosure.

The image sensor 24 is, as an example, a CMOS image sensor. Here, although the CMOS image sensor is exemplified as the image sensor 24, the technology of the present disclosure is not limited thereto. For example, even in a case where the image sensor 24 is another type of image sensor such as a CCD image sensor, the technology of the present disclosure is established. The image sensor control circuit 26 is connected to the image sensor 24. The image sensor control circuit 26 controls the image sensor 24 in accordance with an imaging control signal from the processor 42. The image sensor 24 is an example of a "first image sensor", a "second image sensor", a "third image sensor", and a "fourth image sensor" according to the technology of the present disclosure.

Subject light is incident on an imaging lens 52 of the lens unit 12 to be described later. The subject light is formed on a light-receiving surface of the image sensor 24 by the imaging lens 52. A photoelectric conversion element (not shown) is provided on the light-receiving surface of the image sensor 24. The photoelectric conversion element photoelectrically converts the subject light received by the light-receiving surface and outputs an electric signal corresponding to an amount of the subject light as analog image data indicating the subject light under the control of the image sensor control circuit 26. The image sensor 24 includes a signal processing circuit (not shown). The signal processing circuit generates digital first image data by digitizing the analog image data, and outputs the first image data.

The first image data generated by the image sensor 24 is temporarily stored in the image memory 32. The processor 42 acquires the first image data from the image memory 32 and executes various types of processing by using the acquired first image data.

The lens unit 12 includes the imaging lens 52. The imaging lens 52 includes, as an example, an objective lens 54, a focus lens 56, a zoom lens 58, and a stop 60. The lens unit 12 further includes a lens control circuit 62, a first actuator 64, a second actuator 66, and a third actuator 68.

The lens control circuit 62 is connected to the first actuator 64, the second actuator 66, and the third actuator 68, and the lens control circuit 62 is connected to the input and output I/F 38. The lens control circuit 62 controls the first actuator 64, the second actuator 66, and the third actuator 68 in accordance with a lens control signal from the processor 42.

The first actuator 64 moves the focus lens 56 along an optical axis OA. The position of a focus is adjusted by changing the position of the focus lens 56. The second actuator 66 moves the zoom lens 58 along the optical axis OA. A focal length is adjusted by changing the position of the zoom lens 58. The third actuator 68 changes the size of an aperture of the stop 60. By changing the size of the aperture of the stop 60, a stop amount by the stop 60 is changed, and accordingly, the exposure is adjusted. The first actuator 64, the second actuator 66, and the third actuator 68 are, for example, piezoelectric elements, voice coil motors, or the like.

The electronic view finder 28 includes the display 72, a display control circuit 74, and an eyepiece lens 76. The display 72 is, for example, a liquid crystal display, an EL display, or the like. The display control circuit 74 is connected to the input and output I/F 38. The processor 42 selectively outputs the first image data and the second image data to the display control circuit 74 as described later. The display control circuit 74 displays a first image 200 on the display 72 in accordance with the first image data and displays a second image 202 on the display 72 in accordance with the second image data. The eyepiece lens 76 is disposed to face the screen of the display 72.

The gaze detection unit 30 includes the light source 82, a light source control circuit 84, the gaze sensor 86, and a gaze sensor control circuit 88. The light source 82 is, for example, an LED that outputs near-infrared light. The near-infrared light is an example of "light" according to the technology of the present disclosure. The light source control circuit 84 is connected to the input and output I/F 38. The light source control circuit 84 controls the light source 82 in accordance with a light source control signal from the processor 42.

The gaze sensor 86 is, for example, a CMOS image sensor having sensitivity to near-infrared light. Here, although the CMOS image sensor is exemplified as the gaze sensor 86, the technology of the present disclosure is not limited thereto. For example, even in a case where the gaze sensor 86 is another type of image sensor such as a CCD image sensor, the technology of the present disclosure is established. The gaze sensor control circuit 88 is connected to the gaze sensor 86. The gaze sensor control circuit 88 controls the gaze sensor 86 according to an imaging control signal from the processor 42. The gaze sensor 86 images a subject (as an example, the eye 302 of the user), and outputs gaze data obtained by imaging.

The touch panel display 34 is connected to the touch panel display control circuit 36. The touch panel display control circuit 36 outputs, to the processor 42, a reception data corresponding to an instruction received by the touch panel 34A from the user. The touch panel display control circuit 36 sets, for example, a valid region and/or an invalid region (see FIG. 34 to be described later) of the touch panel 34A in accordance with a region control signal output from the processor 42. Furthermore, the touch panel display control circuit 36 causes the display 34B to display an image based on a display control signal output from the processor 42. The display control signal includes, for example, data for displaying an image on the display 34B.

Figure 3:
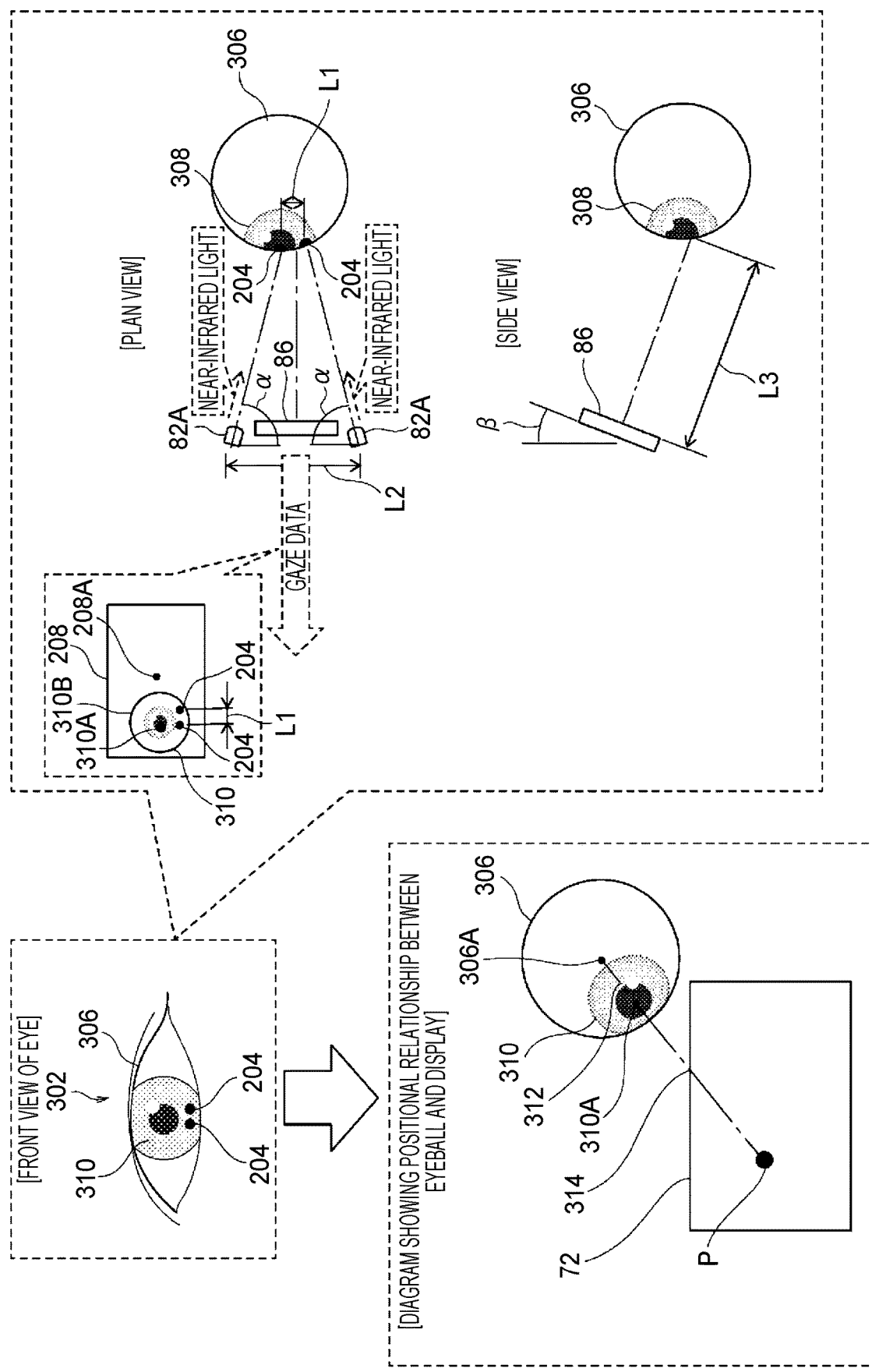
FIG. 3 is an explanatory diagram showing an example of a method of detecting a gaze position.

FIG. 3 shows an example of a method of detecting a gaze position based on the gaze data. In the example shown in FIG. 3, near-infrared light is emitted from the plurality of light emitters 82A to an eyeball 306, and the near-infrared light is reflected by the surface of a cornea 308, and thus, dot patterns 204 are formed on the surface of the cornea 308. A distance L1 between the patterns 204 are obtained from an image 208 obtained by imaging the eyeball 306 by the gaze sensor 86.

A distance L3 between the gaze sensor 86 and the eyeball 306 are obtained from the known distance L2 between the plurality of light emitters 82A, known attachment angles α of the plurality of light emitters 82A, a known attachment angle ß of the gaze sensor 86, and the distance L1 between the patterns 204. The position of a center 310A of a pupil 310 and the position of an outline 310B of the pupil 310 with respect to a center 208A of the image 208 are obtained from the image 208 obtained by imaging the eyeball 306 by the gaze sensor 86. Based on the position of the center 310A of the pupil 310 and the position of the outline 310B of the pupils 310 with respect to the center 208A of the image 208, the distance L3 between the gaze sensor 86 and the eyeball 306, and a curvature radius set in advance for the eyeball 306, a coordinate of the center 306A of the eyeball 306 and a coordinate of the center 310A of the pupil 310 are obtained. For example, a statistically obtained numerical value is applied to the curvature radius of the eyeball 306.

The direction in which a line 312 connecting the coordinate of the center 306A of the eyeball 306 and the coordinate of the center 310A of the pupil 310 extends corresponds to the direction of the visual line of the eye 302. An extension line 314 obtained by extending the line 312 connecting the coordinate of the center 306A of the eyeball 306 and the coordinate of the center 310A of the pupil 310 indicates the gaze of the eye 302, and a point P where the gaze of the eye 302 and the screen of the display 72 cross each other corresponds to the position of the gaze of the eye 302. As described above, the position of the gaze of the eye 302 is detected based on the gaze data obtained by imaging the eyeball 306 by the gaze sensor 86. Hereinafter, the "position of the gaze of the eye 302" is also referred to as a "gaze position" or a "gaze position with respect to the display 72". The gaze position is an example of a "gaze position" according to the technology of the present disclosure.

Note that the above method of detecting the gaze position is merely an example, and the technology of the present disclosure is not limited thereto. In addition to the above method of detecting the gaze position, various methods of detecting the gaze position with respect to the display 72 based on the gaze data obtained by imaging the eyeball 306 by the gaze sensor 86 in a state where the pattern 204 is formed on the surface of the cornea 308 can be applied to the technology of the present disclosure. In the above method of detecting the gaze position, the gaze position is detected based on reflected light reflected by the surface of the cornea 308. However, the gaze position may be detected based on reflected light reflected by a portion other than the cornea 308 (for example, a retina or the like).

Figure 4:
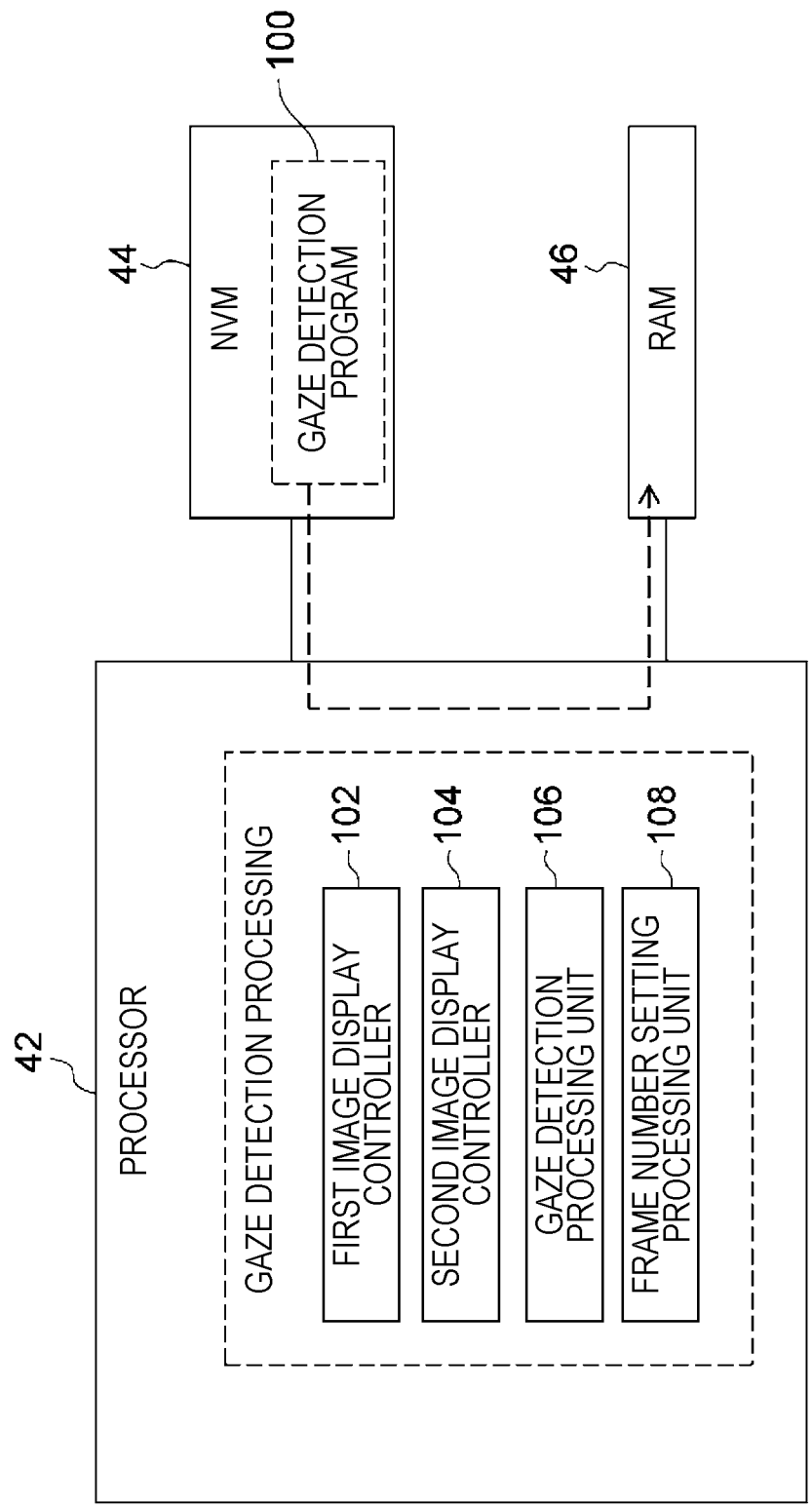
FIG. 4 is a block diagram showing an example of a functional configuration of a CPU according to a first embodiment.

As shown in FIG. 4 as an example, a gaze detection program 100 is stored in the NVM 44 of the imaging device 10. The gaze detection program 100 is an example of a "program" according to the technology of the present disclosure. The processor 42 reads the gaze detection program 100 from the NVM 44, and executes the read gaze detection program 100 in the RAM 46. The processor 42 performs gaze detection processing in accordance with the gaze detection program 100 executed in the RAM 46. The gaze detection processing is executed by the processor 42 operating as a first image display controller 102, a second image display controller 104, a gaze detection processing unit 106, and a frame number setting processing unit 108 in accordance with the gaze detection program 100.

Figure 5:
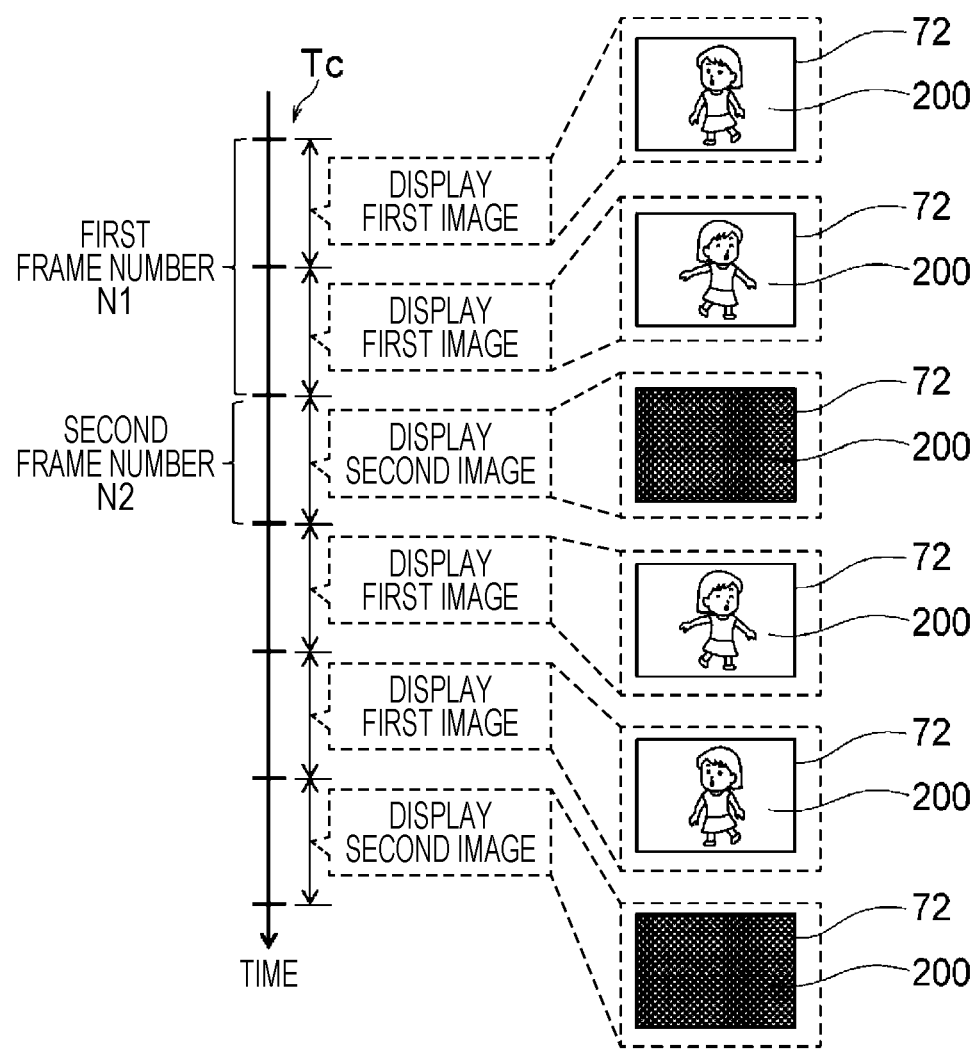
FIG. 5 is an explanatory diagram showing an example of a first image and a second image according to the first embodiment.

FIG. 5 shows a time chart Tc of an image displayed on the display 72 in the first embodiment. A first frame number N1 is a frame number of the first image 200, and a second frame number N2 is a frame number of the second image 202. As shown in the time chart Tc, a period in which the first frame number N1 of first images 200 are displayed on the display 72 and a period in which the second frame number N2 of second images 202 are displayed on the display 72 are alternately repeated. The first image 200 and the second image 202 constitute a live view image. The first image 200 and the second image 202 will be described in detail later. The first frame number N1 is an example of a "first frame number" according to the technology of the present disclosure. The second frame number N2 is an example of a "second frame number" according to the technology of the present disclosure.

Figure 6:
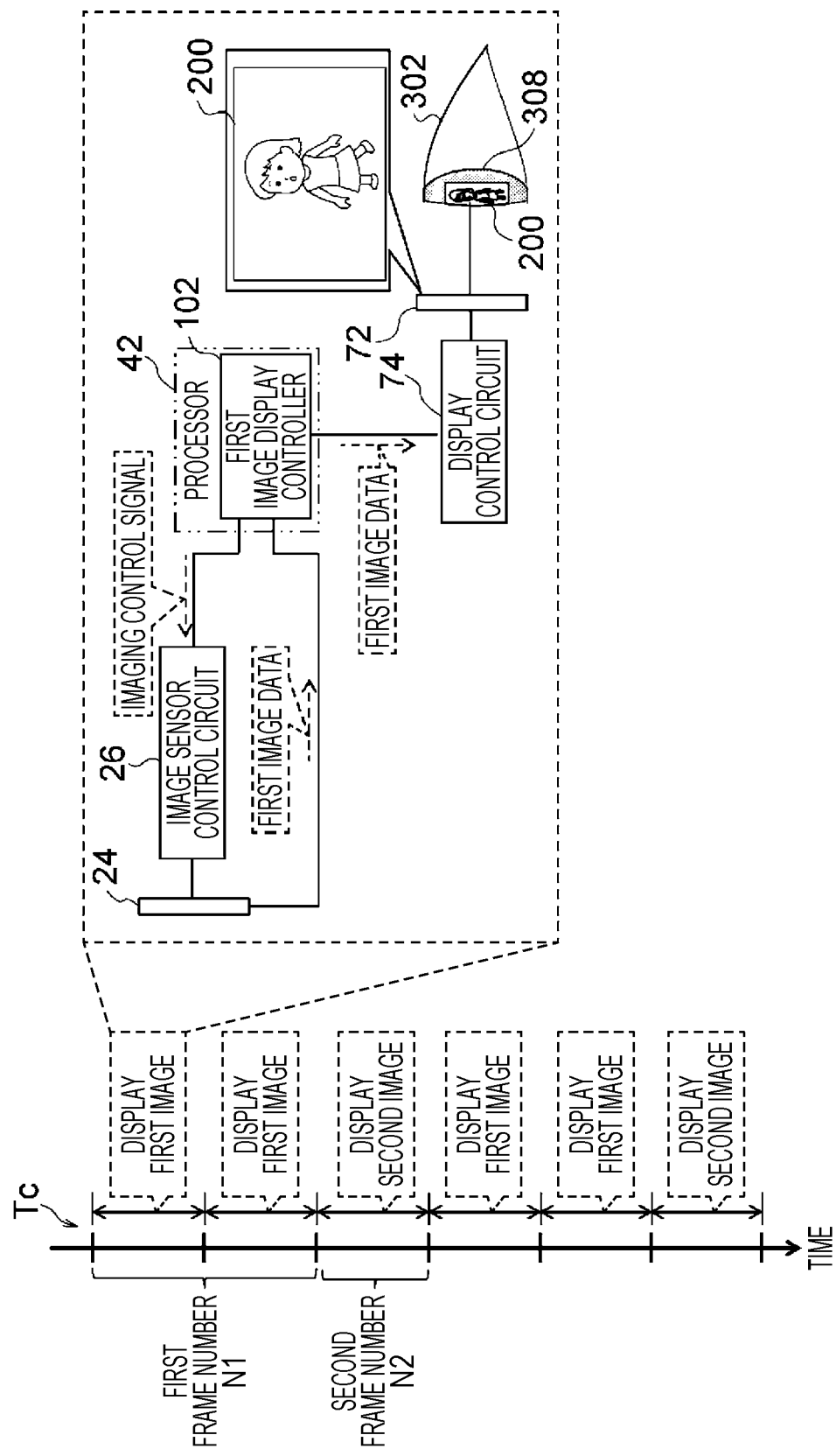
FIG. 6 is an explanatory diagram showing an example of a first operation of the CPU according to the first embodiment.

As shown in FIG. 6 as an example, the first image display controller 102 causes the display 72 to display the first image 200. Specifically, the first image display controller 102 causes the image sensor 24 to image a subject (not shown) via the image sensor control circuit 26 by outputting an imaging control signal to the image sensor control circuit 26. The first image display controller 102 acquires first image data acquired by imaging the subject by the image sensor 24, and outputs the acquired first image data to the display 72. The display 72 displays the first image 200 indicated by the first image data. Accordingly, the first image 200 in which the subject appears as an image is displayed on the display 72.

The first image display controller 102 causes the display 72 to display the first images 200 whose number corresponds to the first frame number N1. When the first image 200 is displayed on the display 72, the first image 200 is projected on the surface of the cornea 308 by reflecting light radiated from the display 72. The first image data is an example of "first image data" according to the technology of the present disclosure. A state in which the first image 200 is displayed on the display 72 is an example of a "first state" according to the technology of the present disclosure.

Figure 7:
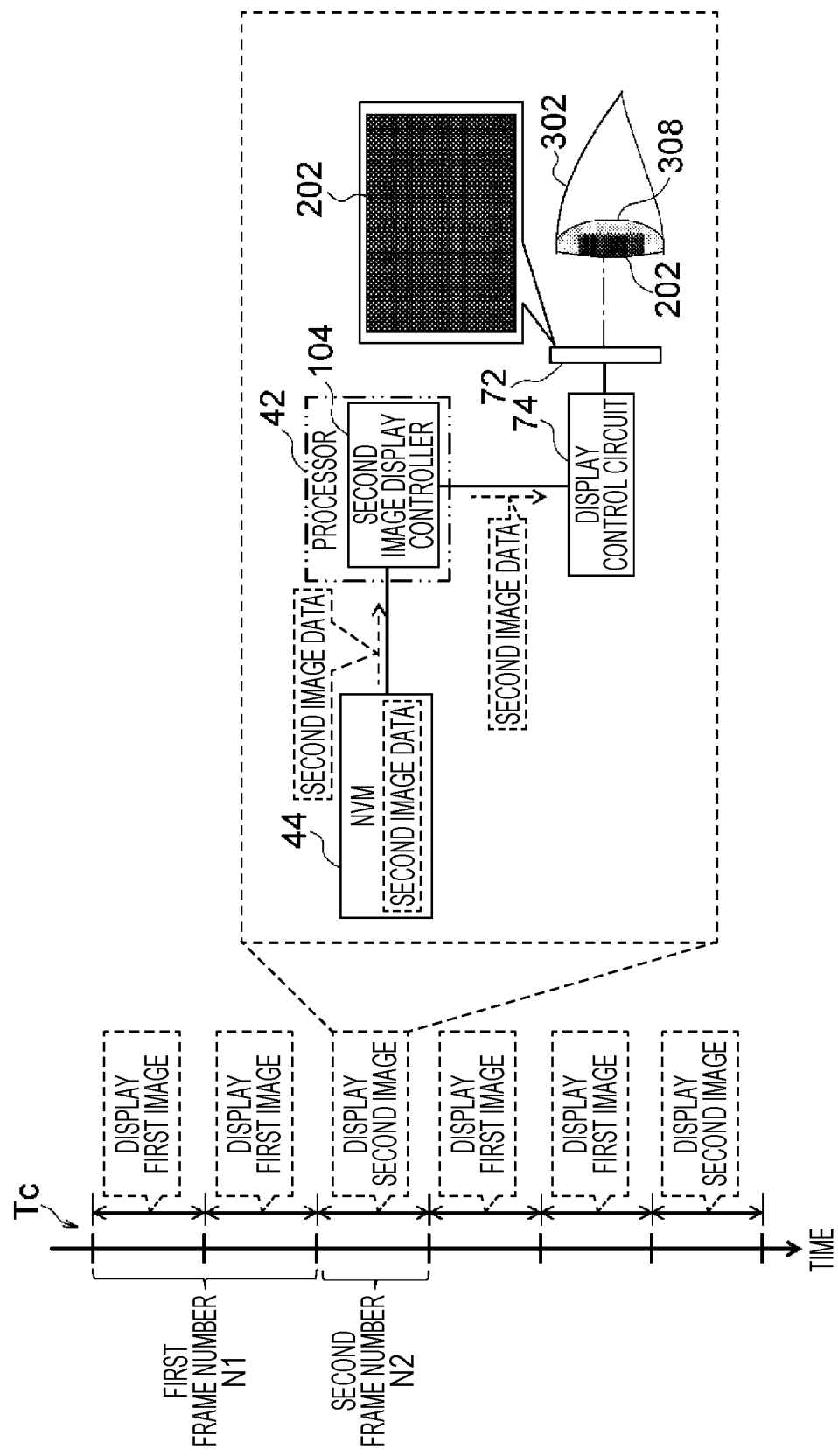
FIG. 7 is an explanatory diagram showing an example of a second operation of the CPU according to the first embodiment.

As shown in FIG. 7 as an example, the second image display controller 104 causes the display 72 to display the second image 202. Specifically, the second image data indicating the second image 202 is stored in advance in the NVM 44. The second image 202 is, for example, a black image in which the entire surface is a black region.

The second image display controller 104 acquires the second image data stored in the NVM 44 and outputs the acquired second image data to the display 72. The display 72 displays the second image 202 indicated by the second image data. Accordingly, the second image 202 which is a black image is displayed on the display 72. The second image data is an example of "second image data" and "first gaze detection image data" according to the technology of the present disclosure. The second image 202 is an example of a "gaze detection image" according to the technology of the present disclosure. A state where the second image 202 is displayed on the display 72 is an example of a "second state" according to the technology of the present disclosure.

The second image display controller 104 causes the display 72 to display the second images 202 whose number corresponds to the second frame number N2. When the second image 202 which is a black image is displayed on the display 72, the second image 202 which is a black image is projected on the surface of the cornea 308. In a state where the second image 202 which is a black image is projected on the surface of the cornea 308, light reflected by the cornea 308 is suppressed as compared to a case where the first image 200 is projected on the surface of the cornea 308 (see FIG. 6). The second image 202 is a gaze detection image for detecting a gaze position as described later. The black region forming the second image 202 is an example of an "achromatic region" according to the technology of the present disclosure.

Figure 8:
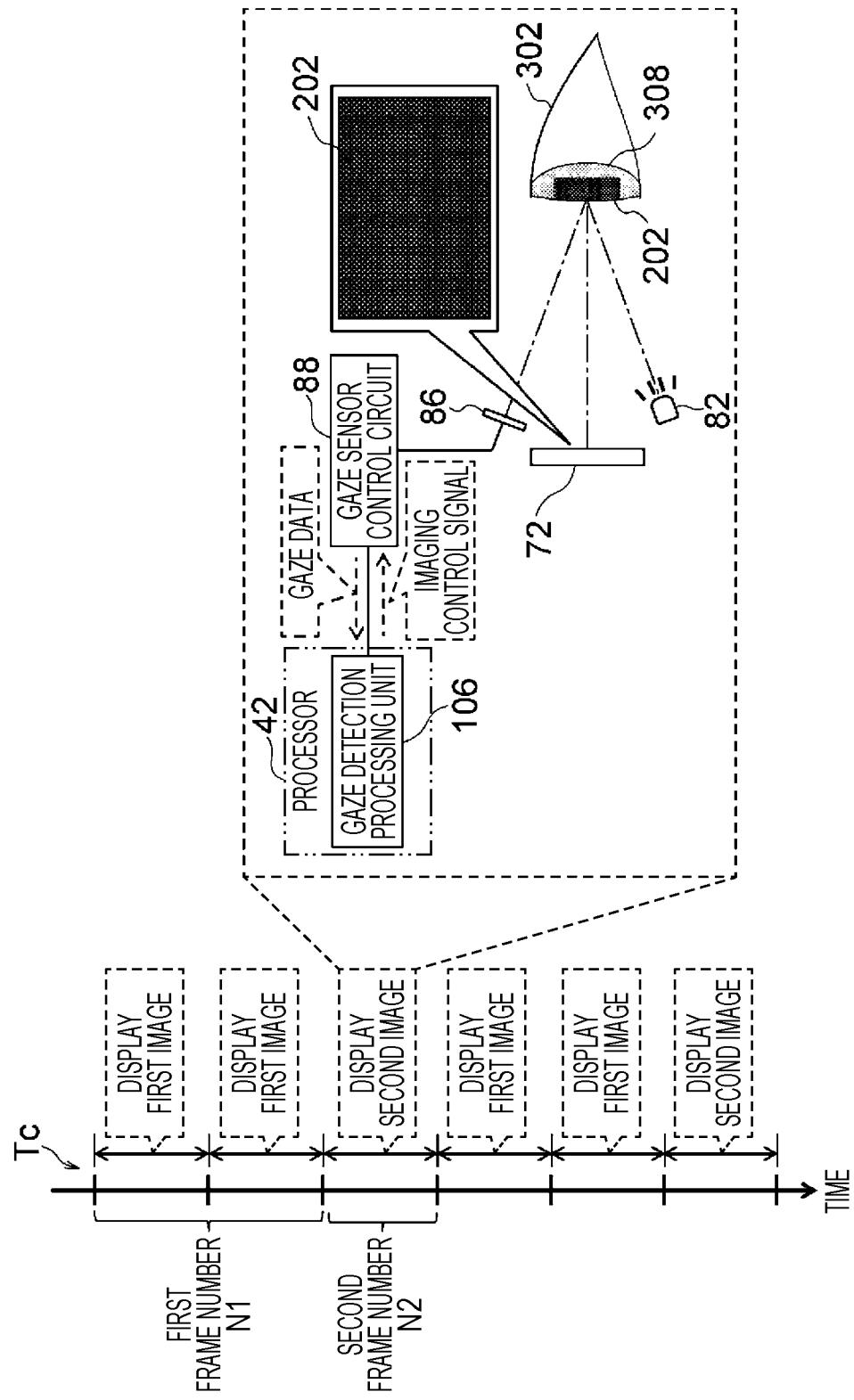
FIG. 8 is an explanatory diagram showing an example of a third operation of the CPU according to the first embodiment.

As shown in FIG. 8 as an example, the gaze detection processing unit 106 detects the gaze position of the user who is watching the display 72 during a period in which the second image 202 is displayed on the display 72 (that is, a period in which the second image data is output to the display 72). Specifically, the gaze detection processing unit 106 causes the gaze sensor 86 to image the subject (for example, the eye 302 of the user) via the gaze sensor control circuit 88 by outputting an imaging control signal to the gaze sensor control circuit 88. Then, the gaze detection processing unit 106 acquires gaze data obtained by imaging performed by the gaze sensor 86, and detects a gaze position with respect to the display 72 based on the acquired gaze data. The method of detecting the gaze position is as described in FIG. 3. The gaze data is an example of "gaze data" according to the technology of the present disclosure.

The gaze detection processing unit 106 does not detect the gaze position in a period in which the first image 200 is displayed on the display 72 (that is, a period in which the first image data is output to the display 72).

Note that the light source 82 may continue to emit the near-infrared light when power of the imaging device 10 is turned on. The light source 82 may emit near-infrared light when the gaze position is detected by the gaze detection processing unit 106, and may stop emitting near-infrared light when the gaze position is not detected by the gaze detection processing unit 106.

Figure 9:
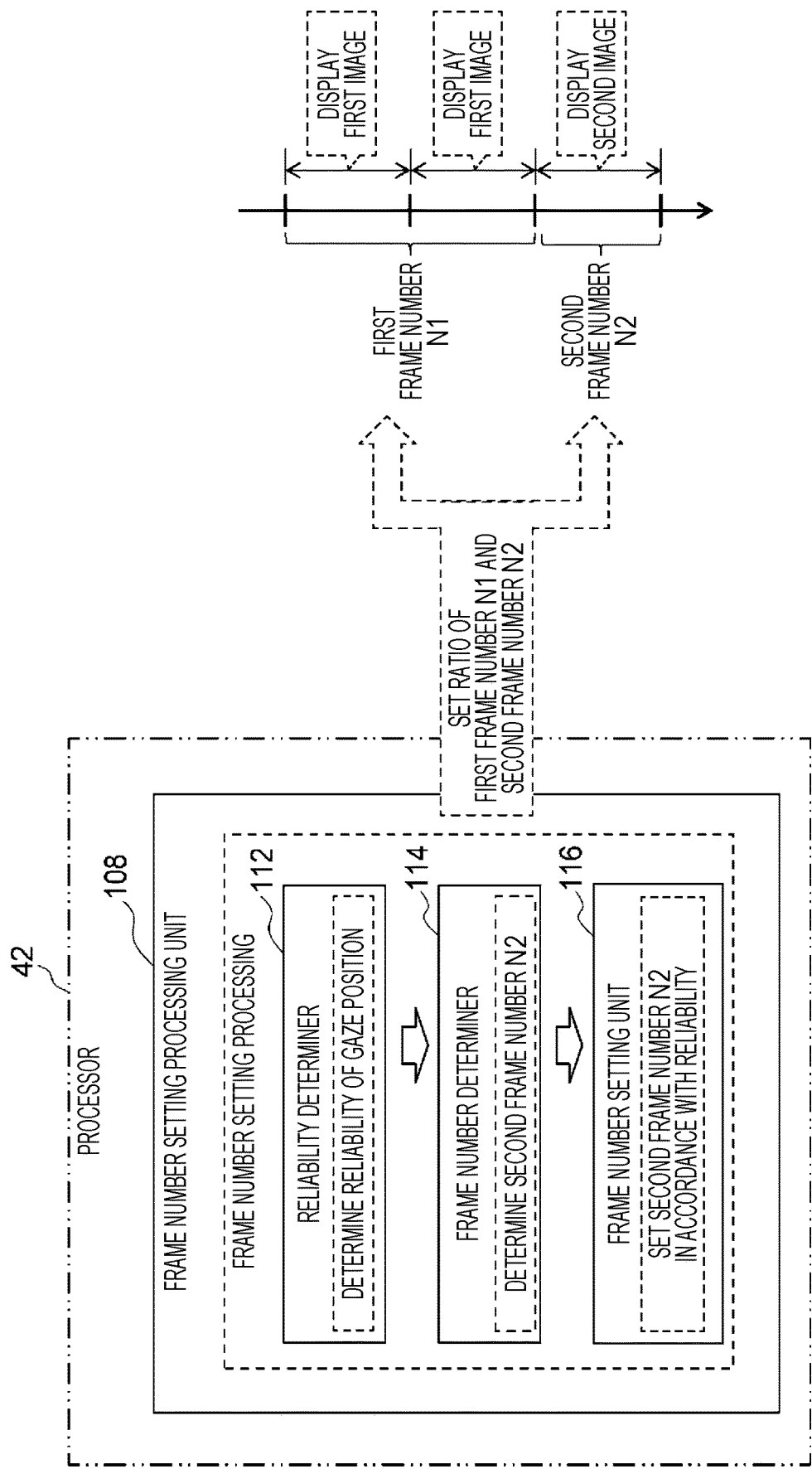
FIG. 9 is an explanatory diagram showing an example of a fourth operation of the CPU according to the first embodiment.

As shown in FIG. 9 as an example, the frame number setting processing unit 108 executes frame number setting processing. The frame number setting processing is processing of setting a ratio of the first frame number N1 and the second frame number N2 per unit time.

The unit time in this case is, for example, one second. A total number of the first frame number N1 and the second frame number N2 per unit time is a frame number per unit time. The frame number per unit time is set to, for example, 60 frames or 30 frames. That is, when the frame number per unit time is 60 frames, a frame rate is 60 fps, and when the frame number per unit time is 30 frames, the frame rate is 30 fps.

The frame number setting processing unit 108 includes a reliability determiner 112, a frame number determiner 114, and a frame number setting unit 116 in order to execute the frame number setting processing.

The reliability determiner 112 determines reliability related to a detection result of the gaze position. Specifically, the reliability determiner 112 determines whether reliability related to a detection result of the gaze position is equal to or less than a predetermined threshold value. The reliability related to the detection result of the gaze position may be determined by using, for example, a processing technology by artificial intelligence such as a neural network. The reliability related to the detection result of the gaze position may be determined based on a spatial variation in a case where the gaze positions are arranged in time series. The threshold value is set to a minimum value at which the detection accuracy of the gaze position is secured.

When the reliability determiner 112 determines that the reliability related to the detection result of the gaze position is equal to or less than the threshold value, the frame number determiner 114 determines whether the second frame number N2 is less than a predetermined maximum value.

Here, in a case where the second image 202 which is a black image is inserted between the first images 200 which are the captured images, in order to maintain the luminance of the live view image constituted by the first image 200 and the second image 202, the luminance of the first image 200 is increased, for example, as compared to a case where the second image 202 is not inserted. Accordingly, a time average luminance of the live view image is compensated. Therefore, the maximum value is set to, for example, a minimum value at which the time average luminance of the live view image is compensated.

However, for example, in a case where the luminance of the first image 200 is increased by a pulse width modulation method, power efficiency decreases in the display 72 of an LED method (for example, an OLED method). Therefore, the maximum value is set to, for example, a minimum value at which the power efficiency of the display 72 is secured.

When the frame number determiner 114 determines that the second frame number N2 is less than the maximum value, the frame number setting unit 116 increases the second frame number N2 by one. When the frame number determiner 114 determines that the second frame number N2 is the maximum value, the second frame number N2 is not increased by the frame number setting unit 116, and the second frame number N2 is maintained at the maximum value.

On the other hand, when the reliability determiner 112 determines that the reliability related to the detection result of the gaze position exceeds the threshold value, the frame number determiner 114 determines whether the second frame number N2 exceeds a predetermined minimum value.

Here, since the display 72 cannot be driven at a rated level or higher, the luminance cannot be increased beyond the rated level. Therefore, the frame number of the second image 202 which is a black image inserted between the first images 200 is set within a range where a frequency of updating the detection of the gaze position is secured. As a result, the minimum value is set to a minimum value at which the frequency of updating the detection of the gaze position is secured.

When the frame number determiner 114 determines that the second frame number N2 exceeds the minimum value, the frame number setting unit 116 decreases the second frame number N2 by one. When the frame number determiner 114 determines that the second frame number N2 is the minimum value, the second frame number N2 is not decreased by the frame number setting unit 116, and the second frame number N2 is maintained at the minimum value. Then, the ratio of the first frame number and the second frame number is set in accordance with the second frame number N2 set by the frame number setting unit 116.

In this way, the frame number setting processing unit 108 sets the ratio of the first frame number N1 and the second frame number N2 per unit time in accordance with the reliability related to the detection result of the gaze position. For example, the frame number setting processing unit 108 sets the ratio of the first frame number N1 and the second frame number N2 per unit time such that the first frame number N1 is larger than the second frame number N2.

Figure 10:
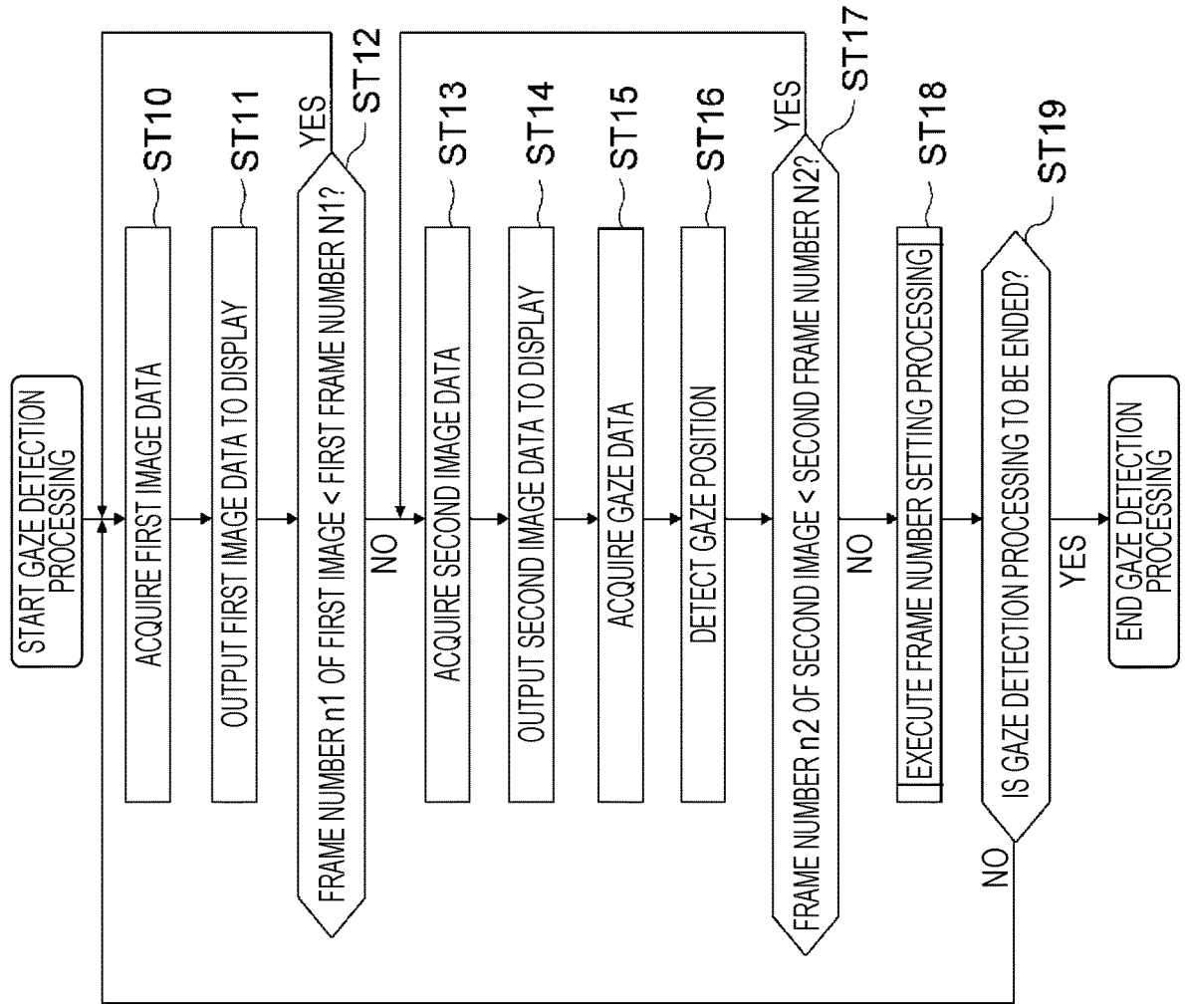
FIG. 10 is a flowchart showing an example of a flow of gaze detection processing according to the first embodiment.

Next, an action of the imaging device 10 according to the first embodiment will be described with reference to FIG. 10. FIG. 10 shows an example of a flow of the gaze detection processing according to the first embodiment.

In the gaze detection processing shown in FIG. 10, first, in step ST10, the first image display controller 102 causes the image sensor 24 to image the subject. Then, the first image display controller 102 acquires the first image data obtained by imaging the subject by the image sensor 24. After the processing of step ST10 is executed, the gaze detection processing proceeds to step ST11.

In step ST11, the first image display controller 102 outputs the first image data acquired in step ST10 to the display 72. As a result, the first image 200 is displayed on the display 72. After the processing of step ST11 is executed, the gaze detection processing proceeds to step ST12.

In step ST12, the first image display controller 102 determines whether a frame number n1 of the first image 200 is smaller than the first frame number N1 based on the first image data acquired in step ST10. When the frame number n1 of the first image 200 is smaller than the first frame number N1 in step ST12, the determination is positive, and the gaze detection processing proceeds to step ST10. When the frame number n1 of the first image 200 reaches the first frame number N1 in step ST12, the determination is negative, and the gaze detection processing proceeds to step ST13.

In step ST13, the second image display controller 104 acquires the second image data stored in the NVM 44. After the processing of step ST13 is executed, the gaze detection processing proceeds to step ST14.

In step ST14, the second image display controller 104 outputs the second image data acquired in step ST13 to the display 72. As a result, the second image 202 which is a black image is displayed on the display 72. After the processing of step ST14 is executed, the gaze detection processing proceeds to step ST15.

In step ST15, the gaze detection processing unit 106 acquires gaze data obtained by imaging performed by the gaze sensor 86. After the processing of step ST15 is executed, the gaze detection processing proceeds to step ST16.

In step ST16, the gaze detection processing unit 106 detects the gaze position with respect to the display 72 based on the gaze data acquired in step ST15. After the processing of step ST16 is executed, the gaze detection processing proceeds to step ST17.

In step ST17, the second image display controller 104 determines whether a frame number n2 of the second image 202 is smaller than the second frame number N2 based on the second image data acquired in step ST13. When the frame number n2 of the second image 202 is smaller than the second frame number N2 in step ST17, the determination is positive, and the gaze detection processing proceeds to step ST13. When the frame number n2 of the second image 202 reaches the second frame number N2 in step ST17, the determination is negative, and the gaze detection processing proceeds to step ST18.

In step ST18, the frame number setting processing unit 108 executes the frame number setting processing which is processing of setting the ratio of the first frame number N1 and the second frame number N2 per unit time. After the processing of step ST18 is executed, the gaze detection processing proceeds to step ST19.

In step ST19, the processor 42 determines whether a condition for ending the gaze detection processing is established. Examples of the condition for ending the gaze detection processing include a condition that a switching condition from a mode in which the gaze detection processing is performed to another mode is established. In step ST19, when the condition for ending the gaze detection processing is not established, the determination is negative, and the gaze detection processing proceeds to step ST10. When the condition for ending the gaze detection processing is established in step ST19, the determination is positive, and the gaze detection processing ends.

Figure 11:
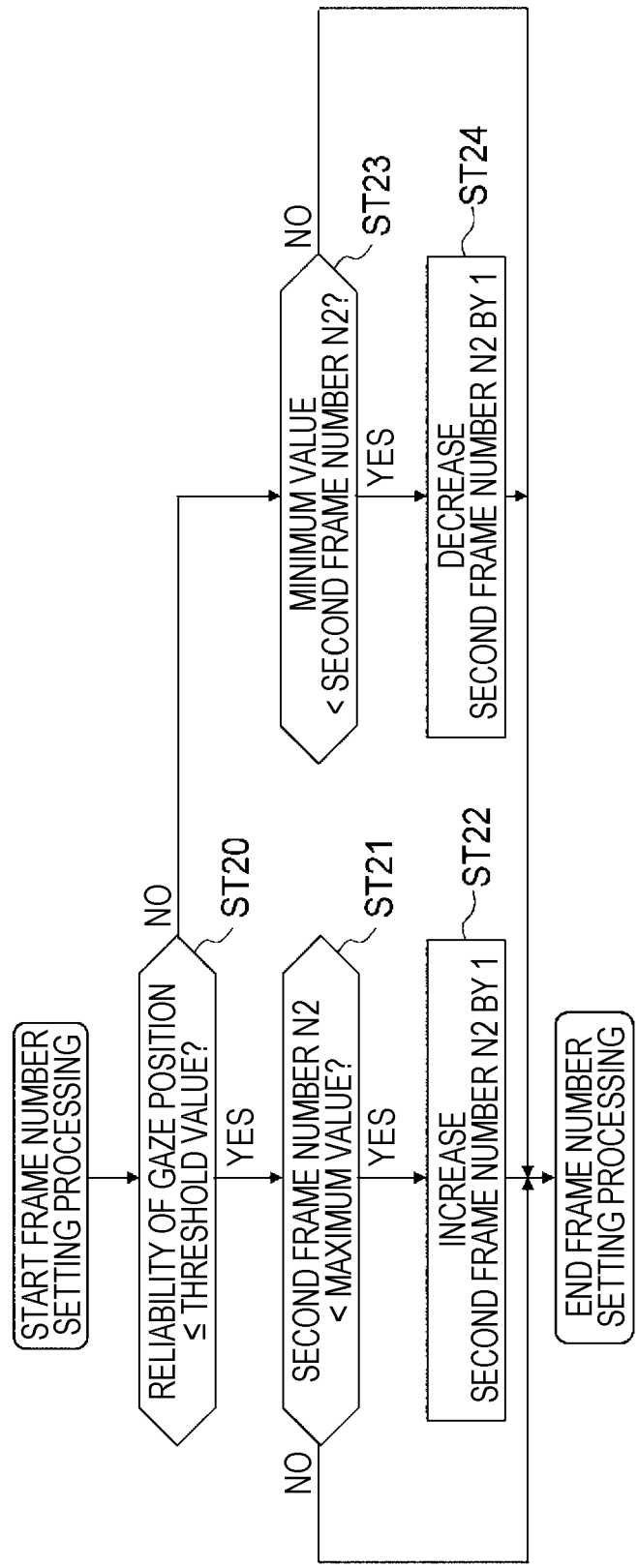
FIG. 11 is a flowchart showing an example of a flow of frame number setting processing according to the first embodiment.

Next, the frame number setting processing will be described in detail. FIG. 11 shows an example of a flow of the frame number setting processing.

In the frame number setting processing shown in FIG. 11, first, in step ST20, the reliability determiner 112 determines whether the reliability related to the detection result of the gaze position is equal to or less than the threshold value. When the reliability related to the detection result of the gaze position is equal to or less than the threshold value in step ST20, the determination is positive, and the frame number setting processing proceeds to step ST21. When the reliability related to the detection result of the gaze position exceeds the threshold value in step ST20, the determination is negative, and the frame number setting processing proceeds to step ST23.

In step ST21, the frame number determiner 114 determines whether the second frame number N2 is less than the maximum value. When the second frame number N2 is less than the maximum value in step ST21, the determination is positive, and the frame number setting processing proceeds to step ST22. When the second frame number N2 is the maximum value in step ST21, the determination is negative, and the frame number setting processing ends. In this case, the second frame number N2 is maintained at the maximum value.

In step ST22, the frame number setting unit 116 increases the second frame number N2 by one. After the processing of step ST22 is executed, the frame number setting processing ends.

In step ST23, the frame number determiner 114 determines whether the second frame number N2 exceeds the minimum value. When the second frame number N2 exceeds the minimum value in step ST23, the determination is positive, and the frame number setting processing proceeds to step ST24. When the second frame number N2 is the minimum value in step ST23, the determination is negative, and the frame number setting processing ends. In this case, the second frame number N2 is maintained at the minimum value.

In step ST24, the frame number setting unit 116 decreases the second frame number N2 by one. After the processing of step ST24 is executed, the frame number setting processing ends.

Note that an information processing method described as the action of the imaging device 10 is an example of an "information processing method" according to the technology of the present disclosure.

As described above, in the first embodiment, the processor 42 acquires the first image data and the second image data and outputs any of the first image data or the second image data to the display 72. Then, the processor 42 acquires the gaze data in a period in which the second image data is output to the display 72, and detects the gaze position with respect to the display 72 based on the gaze data. Therefore, the detection accuracy of the gaze position can be improved as compared to a case where the gaze position with respect to the display 72 is detected based on, for example, the gaze data acquired in a period in which the first image data is displayed on the display 72.

The processor 42 selectively outputs the first image data and the second image data to the display 72. As a result, an image (as an example, a live view image) including the first image 200 and the second image 202 can be displayed on the display 72.

The imaging device 10 includes the image sensor 24, and the first image data is image data obtained by imaging performed by the image sensor 24. Therefore, the subject can be represented as an image on the first image 200.

The processor 42 does not detect the gaze position in a period in which the first image data is output to the display 72. It is therefore possible to avoid the gaze position from being detected in a state where the first image 200 is displayed on the display 72.

The second image data is gaze detection image data for detecting the gaze position. Accordingly, the gaze position with respect to the display 72 can be detected based on the gaze data acquired in a period in which the gaze detection image data as the second image data is displayed on the display 72.

The second image 202 includes an achromatic region (for example, a black region). Therefore, the influence of the reflected light on the gaze data can be suppressed, for example, as compared to a case where the second image 202 is a chromatic image.

The achromatic region forming the second image 202 is a black region. Therefore, the influence of the reflected light on the gaze data can be suppressed, for example, as compared to a case where the achromatic region forming the second image 202 is a gray region or a white region.

The first frame number N1, which is a frame number of the first image data output to the display 72 per unit time, is larger than the second frame number N2, which is a frame number of the second image data output to the display 72 per unit time. Therefore, it is possible to secure an image quality of the image (as an example, a live view image) including the first image 200 and the second image 202, for example, as compared to a case where the first frame number N1 is smaller than the second frame number.

The processor 42 sets the ratio of the first frame number and the second frame number per unit time in accordance with the reliability related to the detection result of the gaze position. It is therefore possible to adjust the first frame number and the second frame number to a ratio corresponding to the reliability related to the detection result of the gaze position.

Note that, in the first embodiment described above, the processor 42 outputs the second image data stored in the NVM 44 to the display 72 to cause the display 72 to display the second image 202 which is a black image. However, the processor 42 may cause the display 72 to display the second image 202 which is a black image by stopping the output of the image data to the display 72. In this case, the processor 42 may determine whether the display 72 is in any state of a state where the first image 200 is displayed or the state where the second image 202 is displayed, and may acquire the gaze data when determining that the display 72 is in a second state (that is, in a period in which the display 72 is in the second state). In this case, the state in which the first image 200 is displayed on the display 72 is an example of the "first state" according to the technology of the present disclosure, and the state in which the second image 202 is displayed on the display 72 is an example of the "second state" according to the technology of the present disclosure.

Second Embodiment

Next, a second embodiment will be described.

Figure 12:
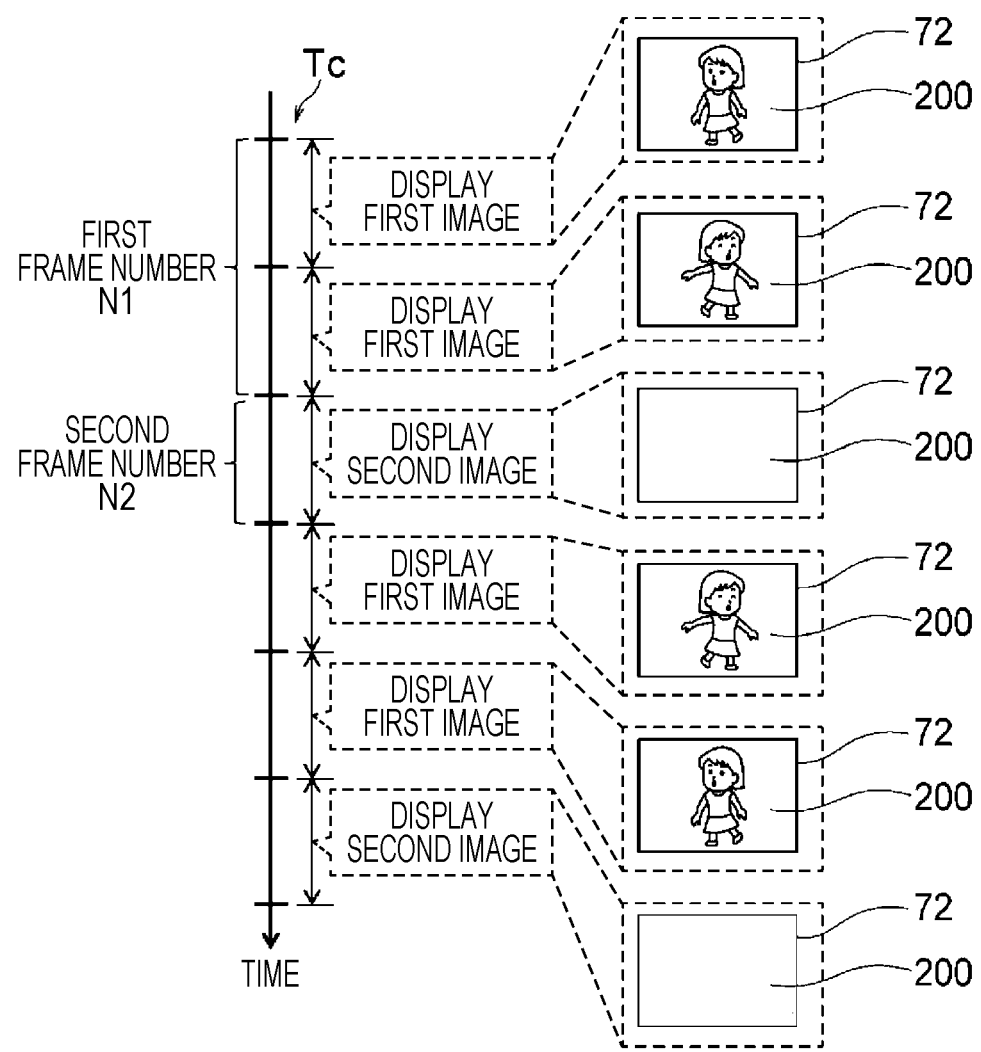
FIG. 12 is an explanatory diagram showing an example of a first image and a second image according to a second embodiment.

FIG. 12 shows the time chart Tc of an image displayed on the display 72 in the second embodiment. In the second embodiment, the second image 202 is changed from the first embodiment.

Figure 13:
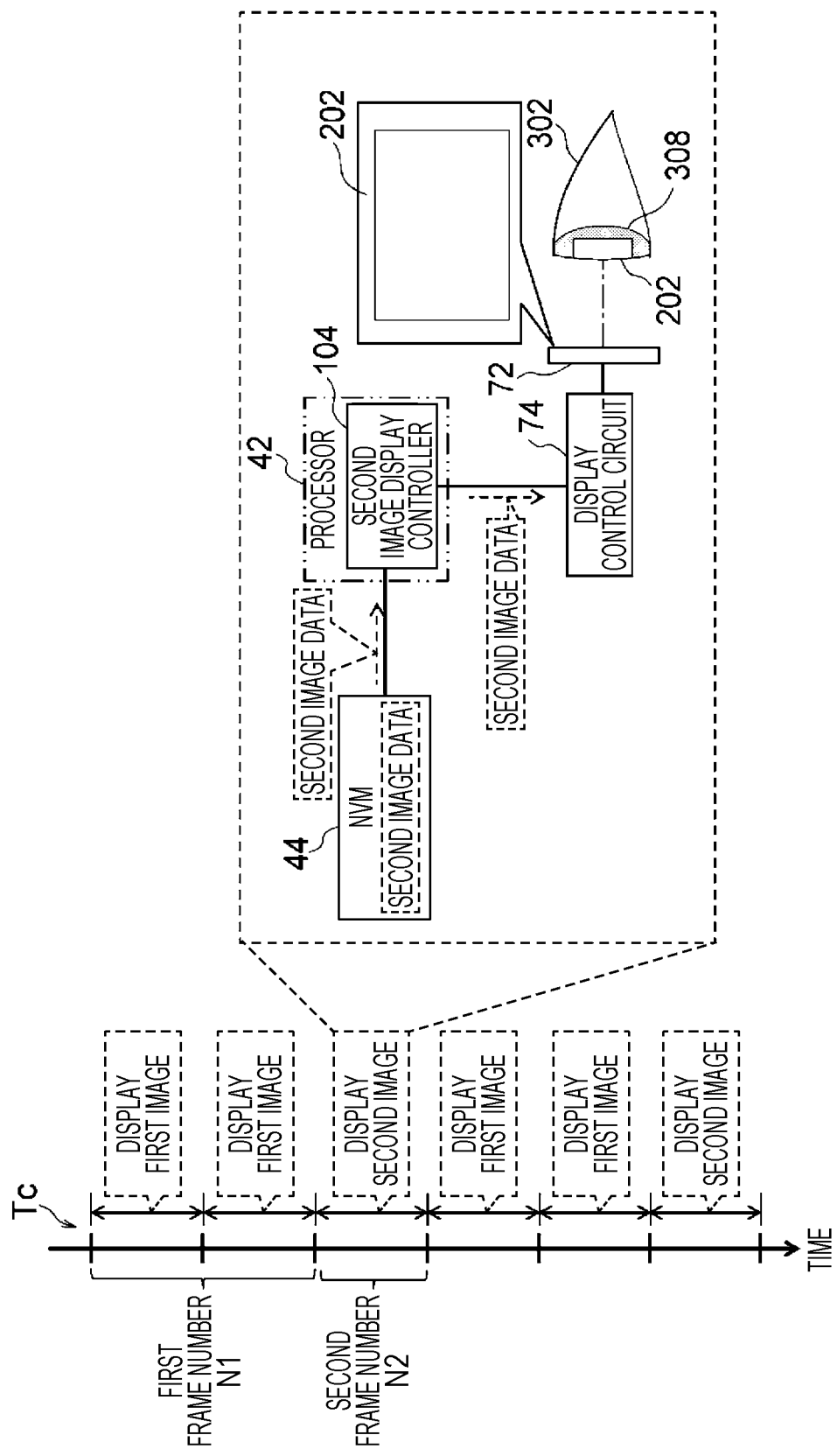
FIG. 13 is an explanatory diagram showing an example of an operation of a CPU according to the second embodiment.

For example, as shown in FIG. 13, the second image data stored in the NVM 44 is the second image 202 which is a gray image. The gray image as the second image 202 is, for example, an image in which the entire surface is a gray region. Every time the first image 200 is displayed on the display 72, the second image data indicating the second image 202 having luminance corresponding to the luminance of the first image 200 is stored in the NVM 44.

The luminance of the second image 202 is set to, for example, an average luminance or a representative luminance of a part or all of the first image 200 displayed on the display 72 before the second image 202. The frame number of the first image 200 for calculating the luminance of the second image 202 is set to a number with which the accuracy of the luminance of the second image 202 can be secured when the luminance of the second image 202 is set to a luminance corresponding to the luminance of the first image 200. In the second embodiment, the first image 200 is an example of a "second image" according to the technology of the present disclosure, and the second image 202 is an example of a "third image" according to the technology of the present disclosure.

The second image display controller 104 acquires the second image data stored in the NVM 44, and causes the display 72 to display the second image 202 which is a gray image based on the acquired second image data. When the second image 202 which is a gray image is displayed on the display 72, the second image 202 which is a gray image is projected on the surface of the cornea 308. In a state where the second image 202 which is a gray image is projected on the surface of the cornea 308, light reflected by the cornea 308 is suppressed as compared to a case where the first image 200 is projected on the surface of the cornea 308 (see FIG. 6). The gray region forming the second image 202 is an example of an "achromatic region" according to the technology of the present disclosure.

As described above, in the second embodiment, the processor 42 sets the luminance of the second image 202 indicated by the second image data in accordance with the luminance of the first image 200 indicated by the first image data. Therefore, the luminance of the second image 202 can be adjusted to a luminance corresponding to the luminance of the first image 200.

The second image 202 includes an achromatic region (for example, a gray region). Therefore, the influence of the reflected light on the gaze data can be suppressed, for example, as compared to a case where the second image 202 is a chromatic image.

Third Embodiment

Next, a third embodiment will be described.

Figure 14:
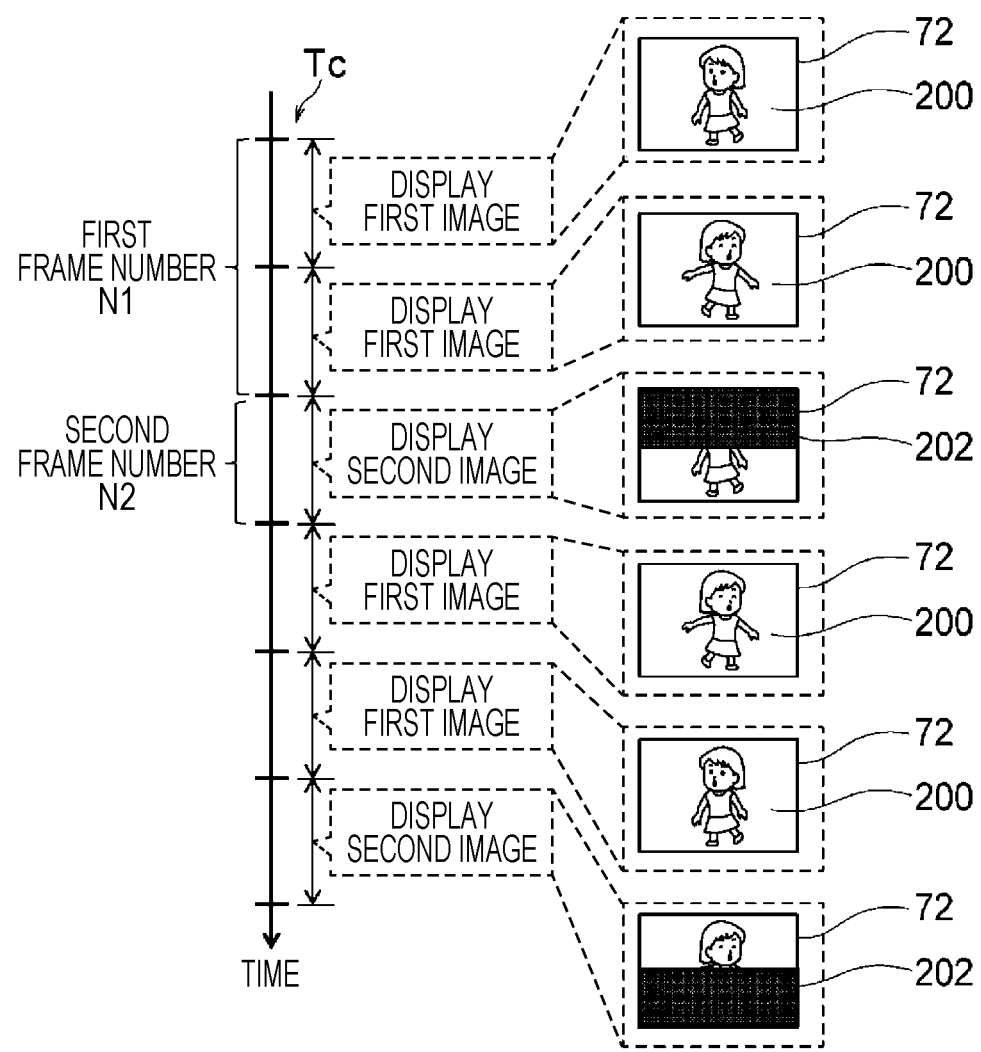
FIG. 14 is an explanatory diagram showing an example of a first image and a second image according to a third embodiment.

FIG. 14 shows the time chart Tc of an image displayed on the display 72 in the third embodiment. In the third embodiment, the second image 202 is changed from the first embodiment.

Figure 15:
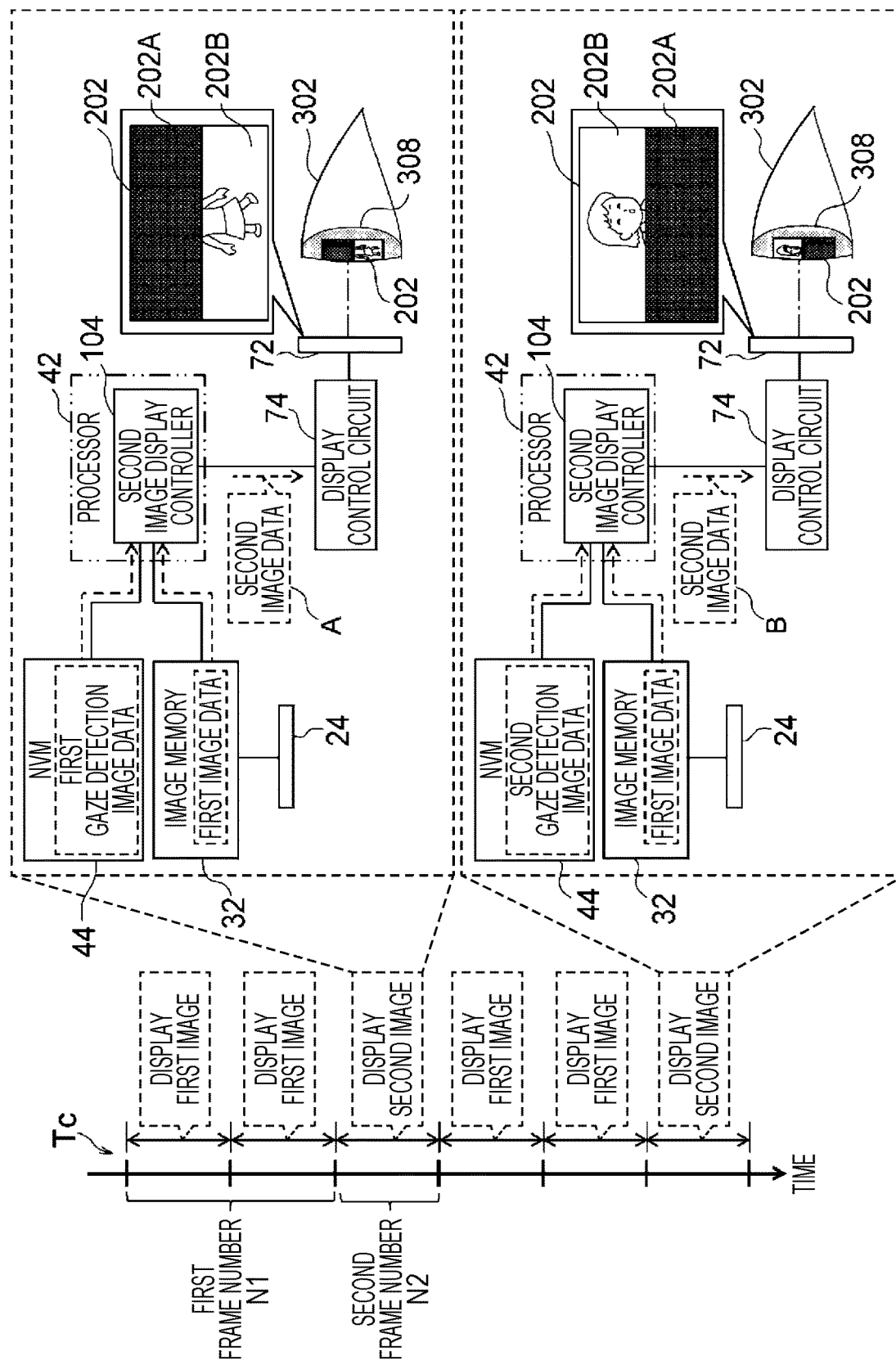
FIG. 15 is an explanatory diagram showing an example of an operation of a CPU according to the third embodiment.

As shown in FIG. 15 as an example, the first gaze detection image data and second gaze detection image data are stored in the NVM 44. The first gaze detection image data and the second gaze detection image data are image data indicating a black region 202A. The first gaze detection image data is image data for displaying the black region 202A on an upper half of the second image 202. The second gaze detection image data is image data for displaying the black region 202A in a lower half of the second image 202. The image memory 32 stores first image data obtained every time an image is captured by the image sensor 24.

The second image display controller 104 acquires the first image data from the image memory 32 for each frame of the second image 202 and selectively combines the first gaze detection image data and the second gaze detection image data with the acquired first image data. Second image data A is generated by combining the first gaze detection image data with the first image data. Similarly, second image data B is generated by combining the second gaze detection image data with the first image data.

The first image data acquired by the second image display controller 104 is, for example, the first image data indicating the first image 200 displayed on the display 72 one frame before the second image 202, but may be image data obtained by imaging the subject by the image sensor 24 for each frame of the second image 202.

The second image display controller 104 alternately generates the second image data A and the second image data B and outputs the generated second image data A or second image data B to the display 72. Accordingly, the second image 202 including the black region 202A in the upper half and an image region 202B in the lower half and the second image 202 including the black region 202A in the lower half and the image region 202B in the upper half are alternately displayed on the display 72 for each frame of the second image 202. That is, the position of the image region 202B and the position of the black region 202A are changed for each frame of the second image 202. The image region 202B is an example of an "image region" according to the technology of the present disclosure.

When the second image 202 including the black region 202A is displayed on the display 72, the second image 202 including the black region 202A is projected on the surface of the cornea 308. In the state where the second image 202 including the black region 202A is projected on the surface of the cornea 308, the light reflected by the cornea 308 is suppressed as compared with the case where the first image 200 is projected on the surface of the cornea 308 (see FIG. 6). The black region 202A included in the second image 202 is an example of an "achromatic region" according to the technology of the present disclosure.

As described above, in the third embodiment, the second image 202 includes the image region 202B obtained by imaging performed by the image sensor 24 and the black region 202A. Therefore, the influence of the reflected light on the gaze data can be suppressed, for example, as compared to a case where the entire surface of the second image 202 is the image region 202B. It is possible to secure the image quality of the image (for example, a live view image) including the first image 200 and the second image 202, for example, as compared to a case where the entire surface of the second image 202 is the black region 202A.

The processor 42 changes the position of the image region 202B and the position of the black region 202A for each frame of the second image 202. It is therefore possible to secure the image quality of the image (as an example, a live view image) including the first image 200 and the second image 202, for example, as compared to a case where the position of the image region 202B and the position of the black region 202A are fixed.

The achromatic region included in the second image 202 is the black region 202A. Therefore, the influence of the reflected light on the gaze data can be suppressed, for example, as compared to a case where the achromatic region included in the second image 202 is a gray region or a white region.

Note that the achromatic region included in the second image 202 may be a gray region. In this case, the influence of the reflected light on the gaze data can be suppressed, for example, as compared to a case where the achromatic region included in the second image 202 is a white region.

Fourth Embodiment

Next, a fourth embodiment will be described.

Figure 16:
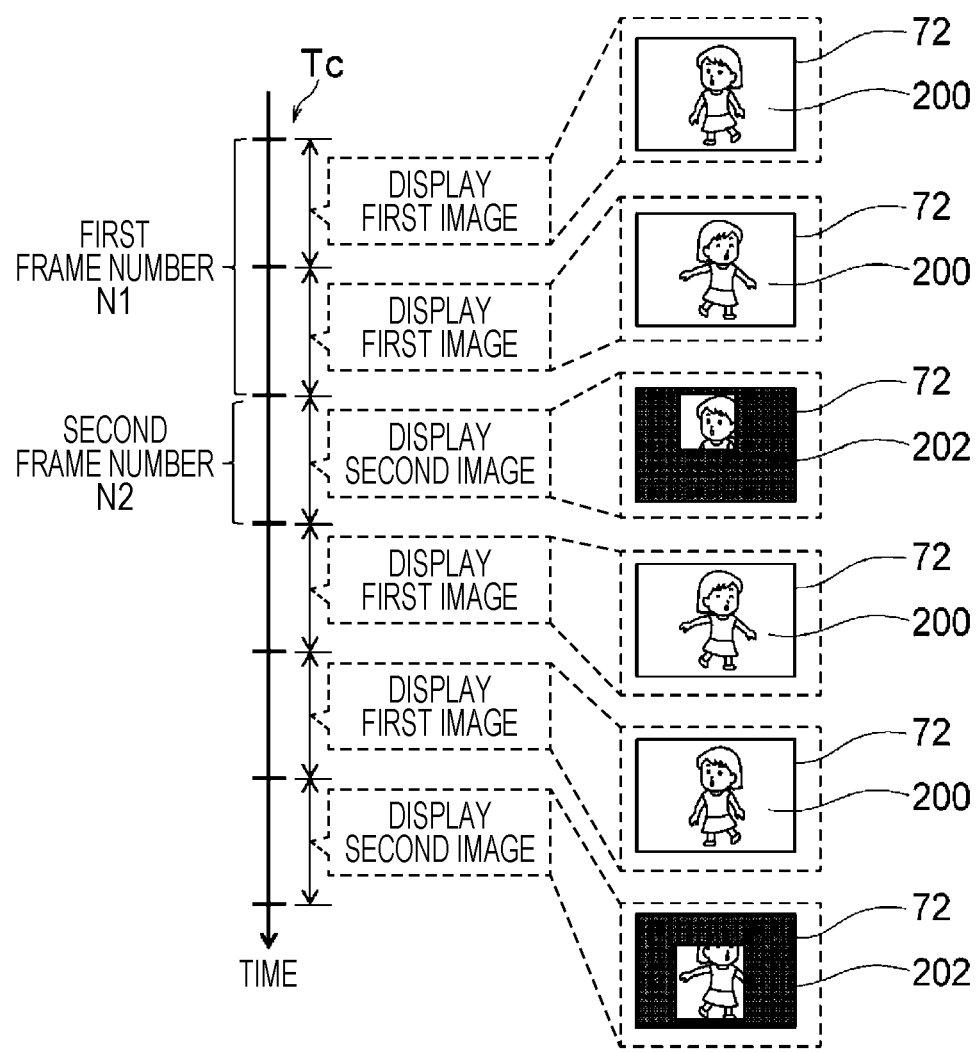
FIG. 16 is an explanatory diagram showing an example of a first image and a second image according to a fourth embodiment.

FIG. 16 shows the time chart Tc of an image displayed on the display 72 in the fourth embodiment. In the fourth embodiment, the second image 202 is changed from the first embodiment.

Figure 17:
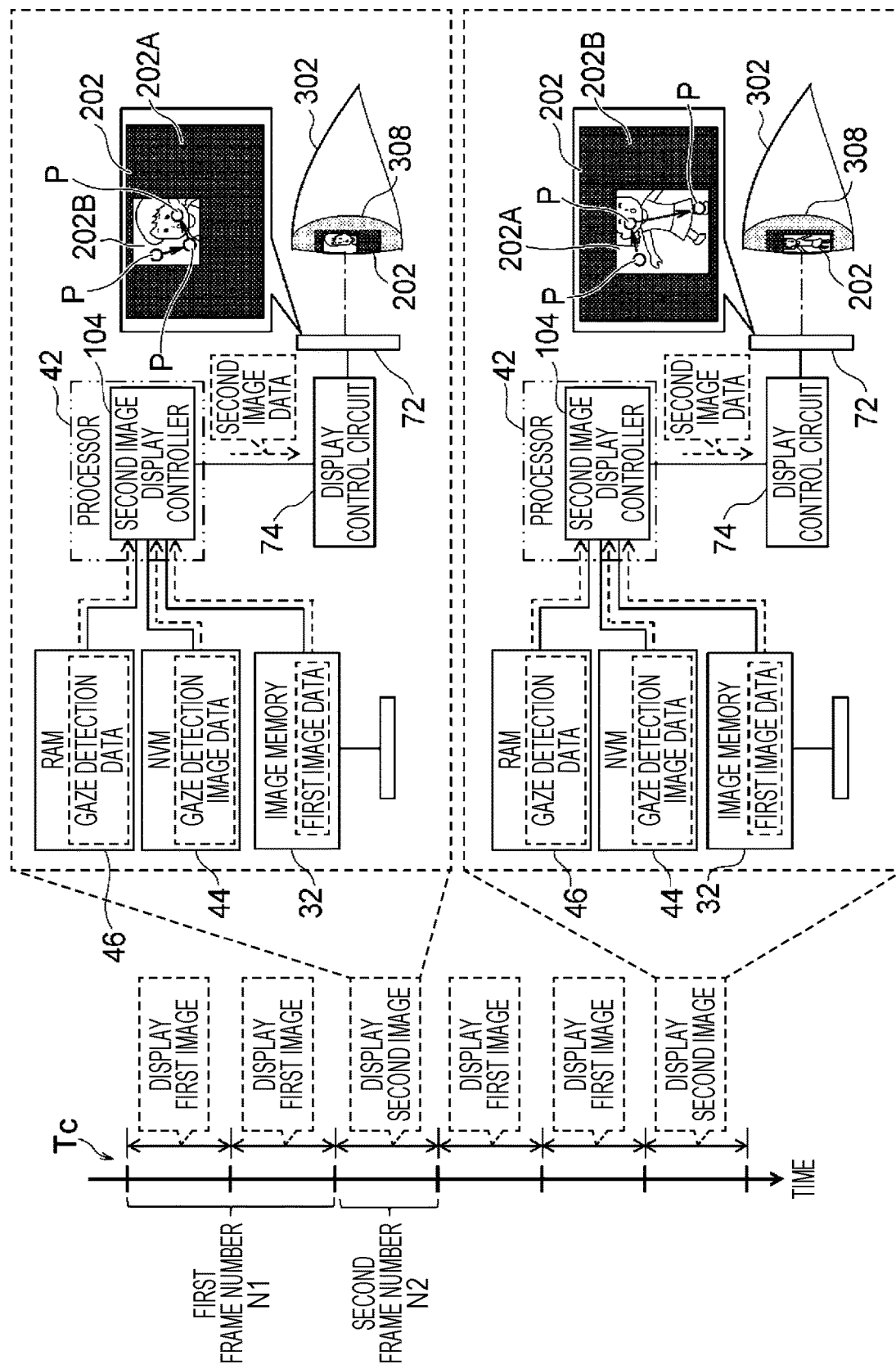
FIG. 17 is an explanatory diagram showing an example of an operation of a CPU according to the fourth embodiment.

As shown in FIG. 17 as an example, the gaze detection image data is stored in the NVM 44. The gaze detection image data is image data indicating the black region 202A. The gaze data is stored in the RAM 46 every time a gaze position is detected by the gaze sensor 86. Note that every gaze data obtained from the start of the gaze detection processing may be stored in RAM 46, or only a predetermined number of pieces of gaze data from the most recent in the order of acquisition may be stored. The predetermined number is set to, for example, a number at which the detection accuracy of the gaze position is secured. The predetermined number may be a fixed value determined in advance as a number at which the detection accuracy of the gaze position is secured by a test using an actual machine and/or a computer simulation or the like, or may be a variable value that is changed in accordance with an instruction given from the user or the like within a certain limited range. The image memory 32 stores first image data obtained every time an image is captured by the image sensor 24.

The second image display controller 104 acquires a plurality of gaze data from the RAM 46 for each frame of the second image 202. The second image display controller 104 acquires the first image data from the image memory 32. Then, the second image display controller 104 generates, for each frame of the second image 202, the second image data indicating the second image 202 in which the position of the image region 202B is set based on the plurality of gaze positions (that is, the plurality of points P) indicated by the plurality of gaze data.

The image region 202B is set at a position including the plurality of gaze positions. For example, the image region 202B may be a rectangular region including all the plurality of gaze positions. Alternatively, the image region 202B may be a circular region whose center is the average of the plurality of gaze positions and whose radius is a constant multiple of the standard deviation. The image region 202B may be a circular region whose center is the gaze position predicted from the plurality of gaze positions. As a result, the second image 202 in which the image region 202B is set in a range including the plurality of gaze positions is displayed on the display 72 for each frame of the second image 202. That is, the position of the image region 202B and the position of the black region 202A are changed in accordance with the plurality of gaze positions for each frame of the second image 202.

When the second image 202 including the black region 202A is displayed on the display 72, the second image 202 including the black region 202A is projected on the surface of the cornea 308. In the state where the second image 202 including the black region 202A is projected on the surface of the cornea 308, the light reflected by the cornea 308 is suppressed as compared with the case where the first image 200 is projected on the surface of the cornea 308 (see FIG. 6). The black region 202A included in the second image 202 is an example of an "achromatic region" according to the technology of the present disclosure.

As described above, in the fourth embodiment, the second image 202 includes the image region 202B obtained by imaging performed by the image sensor 24 and the black region 202A. Therefore, the influence of the reflected light on the gaze data can be suppressed, for example, as compared to a case where the entire surface of the second image 202 is the image region 202B. It is possible to secure the image quality of the image (for example, a live view image) including the first image 200 and the second image 202, for example, as compared to a case where the entire surface of the second image 202 is the black region 202A.

In a case where the gaze position changes for each frame of the second image 202, the processor 42 changes the position of the image region 202B and the position of the black region 202A for each frame of the second image 202. It is therefore possible to secure the image quality of the image (as an example, a live view image) including the first image 200 and the second image 202, for example, as compared to a case where the position of the image region 202B and the position of the black region 202A are fixed.

The processor 42 sets the position of the image region 202B based on the gaze position for each frame of the second image 202. It is therefore possible to secure the image quality of the region corresponding to the gaze position in the image (as an example, a live view image) including the first image 200 and the second image 202, for example, as compared to a case where the position of the image region 202B is set regardless of the gaze position.

The achromatic region included in the second image 202 is the black region 202A. Therefore, the influence of the reflected light on the gaze data can be suppressed, for example, as compared to a case where the achromatic region included in the second image 202 is a gray region or a white region.

Note that the achromatic region included in the second image 202 may be a gray region. In this case, the influence of the reflected light on the gaze data can be suppressed, for example, as compared to a case where the achromatic region included in the second image 202 is a white region.

Fifth Embodiment

Next, a fifth embodiment will be described.

FIGS. 18 to 21 show a fifth embodiment. The fifth embodiment is changed as follows from the first embodiment.

Figure 18:
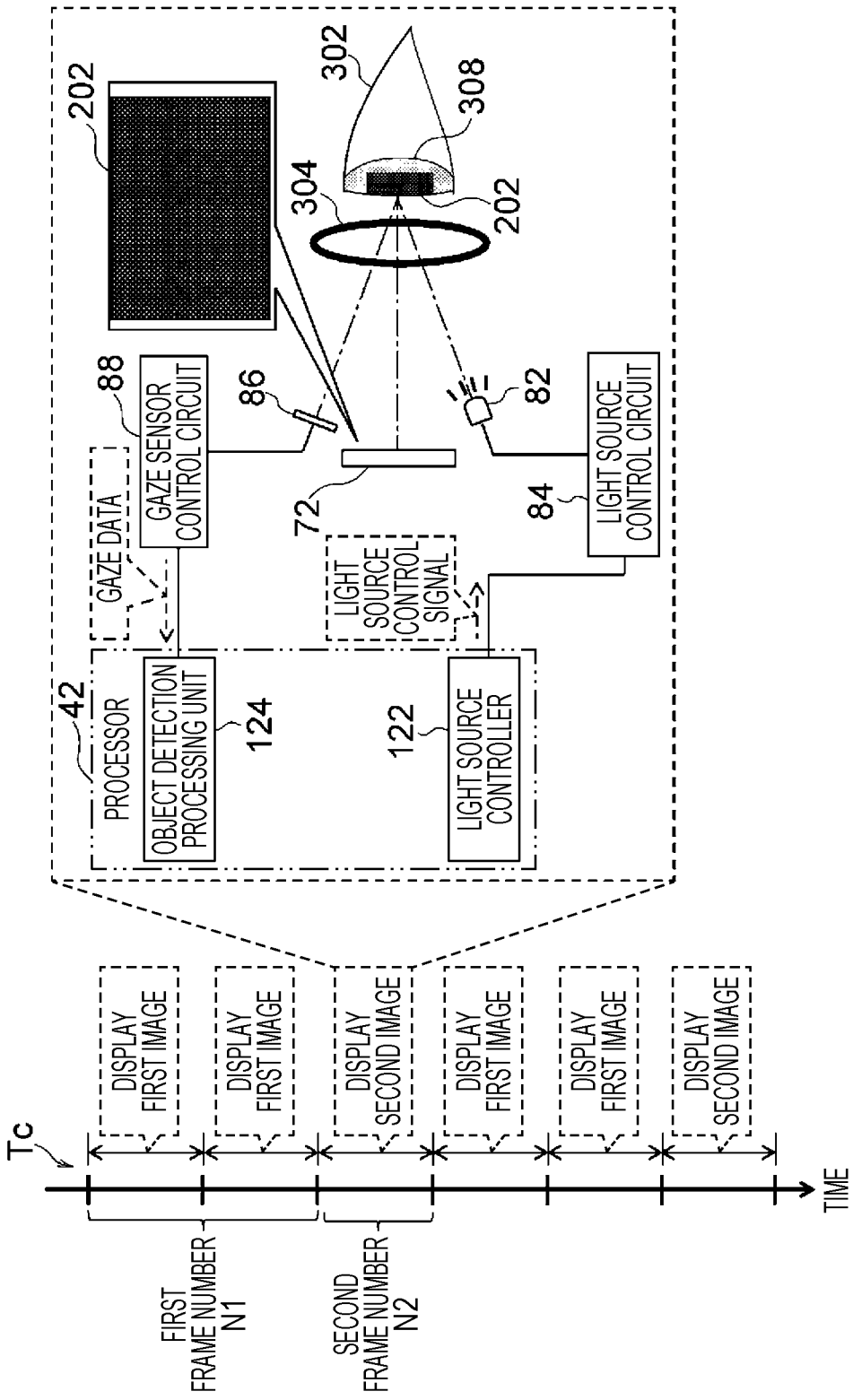
FIG. 18 is an explanatory diagram showing an example of a first operation of a CPU according to a fifth embodiment.

As shown in FIG. 18 as an example, the processor 42 operates as a light source controller 122 and an object detection processing unit 124. The light source controller 122 controls the light source 82 via the light source control circuit 84 by outputting a light source control signal to the light source control circuit 84. In a case where the second image 202 which is a black image is displayed on the display 72, the light source controller 122 causes the light source 82 to emit near-infrared light.

The object detection processing unit 124 acquires the gaze data obtained by imaging performed by the gaze sensor 86. Then, the object detection processing unit 124 determines whether an object 304 is present at a position through which the near-infrared light passes, based on the acquired gaze data. The object 304 is, for example, an eyeglass and/or a contact lens. The object 304 may be any object as long as the object has a property of absorbing near-infrared light, for example. In a case where the object 304 is, for example, an eyeglass and/or a contact lens, the object 304 is located between the cornea 308 and the gaze sensor 86 as an example of a position through which the near-infrared light passes. The object 304 may be disposed at any position as long as the object 304 is disposed at a position through which the near-infrared light emitted from the light source 82 passes. The object 304 is an example of an "object" according to the technology of the present disclosure.

When the intensity of the reflected light indicated by the gaze data (that is, the reflected light of the near-infrared light emitted from the light source 82 and reflected by the cornea 308) is equal to or less than a threshold value, for example, the object detection processing unit 124 determines that the object 304 is present at a position through which the near-infrared light passes. The threshold value is determined based on, for example, the intensity of the reflected light when the near-infrared light emitted from the light source 82 passes through the eyeglass and/or the contact lens and the reflected light of the near-infrared light reflected by the cornea 308 passes through the eyeglass and/or the contact lens again. The threshold value may be a fixed value or may be a variable value that is changed in accordance with an instruction given from the user or the like.

Figure 19:
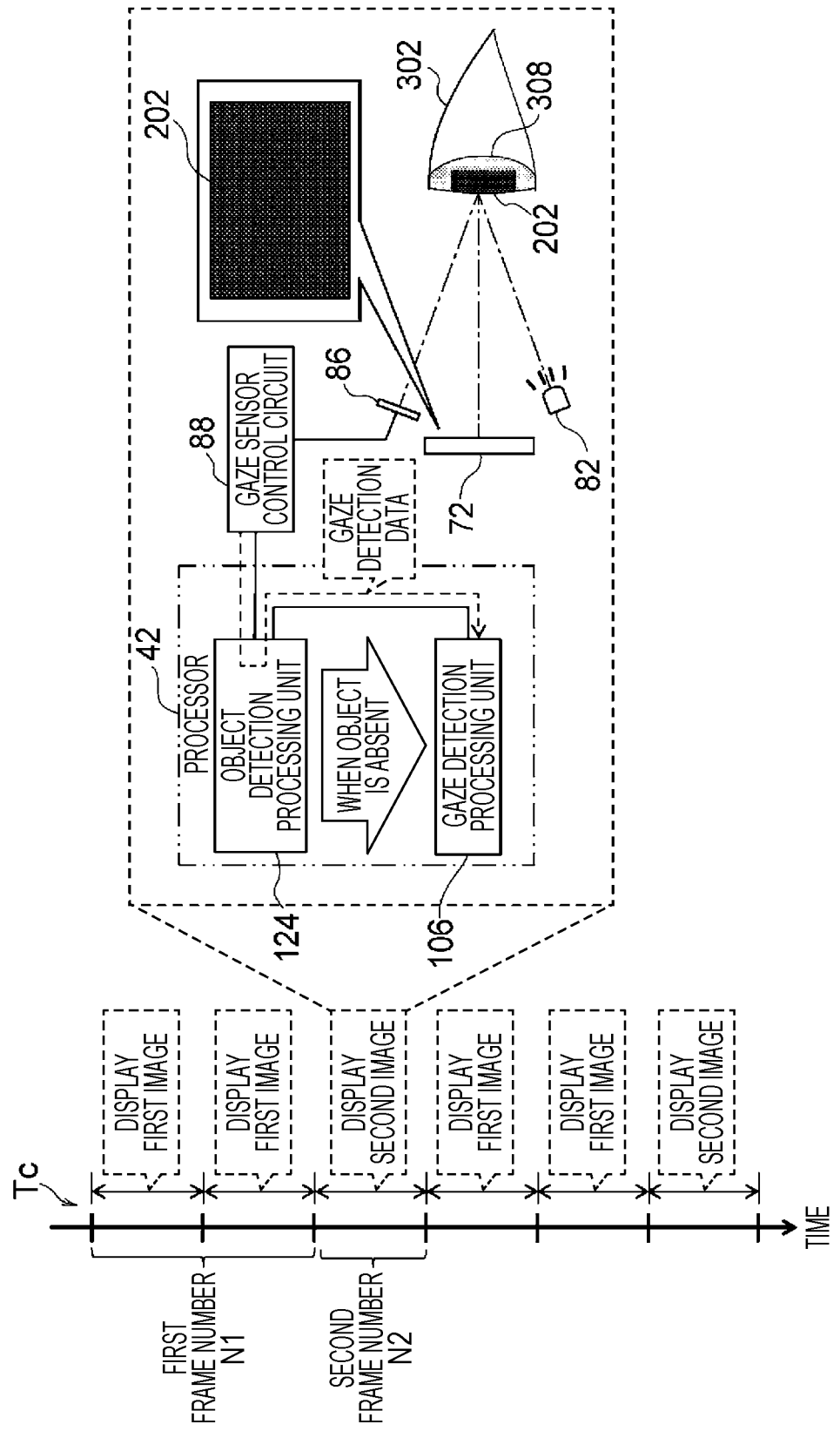
FIG. 19 is an explanatory diagram showing an example of a second operation of the CPU according to the fifth embodiment.

As shown in FIG. 19 as an example, when the object detection processing unit 124 determines that the object 304 is absent, the gaze detection processing unit 106 detects the gaze position with respect to the display 72 based on the gaze data acquired by the object detection processing unit 124 (that is, the gaze data when the black image is displayed).

Figure 20:
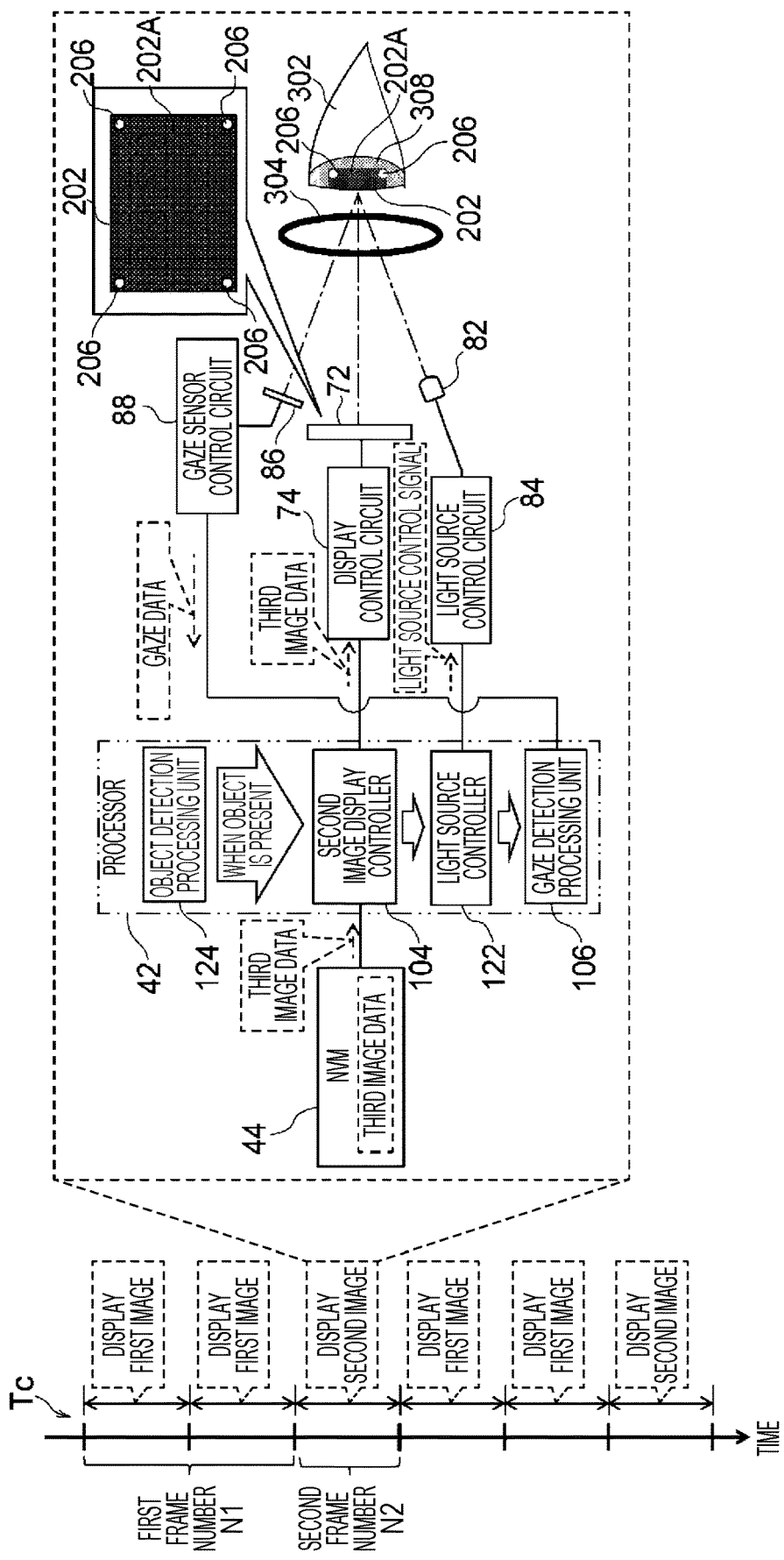
FIG. 20 is an explanatory diagram showing an example of a third operation of the CPU according to the fifth embodiment.

As shown in FIG. 20 as an example, when the object detection processing unit 124 determines that the object 304 is present, the second image display controller 104 causes the display 72 to display the second image 202 which is a patterned black image. Specifically, the third image data indicating a patterned black image for detecting the gaze position is stored in the NVM 44 in advance. The second image display controller 104 acquires the third image data stored in the NVM 44 and outputs the acquired third image data to the display 72. Accordingly, the second image 202 which is a patterned black image is displayed on the display 72.

The patterned black image is an image having a plurality of patterns 206 and the black region 202A. For example, the plurality of patterns 206 are displayed in a dot shape at four corners of the black region 202A. The plurality of patterns 206 are formed by visible light. In this way, the third image data is image data including the patterns 206 for detecting the gaze position with respect to the display 72. The third image data is an example of the "second gaze detection image data" according to the technology of the present disclosure.

When the second image 202 which is a patterned black image is displayed on the display 72, the plurality of patterns 206 and the black regions 202A are projected on the surface of the cornea 308. In a state where the second image 202 which is a patterned black image is projected on the surface of the cornea 308, light reflected by the cornea 308 is suppressed as compared to a case where the first image 200 is projected on the surface of the cornea 308 (see FIG. 6).

In a case where the second image 202 which is a patterned black image is displayed on the display 72, the light source controller 122 stops the emission of the near-infrared light from the light source 82. The gaze sensor 86 has sensitivity to, for example, visible light and near-infrared light.

The gaze detection processing unit 106 acquires the gaze data obtained by imaging performed by the gaze sensor 86 (that is, gaze data when a patterned black image is displayed). Then, the gaze detection processing unit 106 detects the gaze position with respect to the display 72 based on the acquired gaze data. In the method of detecting the gaze position based on a patterned black image, the gaze position with respect to the display 72 is detected based on the plurality of patterns 206 projected on the surface of the cornea 308. The method of detecting the gaze position with respect to the display 72 based on the plurality of patterns 206 projected on the surface of the cornea 308 is the same as the method described in FIG. 3.

Figure 21:
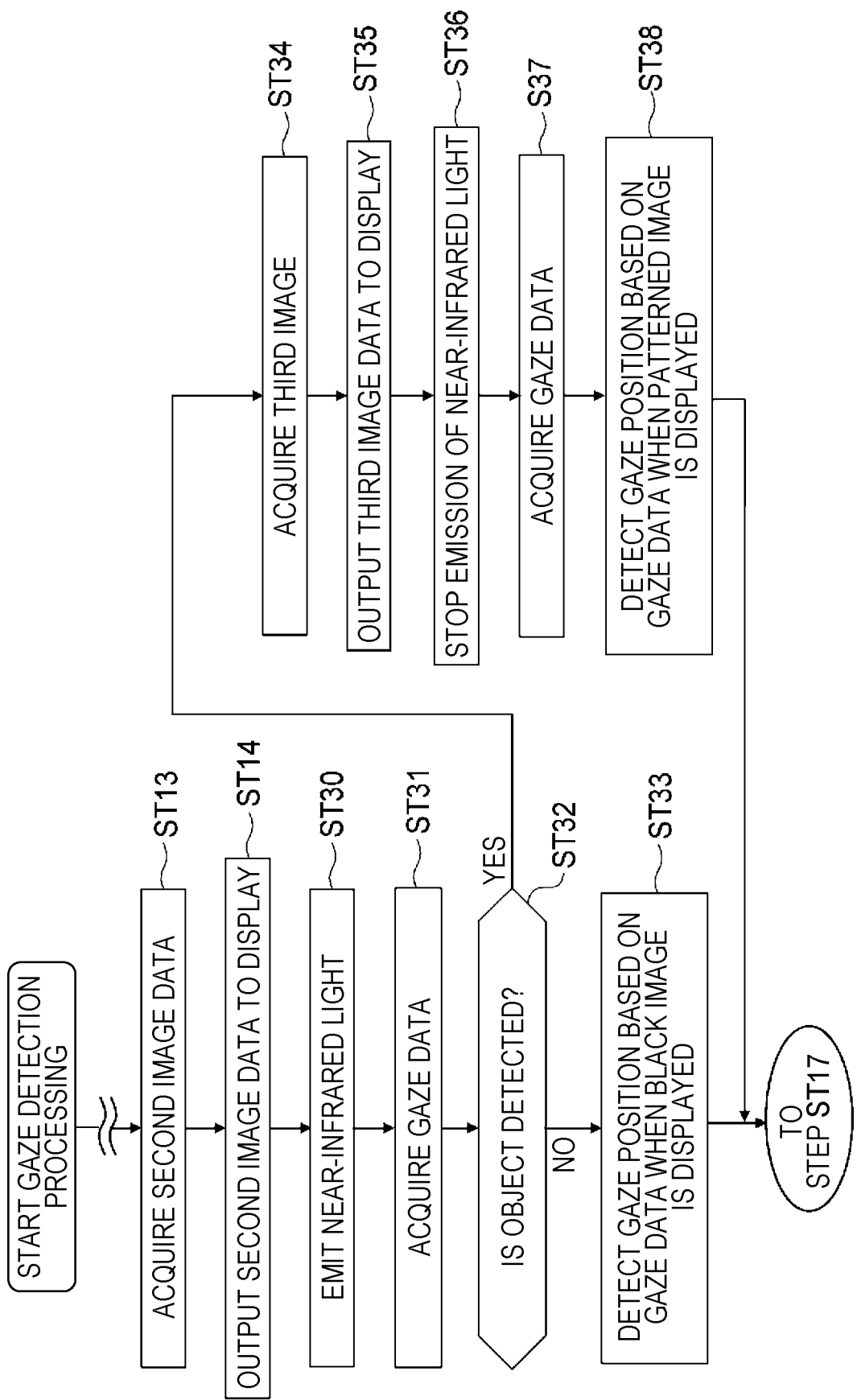
FIG. 21 is a flowchart showing an example of a flow of gaze detection processing according to the fifth embodiment.

Next, an action of the imaging device 10 according to the fifth embodiment will be described with reference to FIG. 21. FIG. 21 shows an example of a flow of gaze detection processing according to the fifth embodiment.

In the gaze detection processing according to the fifth embodiment shown in FIG. 21, steps ST30 to ST38 are executed in the gaze detection processing according to the first embodiment described above (see FIG. 10). Step ST30 is executed after the processing of step ST14 is executed. In the gaze detection processing according to the fifth embodiment shown in FIG. 21, the processing in and before step ST14 is similar to the gaze detection processing according to the first embodiment described above.

In step ST30, the light source controller 122 causes the light source 82 to emit near-infrared light. After the processing of step ST30 is executed, the gaze detection processing proceeds to step ST31.

In step ST31, the object detection processing unit 124 acquires the gaze data obtained by imaging performed by the gaze sensor 86. After the processing of step ST31 is executed, the gaze detection processing proceeds to step ST32.

In step ST32, the object detection processing unit 124 determines whether the object 304 is present at a position through which the near-infrared light passes, based on the gaze data acquired in step ST31. When the object 304 is absent at a position through which the near-infrared light passes in step ST32, the determination is negative, and the gaze detection processing proceeds to step ST33. When the object 304 is present at a position through which the near-infrared light passes in step ST32, the determination is positive, and the gaze detection processing proceeds to step ST34.

In step ST33, the gaze detection processing unit 106 detects the gaze position with respect to the display 72 based on the gaze data acquired in step ST31 (that is, the gaze data when the black image is displayed). After the processing of step ST33 is executed, the gaze detection processing proceeds to step ST17 (see FIG. 10). In the gaze detection processing according to the fifth embodiment shown in FIG. 21, the processing in and after step ST17 is similar to the gaze detection processing according to the first embodiment described above.

In step ST34, the second image display controller 104 acquires the third image data stored in the NVM 44. After the processing of step ST34 is executed, the gaze detection processing proceeds to step ST35.

In step ST35, the second image display controller 104 outputs the third image data acquired in step ST34 to the display 72. Accordingly, the second image 202 which is a patterned black image is displayed on the display 72. After the processing of step ST35 is executed, the gaze detection processing proceeds to step ST36.

In step ST36, the light source controller 122 stops the emission of the near-infrared light from the light source 82. After the processing of step ST36 is executed, the gaze detection processing proceeds to step ST37.

In step ST37, the gaze detection processing unit 106 acquires the gaze data obtained by imaging performed by the gaze sensor 86 (that is, the gaze data when a patterned black image is displayed). After the processing of step ST37 is executed, the gaze detection processing proceeds to step ST38.

In step ST38, the gaze detection processing unit 106 detects the gaze position with respect to the display 72 based on the gaze data acquired in step ST37. After the processing of step ST38 is executed, the gaze detection processing proceeds to step ST17 (see FIG. 10).

As described above, in the fifth embodiment, when the object 304 is absent, the processor 42 outputs the second image data indicating the second image 202 which is a black image to the display 72 in a state where the near-infrared light is emitted from the light source 82. Therefore, the gaze position can be detected in a period in which the black image indicated by the second image data is displayed on the display 72.

On the other hand, when the object 304 is present, the processor 42 outputs the third image data indicating the second image 202 which is a patterned black image to the display 72 in a state where the emission of the near-infrared light from the light source 82 is stopped. Therefore, even when the object 304 is present, the gaze position can be detected based on the patterned black image.

The third image data is image data including the patterns 206 for detecting the gaze position with respect to the display 72. Therefore, even when the second image 202 including the black region 202A is displayed on the display 72, the gaze position can be detected based on the patterns 206.

Sixth Embodiment

Next, a sixth embodiment will be described.

FIGS. 22 to 25 show a sixth embodiment. The sixth embodiment is changed as follows from the fifth embodiment. Note that, in an example shown in the sixth embodiment, the object 304 is also present at a position through which near-infrared light passes.

Figure 22:
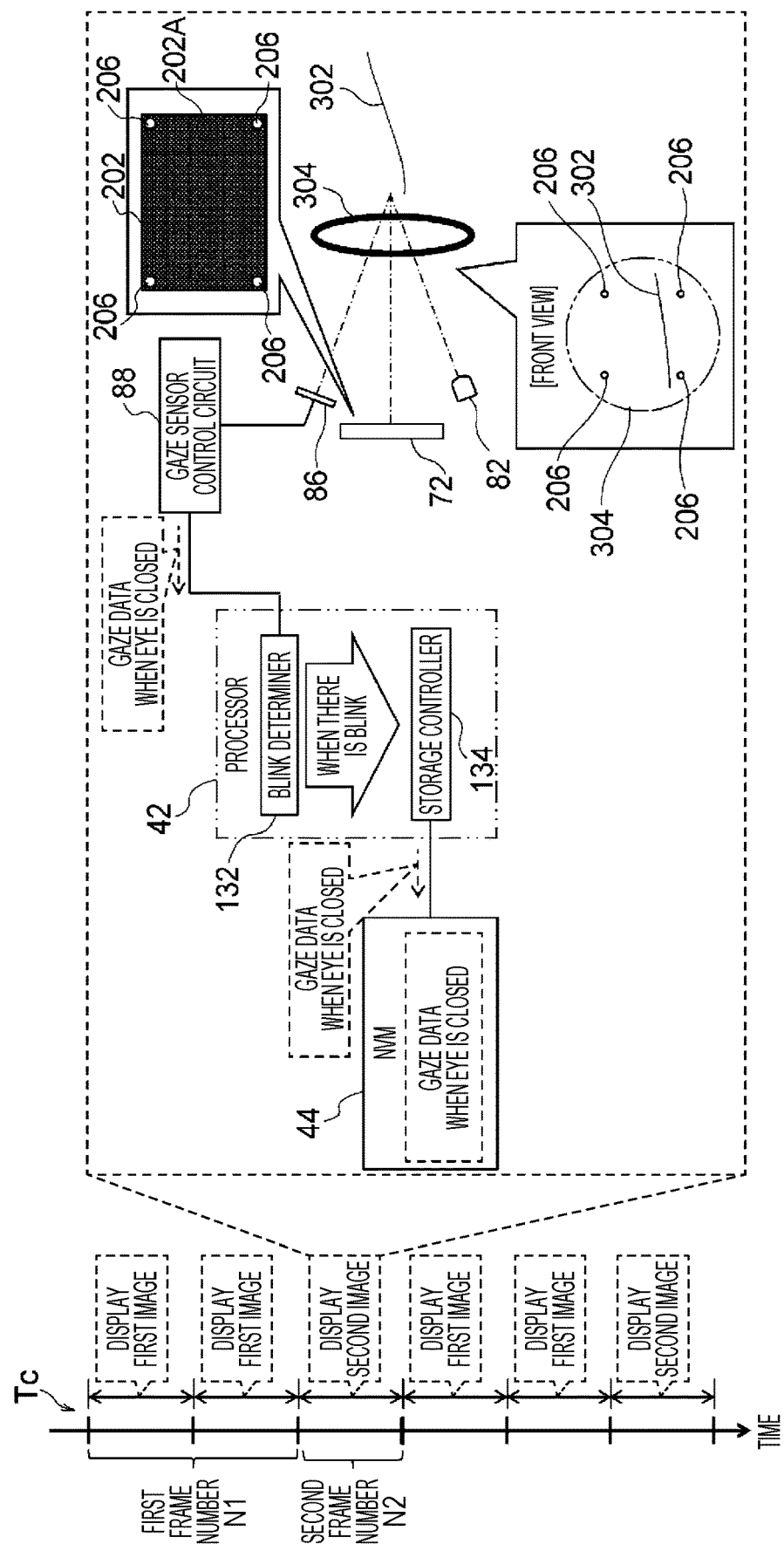
FIG. 22 is an explanatory diagram showing an example of a first operation of a CPU according to a sixth embodiment.

FIG. 22 shows, as an example, a case where the user is blinking (that is, the eye 302 is closed) in a state where the second image 202 which is a patterned black image is displayed on the display 72. As shown in FIG. 22 as an example, the processor 42 operates as a blink determiner 132 and a storage controller 134.

The blink determiner 132 acquires gaze data obtained by imaging performed by the gaze sensor 86. Then, the blink determiner 132 determines whether the user is blinking (that is, whether the eye 302 is closed) based on the acquired gaze data. The determination of whether the user is blinking is implemented by, for example, executing image recognition processing by an AI method and/or image processing such as pattern matching.

When the blink determiner 132 determines that the user is blinking, the storage controller 134 stores the gaze data acquired by the blink determiner 132 (that is, the gaze data when the eye 302 is closed) in the NVM 44. Note that, when the user is closing the eye 302 in a state where the second image 202 which is a patterned black image is displayed on the display 72, the plurality of patterns 206 are projected on the surface of the object 304.

Figure 23:
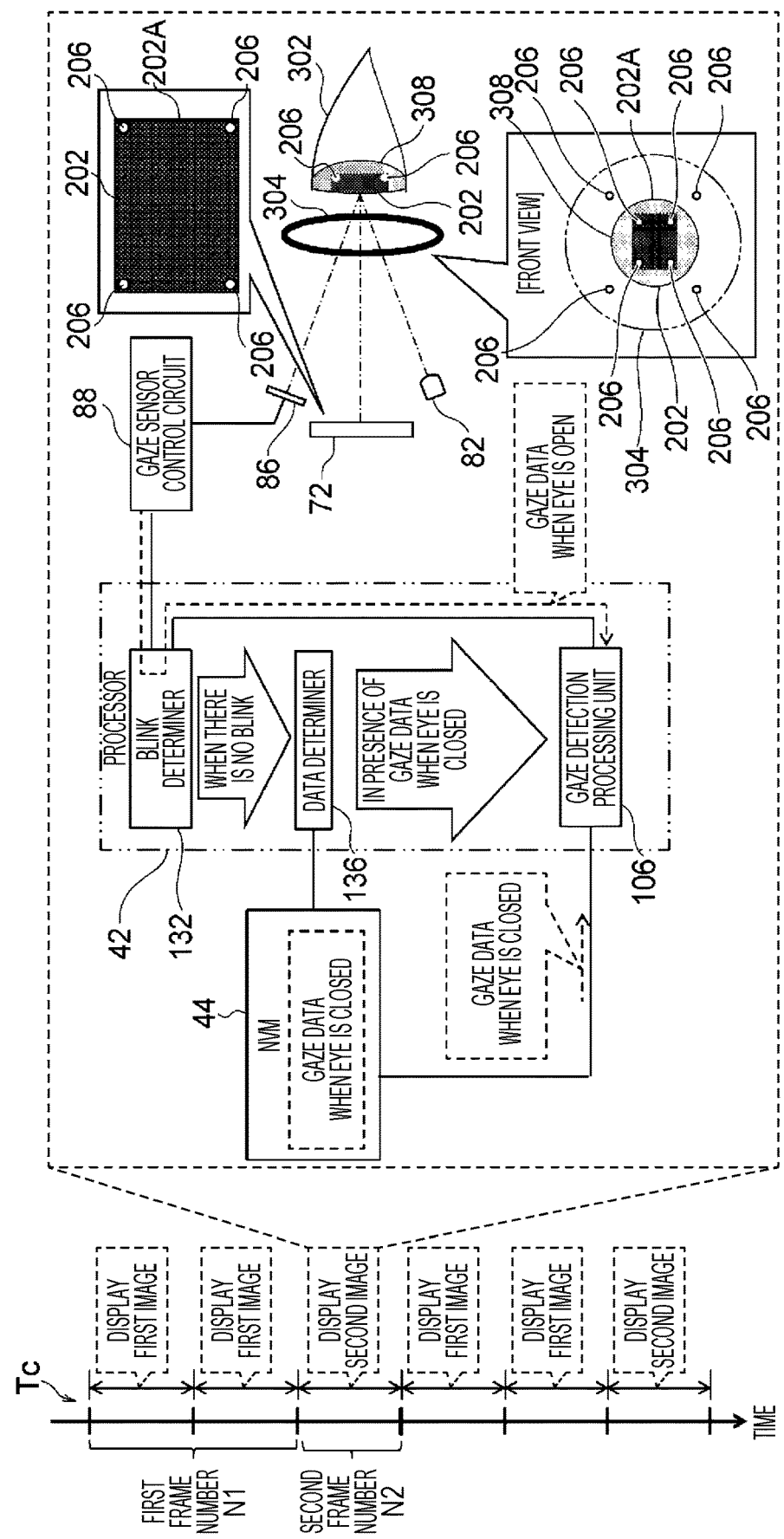
FIG. 23 is an explanatory diagram showing an example of a second operation of the CPU according to the sixth embodiment.

FIG. 23 shows, as an example, a case where the user is not blinking (that is, the eye 302 is open) in a state where the second image 202 which is a patterned black image is displayed on the display 72. FIG. 23 shows, as an example, a case where the gaze data when the eye 302 is closed is stored in the NVM 44.

As shown in FIG. 23 as an example, the processor 42 operates as a data determiner 136. The data determiner 136 determines whether the gaze data when the eye 302 is closed is stored in the NVM 44.

When the blink determiner 132 determines that the user is not blinking and the data determiner 136 determines that the gaze data when the eye 302 is closed is stored in the NVM 44, the gaze detection processing unit 106 detects the gaze position with respect to the display 72 based on a degree of difference between the gaze data when the eye 302 is closed stored in the NVM 44 and the gaze data when the eye 302 is open acquired by the blink determiner 132.

For example, the gaze detection processing unit 106 calculates a difference between the gaze data when the eye 302 is closed and the gaze data when the eye 302 is open. By calculating the difference between the gaze data when the eye 302 is closed and the gaze data when the eye 302 is open, the plurality of patterns 206 projected on the surface of the object 304 are canceled out, and an image showing the plurality of patterns 206 projected on the surface of the cornea 308 is obtained. Then, the gaze detection processing unit 106 detects the gaze position with respect to the display 72 based on the acquired difference. That is, the gaze detection processing unit 106 detects the gaze position with respect to the display 72 based on the plurality of patterns 206 projected on the surface of the cornea 308.

The gaze data acquired when the object 304 is present and the eye 302 is closed is an example of "first gaze data" according to the technology of the present disclosure. The gaze data acquired when the object 304 is present and the eye 302 is open is an example of "second gaze data" according to the technology of the present disclosure.

Figure 24:
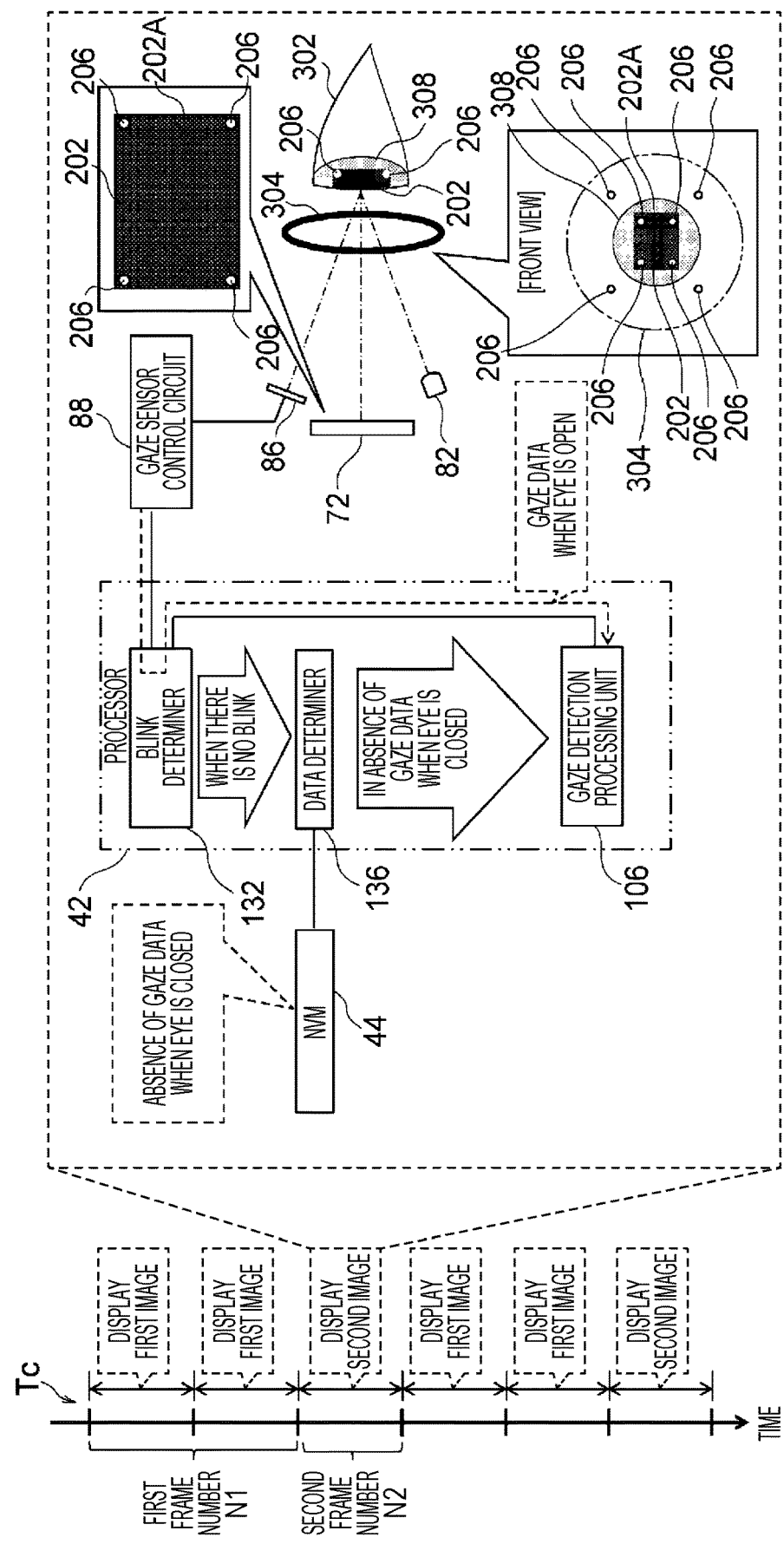
FIG. 24 is an explanatory diagram showing an example of a third operation of the CPU according to the sixth embodiment.

FIG. 24 shows, as an example, a case where the gaze data when the user is not blinking (that is, the eye 302 is open) but the eye 302 is closed in a state where the second image 202 which is a patterned black image is displayed on the display 72 is not stored in the NVM 44.

As shown in FIG. 24 as an example, when the blink determiner 132 determines that the user is not blinking and the data determiner 136 determines that the gaze data when the eye 302 is closed is not stored in the NVM 44, the gaze detection processing unit 106 detects the gaze position with respect to the display 72 based on the gaze data when the eye 302 is open acquired by the blink determiner 132.

Figure 25:
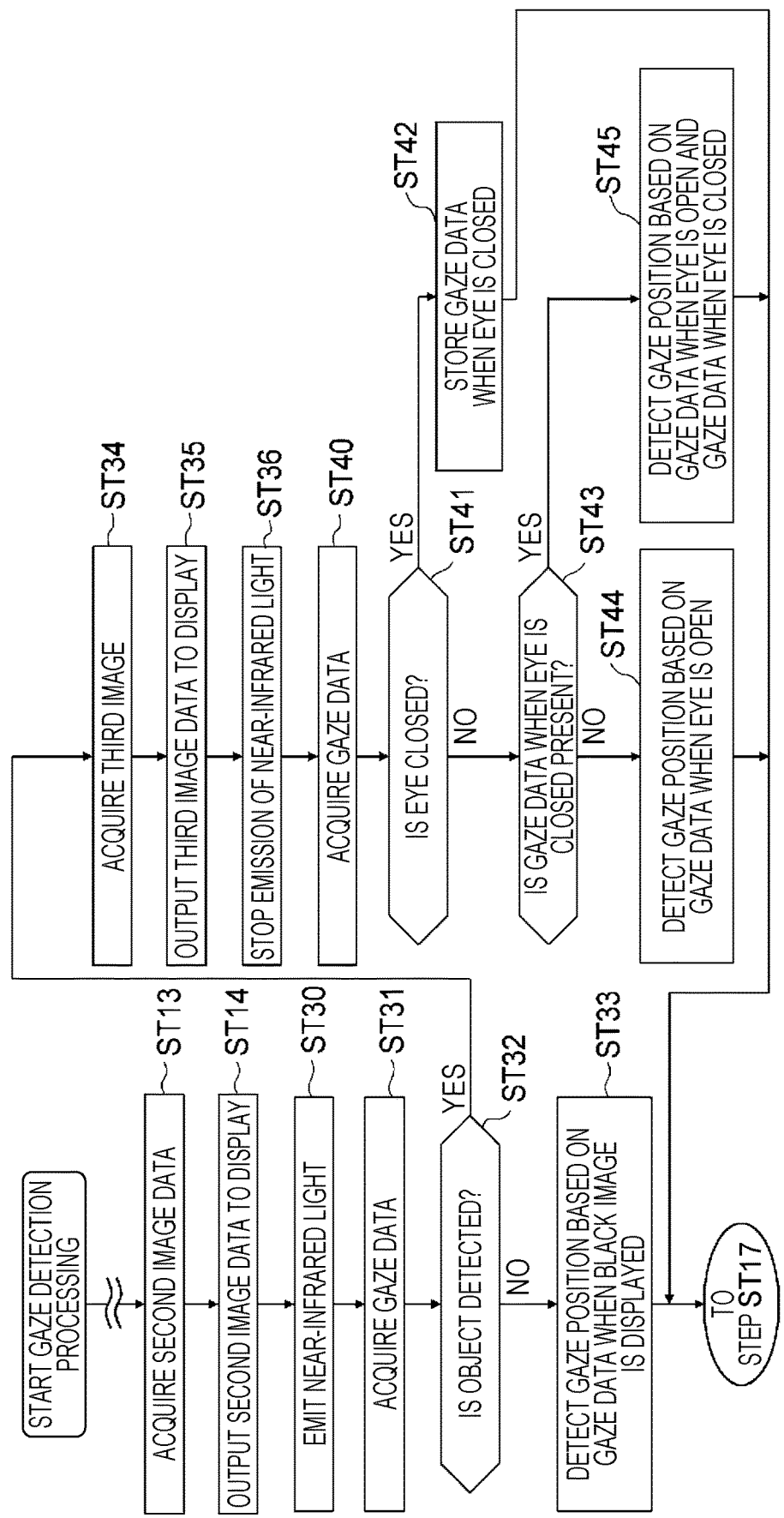
FIG. 25 is a flowchart showing an example of a flow of gaze detection processing according to the sixth embodiment.

Next, an action of the imaging device 10 according to the sixth embodiment will be described with reference to FIG. 25. FIG. 25 shows an example of a flow of gaze detection processing according to the sixth embodiment.

In the gaze detection processing according to the sixth embodiment shown in FIG. 25, steps ST40 to ST45 are executed in the gaze detection processing according to the fifth embodiment described above (see FIG. 17). Step ST40 is executed after step ST36. In the gaze detection processing according to the sixth embodiment shown in FIG. 25, the processing in and before step ST36 is similar to the gaze detection processing according to the fifth embodiment described above.

In step ST40, the blink determiner 132 acquires the gaze data obtained by imaging performed by the gaze sensor 86. After the processing of step ST40 is executed, the gaze detection processing proceeds to step ST41.

In step ST41, the blink determiner 132 determines whether the user is blinking (that is, whether the eye 302 is closed) based on the gaze data acquired in step ST40. When the user is blinking (that is, when the eye 302 is closed) in step ST41, the determination is positive, and the gaze detection processing proceeds to step ST42. When the user is not blinking (that is, when the eye 302 is open) in step ST41, the determination is negative, and the gaze detection processing proceeds to step ST43.

In step ST42, the storage controller 134 stores the gaze data acquired in step ST40 (that is, the gaze data when the eye 302 is closed) in the NVM 44. After the processing of step ST42 is executed, the gaze detection processing proceeds to step ST17 (see FIG. 10). In the gaze detection processing according to the sixth embodiment shown in FIG. 25, the processing in and after step ST17 is similar to the gaze detection processing according to the first embodiment described above.

In step ST43, the data determiner 136 determines whether the gaze data when the eye 302 is closed is stored in the NVM 44. In a case where the gaze data when the eye 302 is closed is not stored in the NVM 44 in step ST43, a negative determination is made, and the gaze detection processing proceeds to step ST44. In a case where the gaze data when the eye 302 is closed is stored in the NVM 44 in step ST43, the determination is positive, and the gaze detection processing proceeds to step ST45.

In step ST44, the gaze detection processing unit 106 detects the gaze position with respect to the display 72 based on the gaze data when the eye 302 is open acquired in step ST40. After the processing of step ST45 is executed, the gaze detection processing proceeds to step ST17 (see FIG. 10).

In step ST45, the gaze detection processing unit 106 detects the gaze position with respect to the display 72 based on a degree of difference between the gaze data when the eye 302 is closed stored in NVM 44 and the gaze data when the eye 302 is open acquired in step ST40. After the processing of step ST43 is executed, the gaze detection processing proceeds to step ST17 (see FIG. 10).

As described above, in the sixth embodiment, the processor 42 detects the gaze position based on the degree of difference between the gaze data acquired when the object 304 is present and the eye 302 is closed and the gaze data acquired when the object 304 is present and the eye 302 is open. As a result, even when the object 304 is present, the gaze position can be detected based on the visible light of the patterns 206 reflected by the cornea 308.

Seventh Embodiment

Next, a seventh embodiment will be described.

Figure 26:
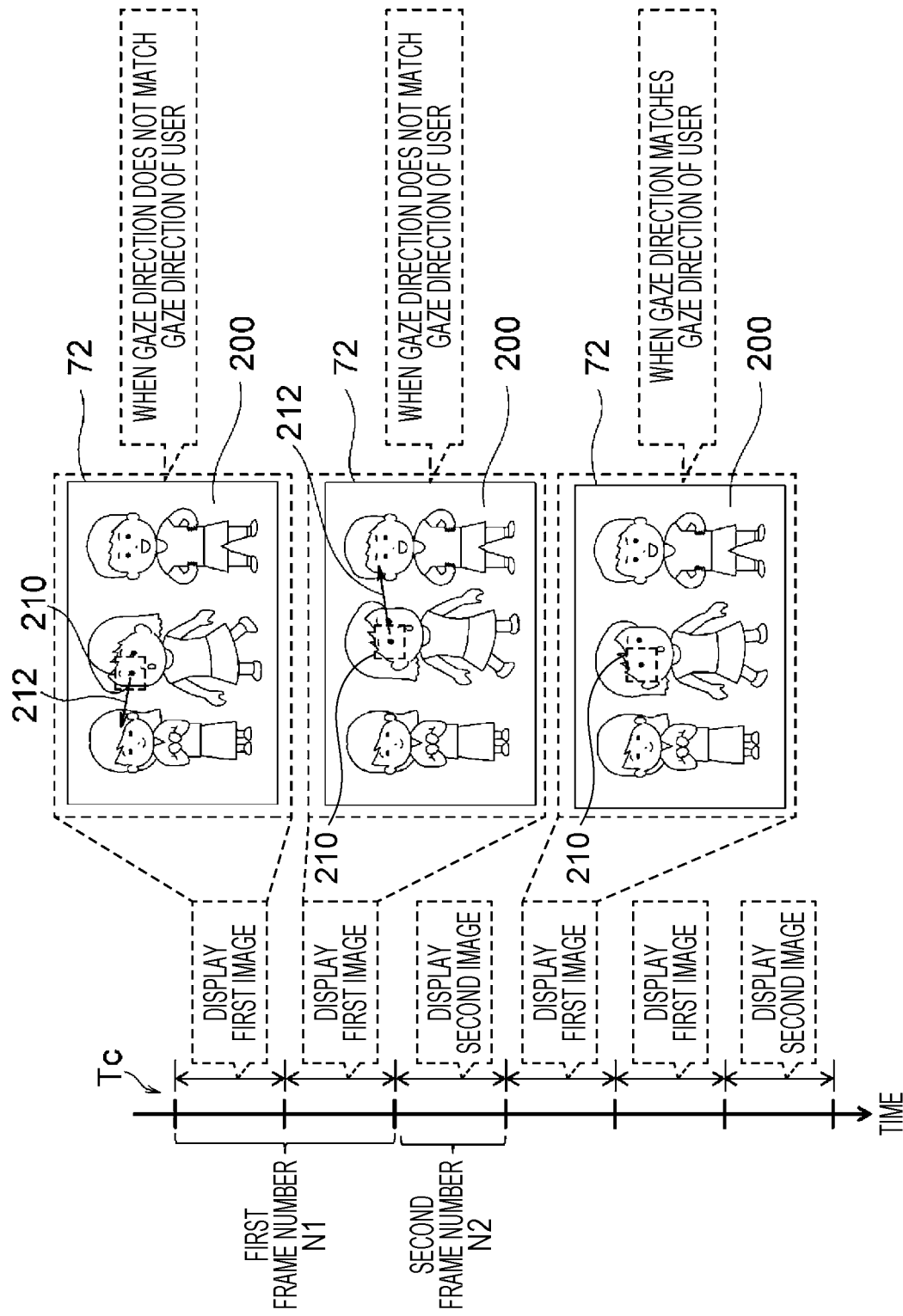
FIG. 26 is an explanatory diagram showing an example of a first image according to a seventh embodiment.

FIG. 26 shows an example of the first image 200 displayed on the display 72 in the seventh embodiment. The first image 200 displayed on the display 72 includes the first image 200 when gaze directions of the subject appearing as an image in the first image 200 and the user do not match each other (that is, the eyes do not meet) and the first image 200 when the gaze directions of the subject appearing as an image in the first image 200 and the user match each other (that is, the eyes meet).

A frame 210 indicates the gaze position of the user with respect to the display 72, and an arrow 212 indicates the gaze direction of the subject appearing as an image in the first image 200. A case where the arrow 212 deviates from the frame 210 is a case where the gaze directions of the subject appearing as an image in the first image 200 and the user do not match each other, and a case where the arrow 212 fits in the frame 210 is a case where the gaze directions of the subject appearing as an image in the first image 200 and the user match each other. The size of the frame 210 is set to a size that can secure the detection accuracy of whether the gaze directions match each other.

Figure 27:
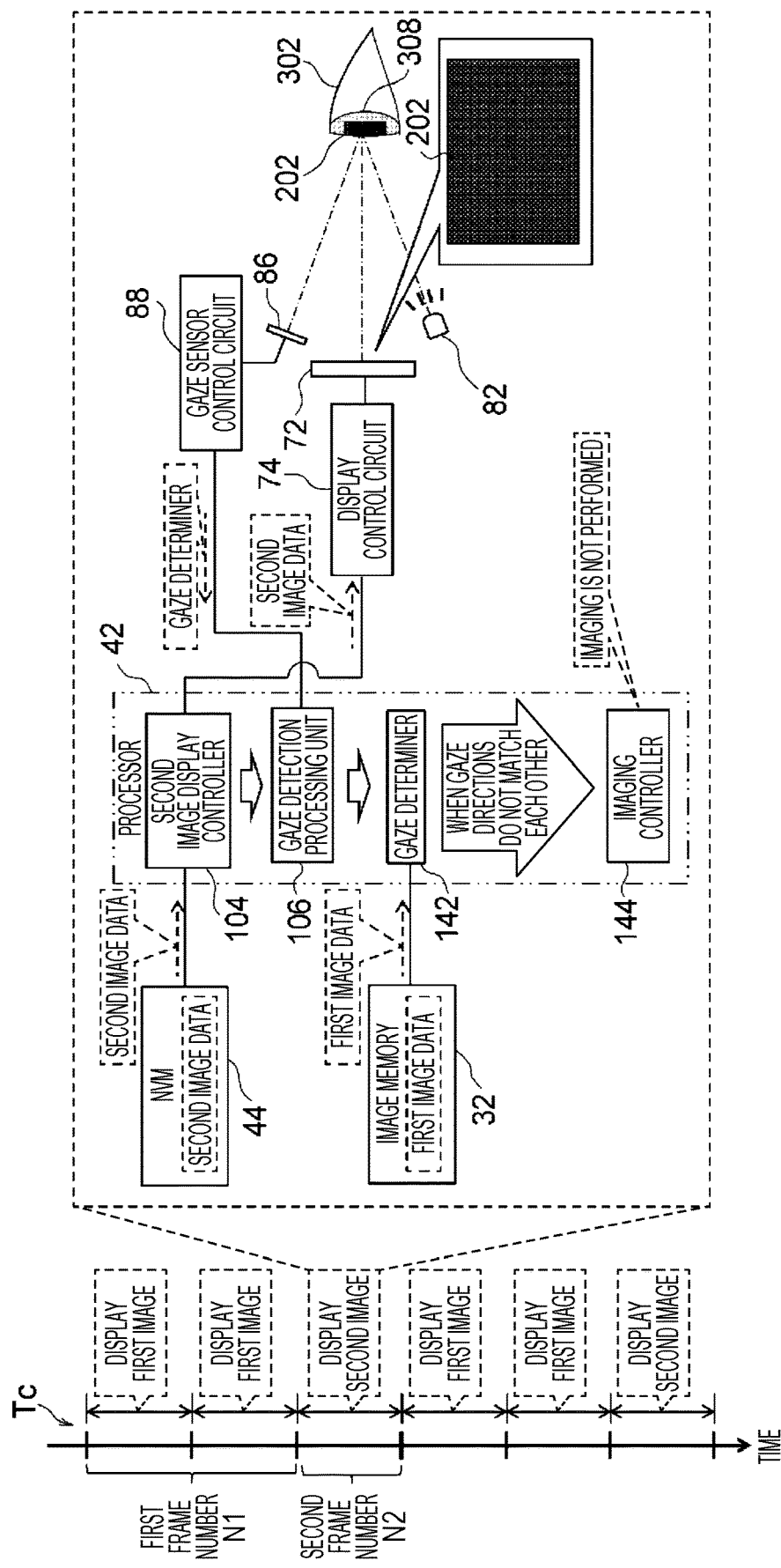
FIG. 27 is an explanatory diagram showing an example of a first operation of a CPU according to a seventh embodiment.

In the seventh embodiment, the processing when the second image 202 is displayed is changed as follows from the first embodiment. As shown in FIG. 27 as an example, the processor 42 operates as a gaze determiner 142 and an imaging controller 144.

The gaze determiner 142 acquires the first most recent first image data among the first image data stored in the image memory 32, and detects a first gaze direction of the subject appearing in the first image 200 indicated by the acquired first image data. The first gaze direction of the subject is detected, for example, by performing image processing on the first image 200. The first gaze direction is an example of a "first gaze direction" according to the technology of the present disclosure.

The gaze determiner 142 detects a second gaze direction corresponding to the gaze position detected by the gaze detection processing unit 106. The second gaze direction is an example of a "second gaze direction" according to the technology of the present disclosure. As described in FIG. 3, for example, the second gaze direction is specified based on the line 312 connecting the coordinate of the center 306A of the eyeball 306 and the coordinate of the center 310A of the pupil 310. Then, based on the second gaze direction corresponding to the gaze position detected by the gaze detection processing unit 106 and the first gaze direction of the subject, the gaze determiner 142 determines whether the first gaze direction and the second gaze direction match each other (that is, whether the gaze directions of the subject and the user match each other).

When the gaze determiner 142 determines that the first gaze direction and the second gaze direction do not match each other, the imaging controller 144 does not control the image sensor 24 to image the subject.

Figure 28:
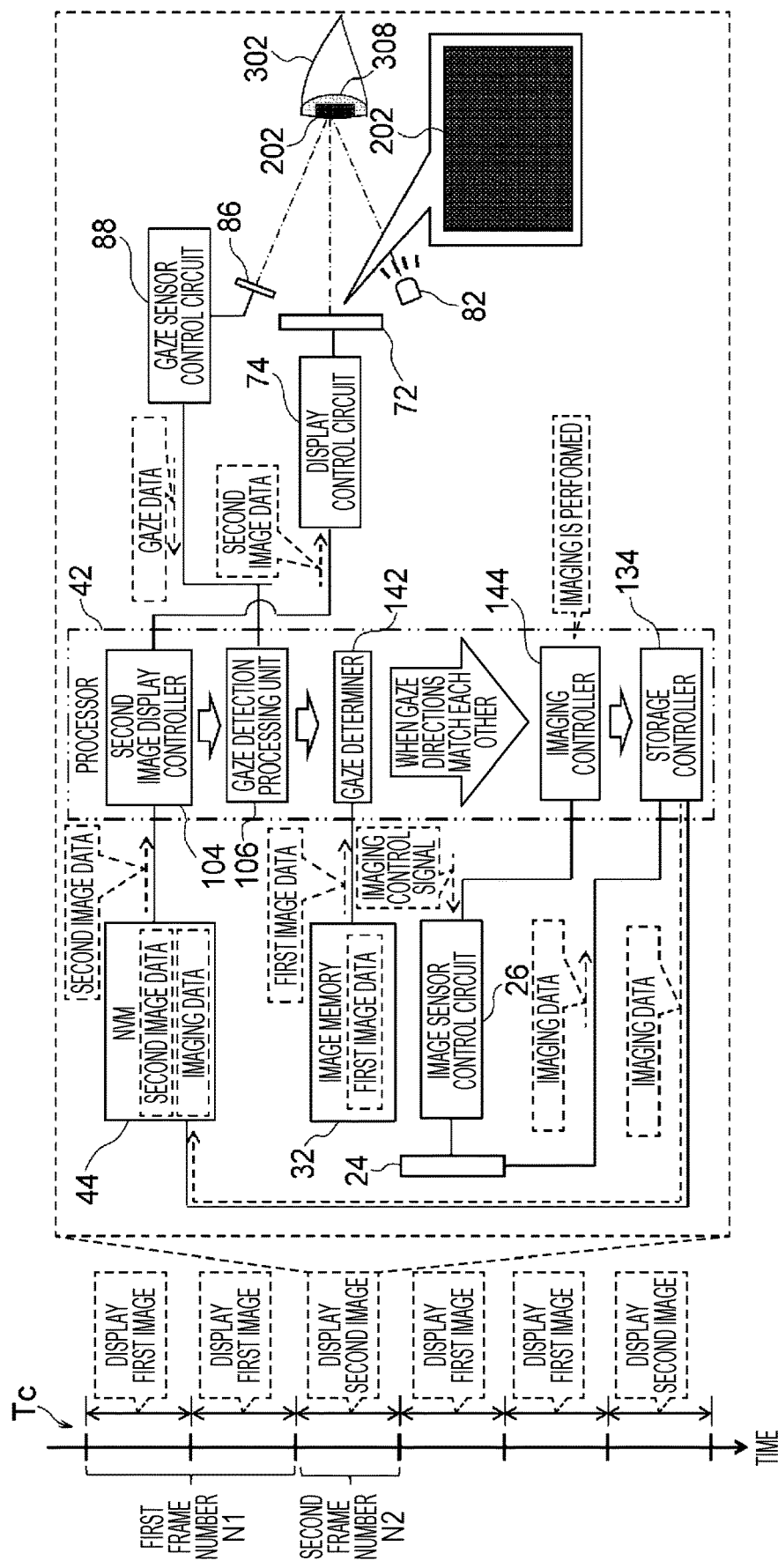
FIG. 28 is an explanatory diagram showing an example of a second operation of the CPU according to the seventh embodiment.

As shown in FIG. 28 as an example, when the gaze determiner 142 determines that the first gaze direction and the second gaze direction match each other, the imaging controller 144 causes the image sensor 24 to image the subject (not shown) via the image sensor control circuit 26 by outputting an imaging control signal to the image sensor control circuit 26.

The processor 42 operates as the storage controller 134. The storage controller 134 acquires imaging data obtained by imaging the subject by the image sensor 24. The imaging data is image data including a subject of which the gaze direction matches the gaze direction of the user. Then, the storage controller 134 causes the NVM 44 to store the acquired imaging data. Accordingly, the imaging data indicating a recording image to be recorded as data is stored in the NVM 44. The imaging data is an example of "third image data" according to the technology of the present disclosure.

The imaging device 10 has, as an operation mode, a gaze match imaging mode in which, when the gaze directions of the subject and the user match each other (that is, the eyes meet) as described above, gaze match imaging processing of imaging the subject and storing the imaging data indicating the recorded image in the NVM 44 is executed. Then, the imaging device 10 executes the gaze match imaging processing when the mode is proceeded to the gaze match imaging mode.

Figure 29:
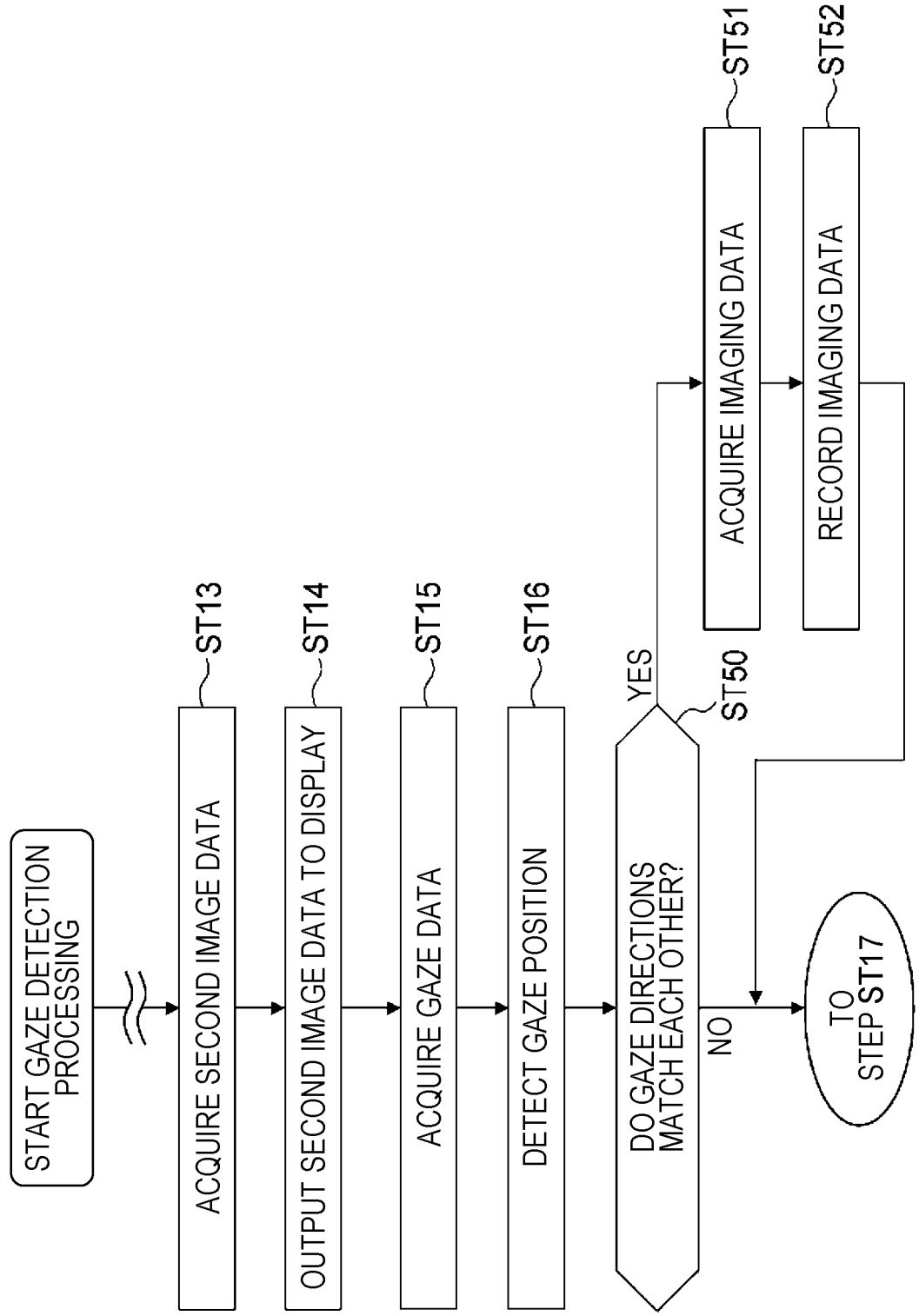
FIG. 29 is a flowchart showing an example of a flow of gaze detection processing according to the seventh embodiment.

Next, an action of the imaging device 10 according to the seventh embodiment will be described with reference to FIG. 29. FIG. 29 shows an example of a flow of gaze detection processing according to the seventh embodiment.

In the gaze detection processing according to the seventh embodiment shown in FIG. 29, steps ST50 to ST52 are executed in the gaze detection processing according to the first embodiment described above (see FIG. 10). Step ST50 is executed after step ST16. In the gaze detection processing according to the seventh embodiment shown in FIG. 29, the processing in and before step ST16 is similar to the gaze detection processing according to the first embodiment described above.

In step ST50, the gaze determiner 142 acquires the latest first image data (that is, the first most recent first image data) among the first image data stored in the image memory 32, and detects the first gaze direction of the subject appearing in the first image 200 indicated by the acquired first image data. Then, based on the second gaze direction corresponding to the gaze position detected by the gaze detection processing unit 106 and the first gaze direction of the subject, the gaze determiner 142 determines whether the first gaze direction and the second gaze direction match each other.

When the first gaze direction and the second gaze direction match each other in step ST50, the determination is positive, and the gaze detection processing proceeds to step ST51. When the first gaze direction does not match the second gaze direction in step ST50, the determination is negative, and the gaze detection processing proceeds to step ST17 (see FIG. 10) without performing processing of causing the image sensor 24 to image the subject. In the gaze detection processing according to the seventh embodiment shown in FIG. 25, the processing in and after step ST17 is similar to the gaze detection processing according to the first embodiment described above.

In step ST51, the imaging controller 144 causes the image sensor 24 to image the subject. After the processing of step ST51 is executed, the gaze detection processing proceeds to step ST52.

In ST52, the storage controller 134 acquires imaging data obtained by imaging the subject by the image sensor 24 in step ST51. Then, the storage controller 134 causes the NVM 44 to store the acquired imaging data. After the processing of step ST52 is executed, the gaze detection processing proceeds to step ST17 (see FIG. 10).

As described above, in the seventh embodiment, the processor 42 detects the first gaze direction of the subject appearing in the first image 200 indicated by the first image data. The processor 42 detects the second gaze direction corresponding to the gaze position. Then, the processor 42 acquires imaging data obtained by imaging performed by the image sensor 24 based on the first gaze direction and the second gaze direction. It is therefore possible to acquire imaging data corresponding to the first gaze direction and the second gaze direction.

As an example, the processor 42 acquires the imaging data when the first gaze direction and the second gaze direction match each other. It is therefore possible to acquire imaging data in which the first gaze direction and the second gaze direction match each other.

Eighth Embodiment

Next, an eighth embodiment will be described.

Figure 30:
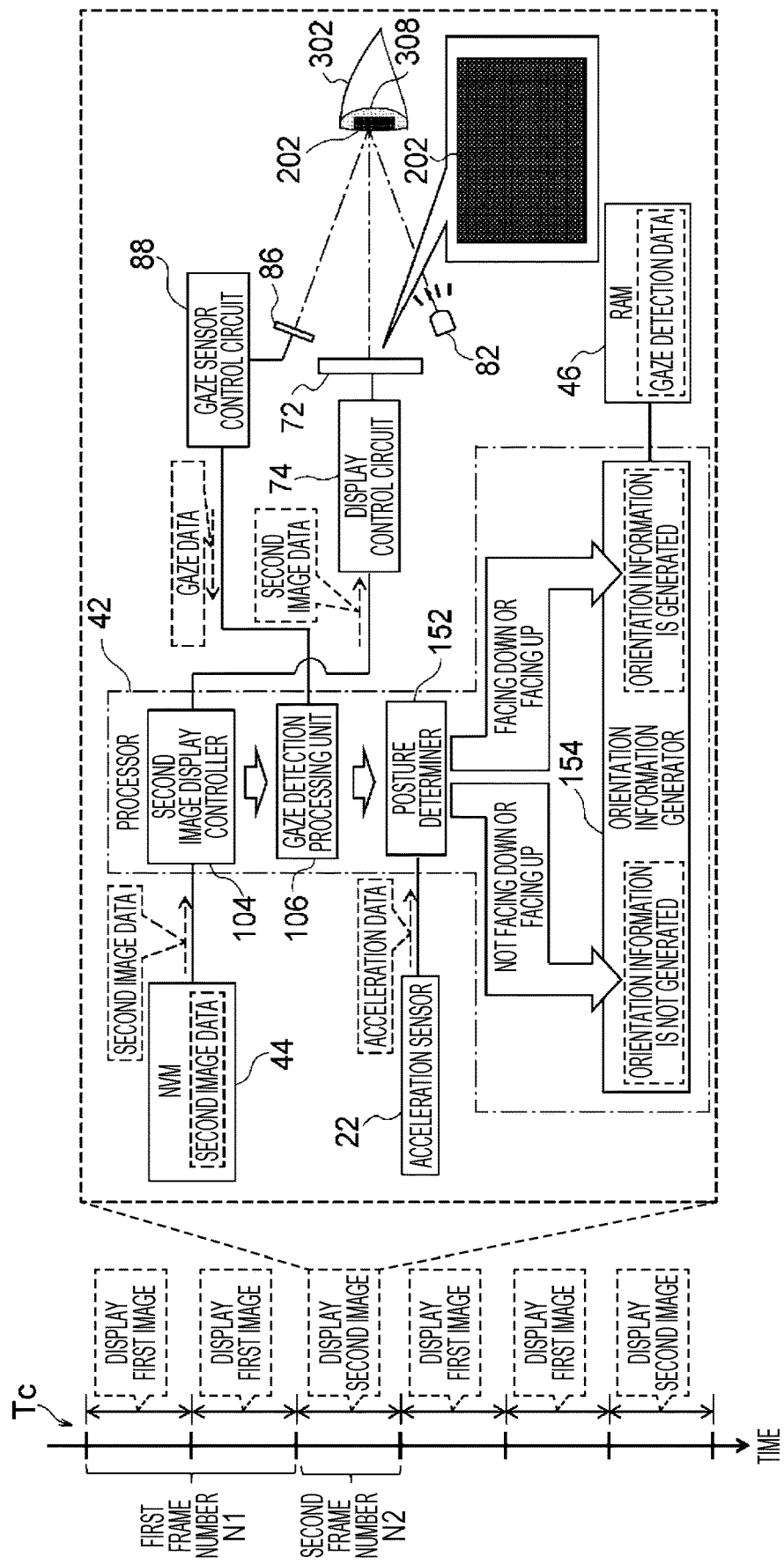
FIG. 30 is an explanatory diagram showing an example of a first operation of a CPU according to an eighth embodiment.
Figure 31:
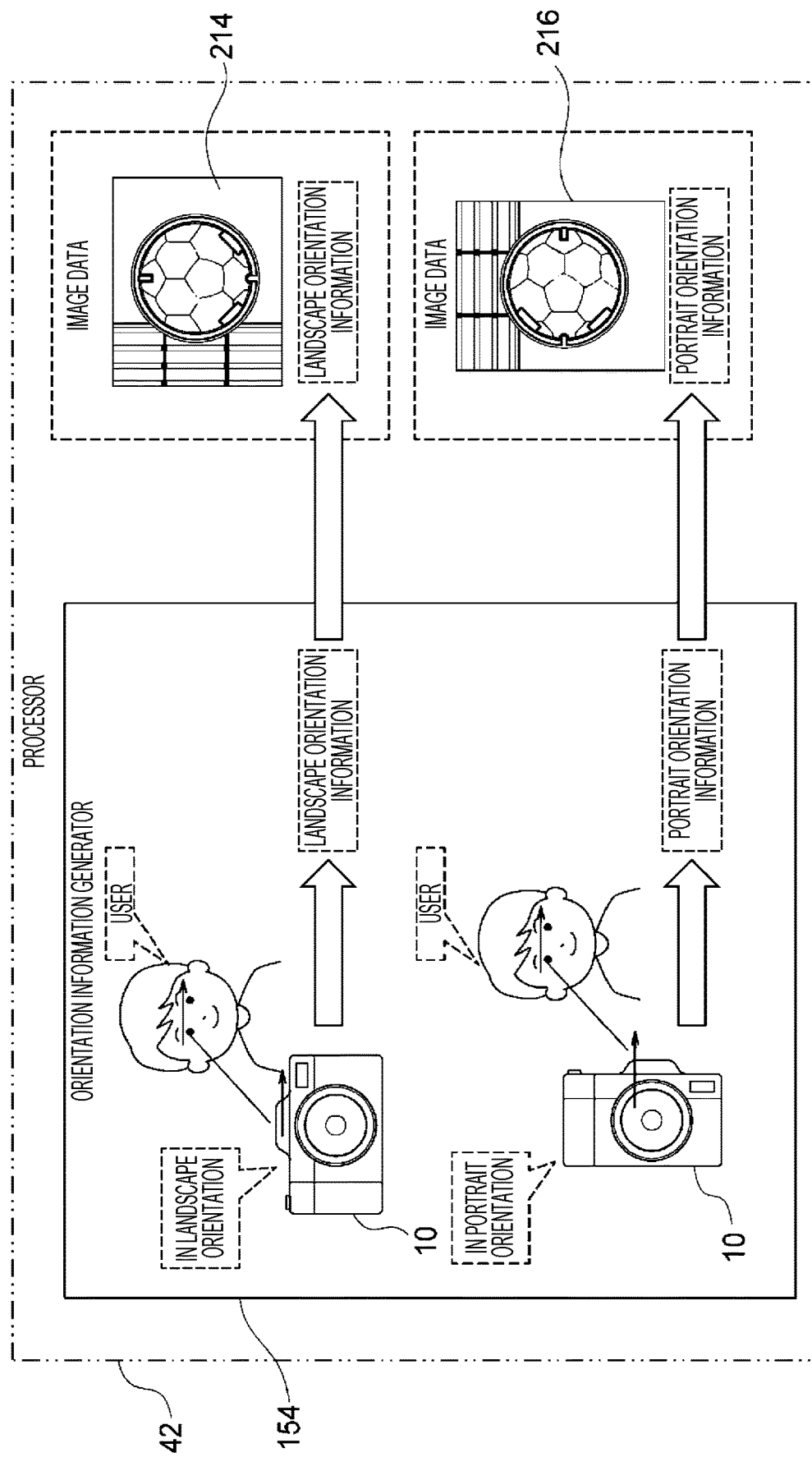
FIG. 31 is an explanatory diagram showing an example of a second operation of the CPU according to the eighth embodiment.
Figure 32:
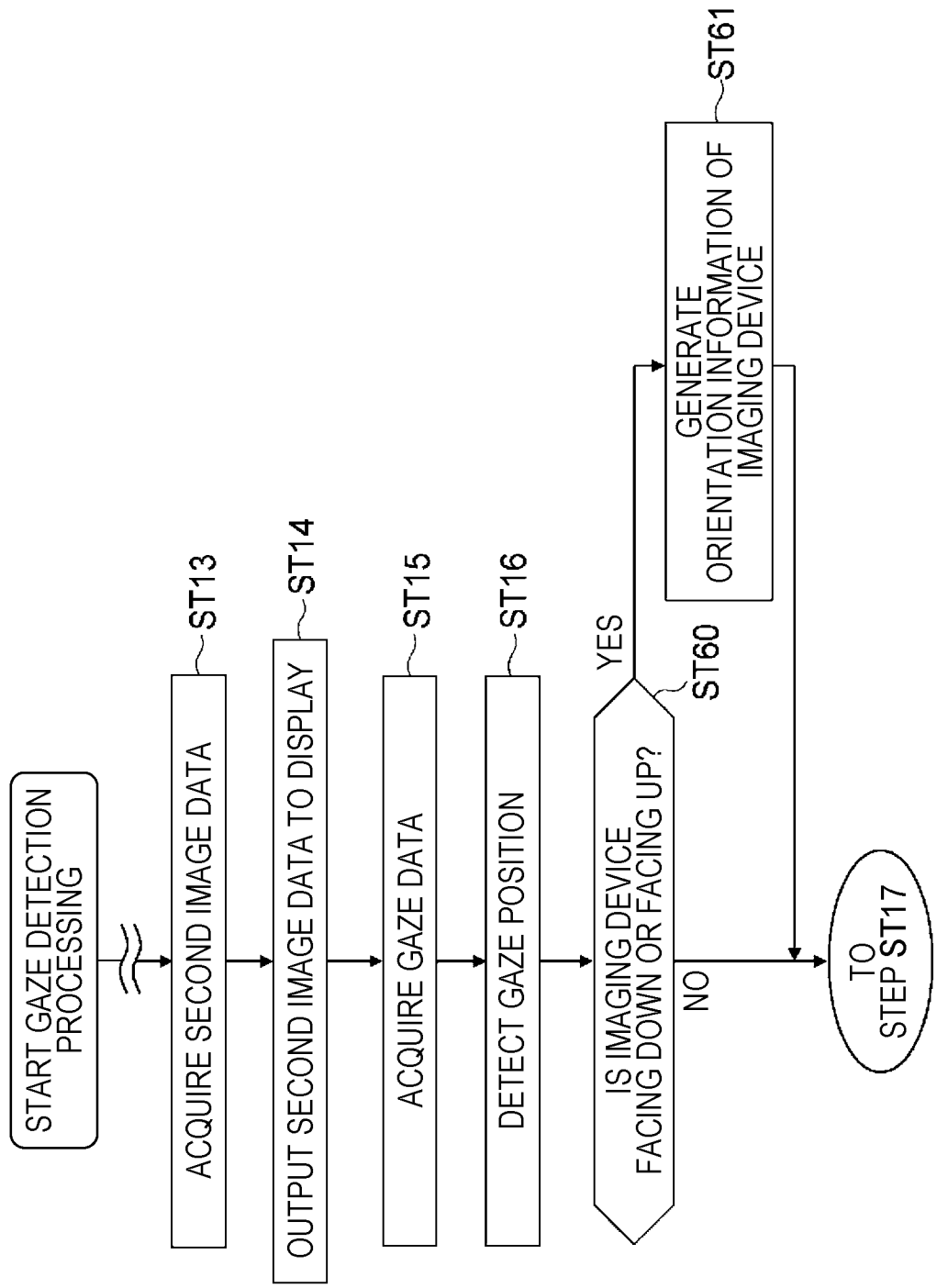
FIG. 32 is a flowchart showing an example of a flow of gaze detection processing according to the eighth embodiment.

FIGS. 30 to 32 show the eighth embodiment. The eighth embodiment is changed as follows from the first embodiment. As shown in FIG. 30 as an example, the processor 42 operates as a posture determiner 152 and an orientation information generator 154.

The posture determiner 152 acquires acceleration data from the acceleration sensor 22. Then, the posture determiner 152 determines whether the posture of the imaging device 10 is facing down or facing up based on the acceleration data. When the direction in which the acceleration indicated by the acceleration data acts matches the direction of the roll axis of the imaging device 10, the posture determiner 152 determines that the posture of the imaging device 10 is facing down or facing up. The acceleration data is an example of "acceleration data" according to the technology of the present disclosure.

When the posture determiner 152 determines that the posture of the imaging device 10 is not facing down or facing up, the orientation information generator 154 does not generate orientation information related to an orientation of the imaging device 10. The orientation information is information indicating whether the orientation of the imaging device 10 is a landscape orientation or a portrait orientation. The case where the orientation of the imaging device 10 is the landscape orientation is, for example, a case where the lateral direction of the imaging device 10 (that is, the direction of the pitch axis) is parallel to the lateral direction of the eye 302 of the user. The case where the orientation of the imaging device 10 is the portrait orientation is, for example, a case where the longitudinal direction of the imaging device 10 (that is, the direction of the yaw axis) is parallel to the lateral direction of the eye 302 of the user.

When the posture determiner 152 determines that the posture of the imaging device 10 is facing down or facing up, the orientation information generator 154 generates orientation information related to the orientation of the imaging device 10. Specifically, the orientation information generator 154 detects a moving direction of the gaze position (that is, the orientation of the eye 302), and generates the orientation information related to the orientation of the imaging device 10 based on the detected moving direction of the gaze position. The orientation information generator 154 specifies a trajectory of a plurality of gaze positions based on the plurality of gaze data stored in the RAM 46, for example, and detects the moving direction of the gaze position based on the specified trajectory of the plurality of gaze positions.

As shown in FIG. 31 as an example, when the user causes the imaging device 10 to image the subject, the user moves the gaze position in the lateral direction (that is, tilts the eye 302 in the lateral direction). When the moving direction of the gaze position with respect to the imaging device 10 is the lateral direction of the imaging device 10, the orientation information generator 154 generates, as the orientation information, landscape orientation information indicating that the orientation of the imaging device 10 is the landscape orientation. On the other hand, when the moving direction of the gaze position with respect to the imaging device 10 is the longitudinal direction of the imaging device 10, the orientation information generator 154 generates, as the orientation information, portrait orientation information indicating that the orientation of the imaging device 10 is the portrait orientation. The landscape orientation information and the portrait orientation information are examples of "orientation information" according to the technology of the present disclosure.

The landscape orientation information and the portrait orientation information are added to the image data obtained after the orientation information is generated by the orientation information generator 154. The image data obtained when the orientation of the imaging device 10 is the landscape orientation is image data indicating a landscape image 214. The image data obtained when the orientation of the imaging device 10 is the portrait orientation is image data indicating a portrait image 216.

The image data shown in FIG. 31 may be the first image data indicating the first image 200 described above or may be imaging data (see FIG. 28) obtained in a case where the gaze directions of the subject and the user match each other. The image data shown in FIG. 31 may be image data obtained by imaging performed by the image sensor 24 other than the first image data and the imaging data. The image data shown in FIG. 31 is an example of "fourth image data" according to the technology of the present disclosure.

Next, an action of the imaging device 10 according to the eighth embodiment will be described with reference to FIG. 32. FIG. 32 shows an example of a flow of gaze detection processing according to the eighth embodiment.

In the gaze detection processing according to the eighth embodiment shown in FIG. 32, steps ST60 to ST61 are executed in the gaze detection processing according to the first embodiment described above (see FIG. 10). Step ST60 is executed after step ST16. In the gaze detection processing according to the eighth embodiment shown in FIG. 32, the processing in and before step ST16 is similar to the gaze detection processing according to the first embodiment described above.

In step ST60, the posture determiner 152 acquires acceleration data from the acceleration sensor 22. Then, the posture determiner 152 determines whether the posture of the imaging device 10 is facing down or facing up based on the acceleration data. When the posture of the imaging device 10 is facing down or facing up in step ST60, the determination is positive, and the gaze detection processing proceeds to step ST61. When the posture of the imaging device 10 is not facing down or facing up in step ST60, the determination is negative, and the gaze detection processing proceeds to step ST17 (see FIG. 10) without performing processing of generating the orientation information of the imaging device 10. In the gaze detection processing according to the eighth embodiment shown in FIG. 32, the processing in and after step ST17 is similar to the gaze detection processing according to the first embodiment described above.

In step ST61, the orientation information generator 154 detects the moving direction of the gaze position (that is, the orientation of the eye 302), and generates the orientation information related to the orientation of the imaging device 10 based on the detected moving direction of the gaze position. After the processing of step ST61 is executed, the gaze detection processing proceeds to step ST17 (see FIG. 10).

As described above, in the eighth embodiment, the processor 42 generates the orientation information related to the orientation of the imaging device 10 based on the acceleration data of the acceleration sensor 22 and the gaze position. Therefore, even when the posture of the imaging device 10 is facing down or facing up, for example, it is possible to obtain the orientation information corresponding to the gaze position.

The processor 42 adds the orientation information to the image data obtained by imaging performed by the image sensor 24. Therefore, even when the posture of the imaging device 10 is facing down or facing up, it is possible to obtain an image in an orientation corresponding to the orientation of the imaging device 10.

Ninth Embodiment

Next, a ninth embodiment will be described.

Figure 33:
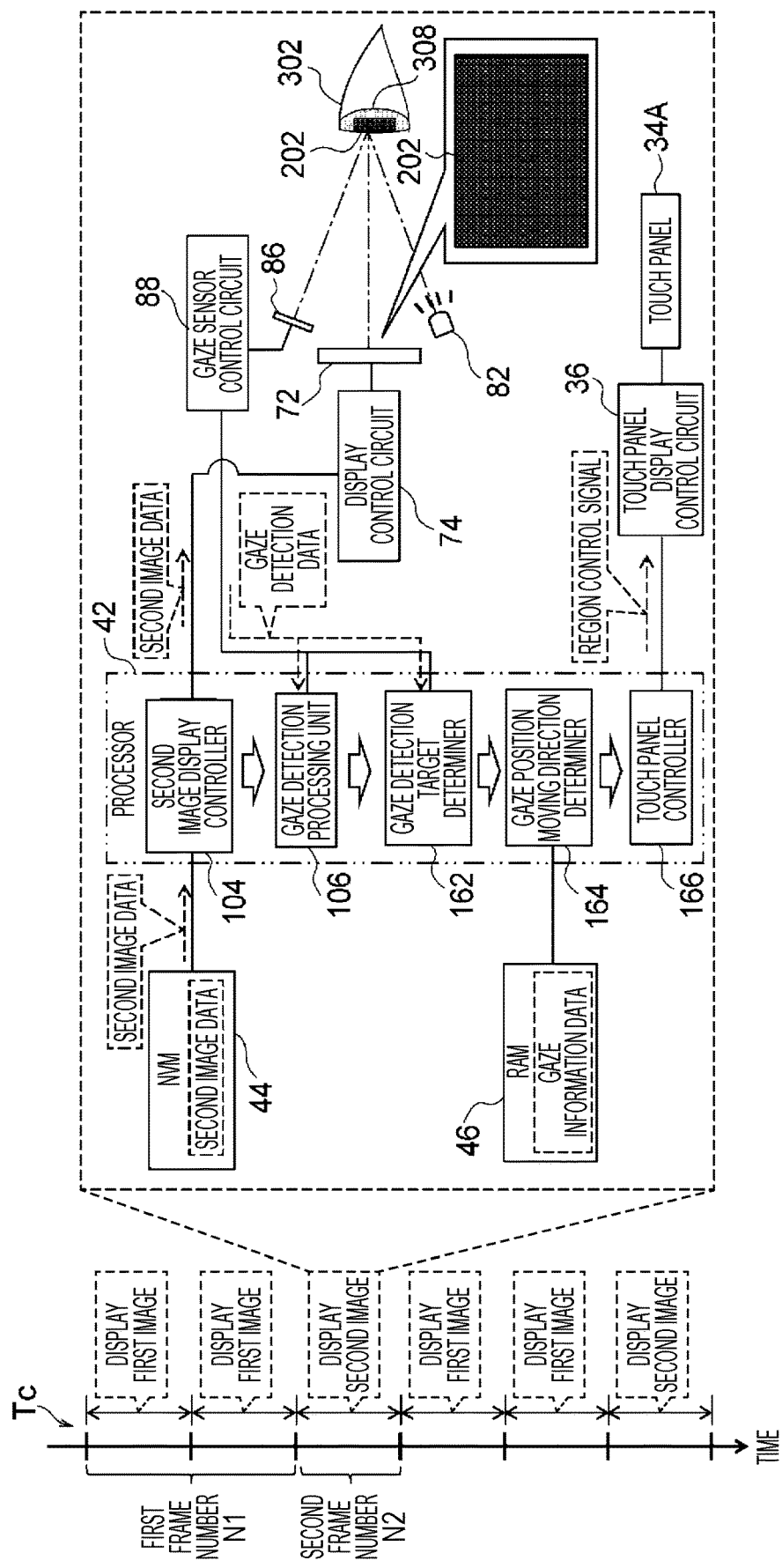
FIG. 33 is an explanatory diagram showing an example of a first operation of a CPU according to a ninth embodiment.
Figure 35:
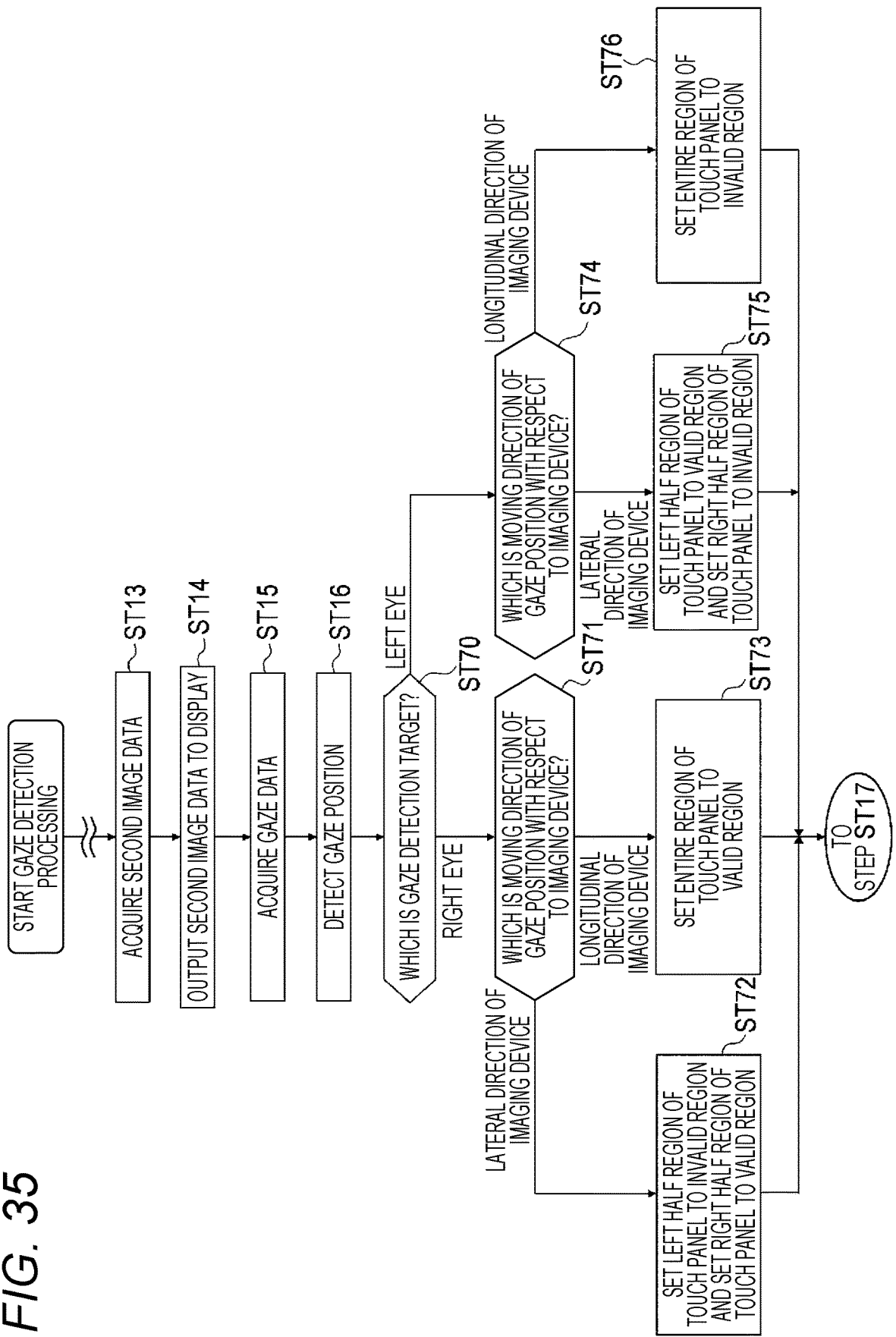
FIG. 35 is a flowchart showing an example of a flow of gaze detection processing according to the ninth embodiment.

FIGS. 33 and 35 show the ninth embodiment. The ninth embodiment is changed as follows from the first embodiment. As shown in FIG. 33 as an example, the processor 42 operates as a gaze detection target determiner 162, a gaze position moving direction determiner 164, and a touch panel controller 166.

The gaze detection target determiner 162 determines which of the left eye or the right eye is the gaze detection target based on the gaze data. The gaze detection target determiner 162 determines which of the left eye or the right eye is the gaze detection target by executing image processing such as image recognition processing and/or pattern matching by the AI method on the gaze data. The processing of determining whether the left eye or the right eye is the gaze detection target is first determination processing, and the first determination processing is an example of "first determination processing" according to the technology of the present disclosure.

The gaze position moving direction determiner 164 determines the orientation of the left eye or the right eye determined to be the gaze detection target based on the gaze position. Specifically, the gaze position moving direction determiner 164 detects the moving direction of the gaze position (that is, the orientation of the eye 302), and determines whether the moving direction of the detected gaze position is the lateral direction or the longitudinal direction of the imaging device 10. The gaze position moving direction determiner 164 specifies the trajectory of a plurality of gaze positions based on the plurality of gaze data stored in the RAM 46, for example, and detects the moving direction of the gaze position based on the specified trajectory of the plurality of gaze positions. By detecting the moving direction of the gaze position, the orientation of the eye 302 is detected. The processing of determining the orientation of the left eye or the right eye determined to be the gaze detection target based on the gaze position is second determination processing, and the second determination processing is an example of "second determination processing" according to the technology of the present disclosure.

The touch panel controller 166 sets a valid region and/or an invalid region of the touch panel 34A based on a determination result by the gaze detection target determiner 162 and a determination result by the gaze position moving direction determiner 164. Specifically, the touch panel controller 166 sets the valid region and/or the invalid region of the touch panel 34A by outputting a region control signal indicating the valid region and/or the invalid region of the touch panel 34A to the touch panel display control circuit 36.

Figure 34:
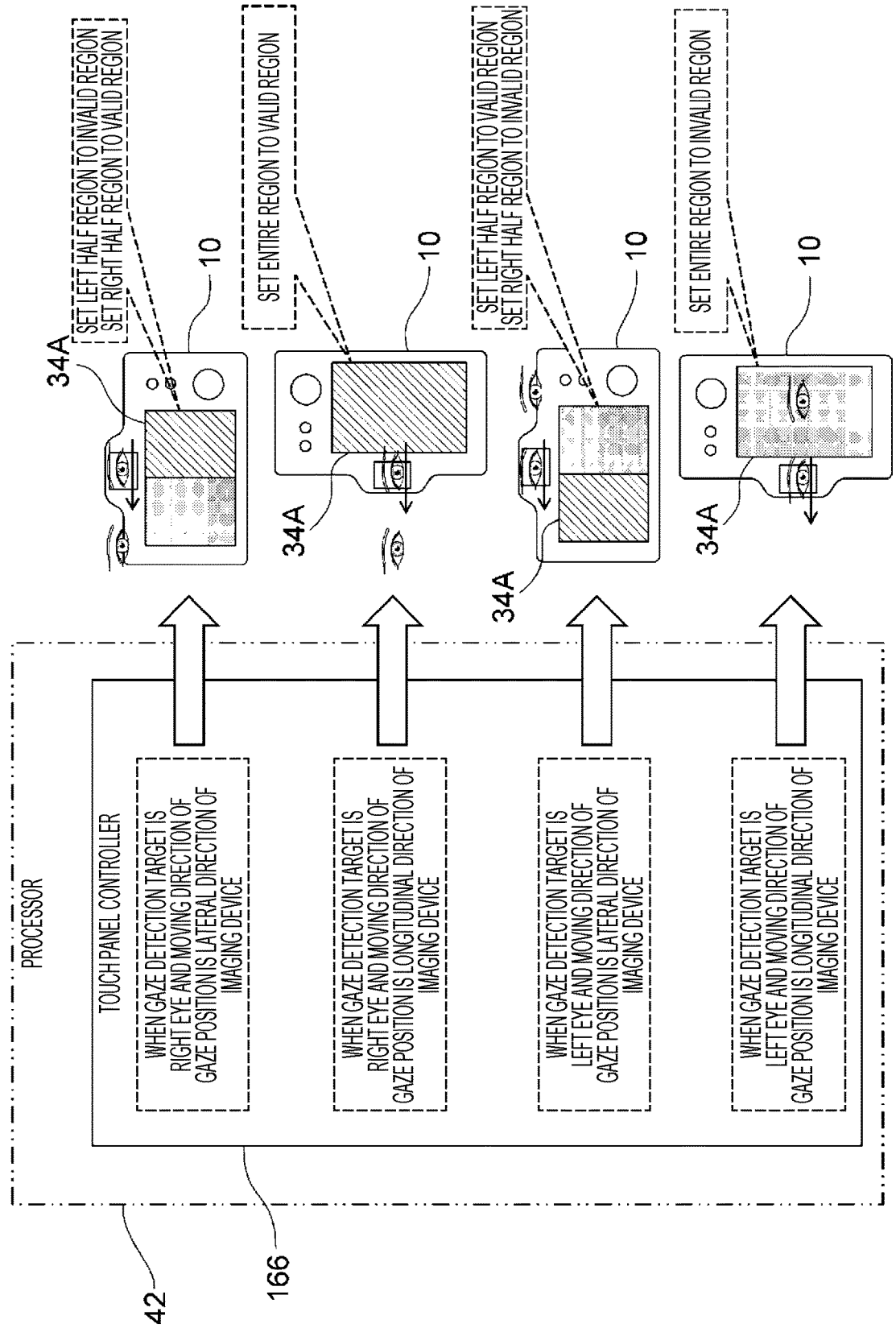
FIG. 34 is an explanatory diagram showing an example of a second operation of the CPU according to the ninth embodiment.

As shown in FIG. 34 as an example, when the gaze detection target is the right eye and the moving direction of the gaze position is the lateral direction of the imaging device 10, the touch panel controller 166 sets a left half region of the touch panel 34A as the invalid region, and sets a right half region of the touch panel 34A as the valid region. When the gaze detection target is the right eye and the moving direction of the gaze position is the longitudinal direction of the imaging device 10, the touch panel controller 166 sets an entire region of the touch panel 34A as the valid region.

When the gaze detection target is the left eye and the moving direction of the gaze position is the lateral direction of the imaging device 10, the touch panel controller 166 sets the left half region of the touch panel 34A as the valid region and sets the right half region of the touch panel 34A as the invalid region. When the gaze detection target is the left eye and the moving direction of the gaze position is the longitudinal direction of the imaging device 10, the touch panel controller 166 sets the entire region of the touch panel 34A as the invalid region. The touch panel 34A is used for, for example, displaying and moving a focus frame for adjusting a focus.

Next, an action of the imaging device 10 according to the ninth embodiment will be described with reference to FIG. 35. FIG. 35 shows an example of a flow of gaze detection processing according to the ninth embodiment.

In the gaze detection processing according to the ninth embodiment shown in FIG. 35, processing from steps ST70 to ST76 is executed between processing of step ST16 and processing of step ST17 in the gaze detection processing according to the first embodiment described above (see FIG. 10). In the gaze detection processing according to the ninth embodiment shown in FIG. 35, the processing before step ST16 is similar to the gaze detection processing according to the first embodiment described above.

In step ST70, the gaze detection target determiner 162 determines which of the left eye or the right eye is the gaze detection target based on the gaze data acquired in step ST15. When the right eye is the gaze detection target in step ST70, the gaze detection processing proceeds to step ST71. When the left eye is the gaze detection target in step ST70, the gaze detection processing proceeds to step ST74.

In step ST71, the gaze position moving direction determiner 164 determines whether the moving direction of the gaze position (that is, the orientation of the eye 302) is the lateral direction or the longitudinal direction of the imaging device 10. When the moving direction of the gaze position is the lateral direction of the imaging device 10 in step ST71, the gaze detection processing proceeds to step ST72. When the moving direction of the gaze position is the longitudinal direction of the imaging device 10 in step ST71, the gaze detection processing proceeds to step ST73.

In step ST72, the touch panel controller 166 sets the left half region of the touch panel 34A as the invalid region and sets the right half region of the touch panel 34A as the valid region. After the processing of step ST72 is executed, the gaze detection processing proceeds to step ST17 (see FIG. 10). In the gaze detection processing according to the ninth embodiment shown in FIG. 35, the processing in and after step ST17 is similar to the gaze detection processing according to the first embodiment described above.

In step ST73, the touch panel controller 166 sets the entire region of the touch panel 34A as the valid region. After the processing of step ST73 is executed, the gaze detection processing proceeds to step ST17 (see FIG. 10).

In step ST74, the gaze position moving direction determiner 164 determines whether the moving direction of the gaze position (that is, the orientation of the eye 302) is the lateral direction or the longitudinal direction of the imaging device 10. When the moving direction of the gaze position is the lateral direction of the imaging device 10 in step ST74, the gaze detection processing proceeds to step ST75. When the moving direction of the gaze position is the longitudinal direction of the imaging device 10 in step ST74, the gaze detection processing proceeds to step ST76.

In step ST75, the touch panel controller 166 sets the left half region of the touch panel 34A as the valid region and sets the right half region of the touch panel 34A as the invalid region. After the processing of step ST75 is executed, the gaze detection processing proceeds to step ST17 (see FIG. 10).

In step ST76, the touch panel controller 166 sets the entire region of the touch panel 34A as the invalid region. After the processing of step ST76 is executed, the gaze detection processing proceeds to step ST17 (see FIG. 10).

As described above, in the ninth embodiment, the processor 42 executes the first determination processing of determining whether the left eye or the right eye is the gaze detection target based on the gaze data, and the second determination processing of determining the orientation of the left eye or the right eye determined to be the gaze detection target in the first determination processing based on the gaze position. Then, the processor 42 sets the valid region and/or the invalid region of the touch panel 34A based on a first determination result by the first determination processing and a second determination result by the second determination processing. It is therefore possible to suppress a malfunction of the imaging device 10 due to the nose (not shown) of the user touching the touch panel 34A, for example, as compared to a case where the entire surface of the touch panel 34A is maintained to be set as the valid region.

Tenth Embodiment

Next, a tenth embodiment will be described.

Figure 36:
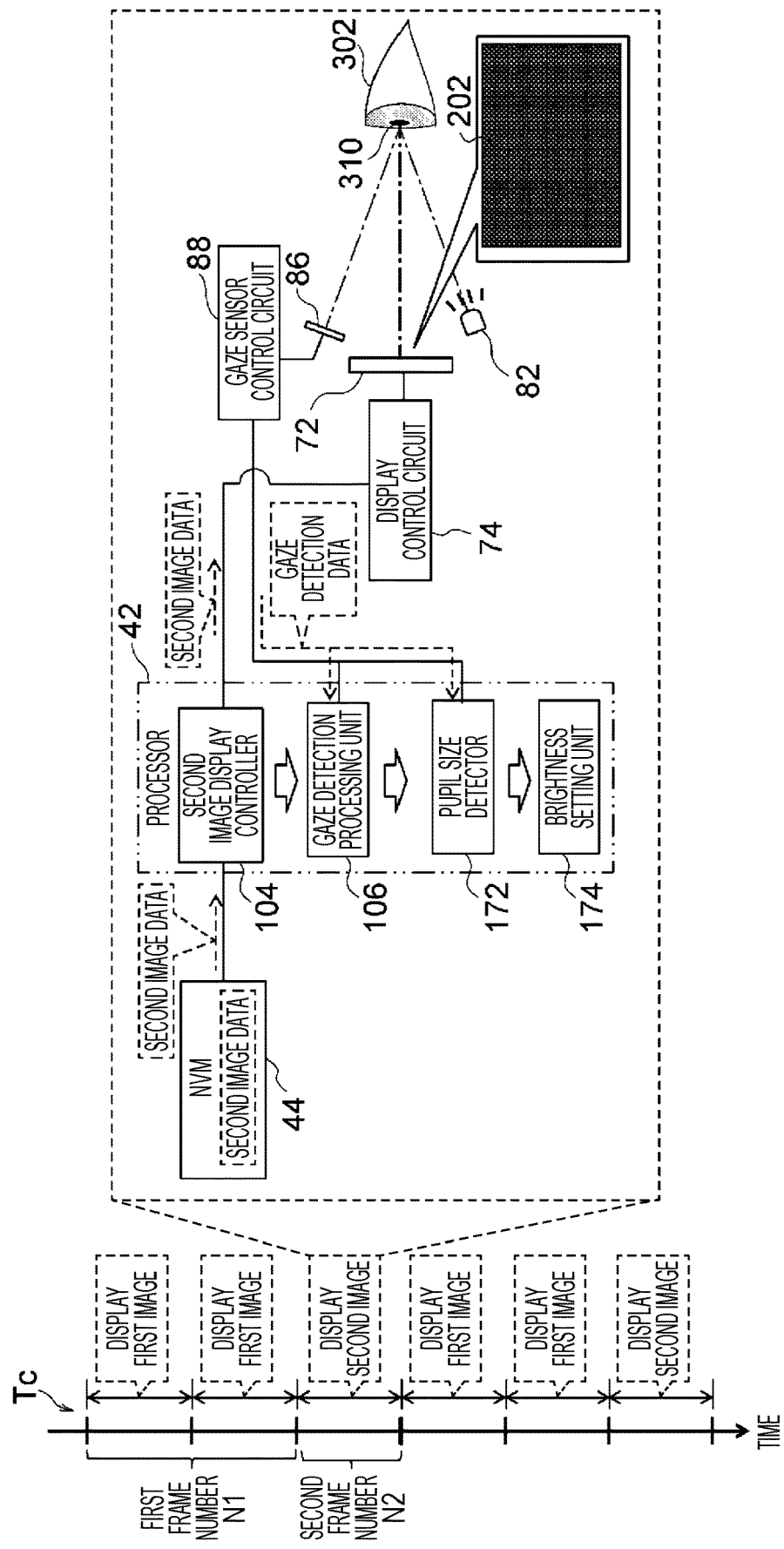
FIG. 36 is an explanatory diagram showing an example of a first operation of a CPU according to a tenth embodiment.
Figure 37:
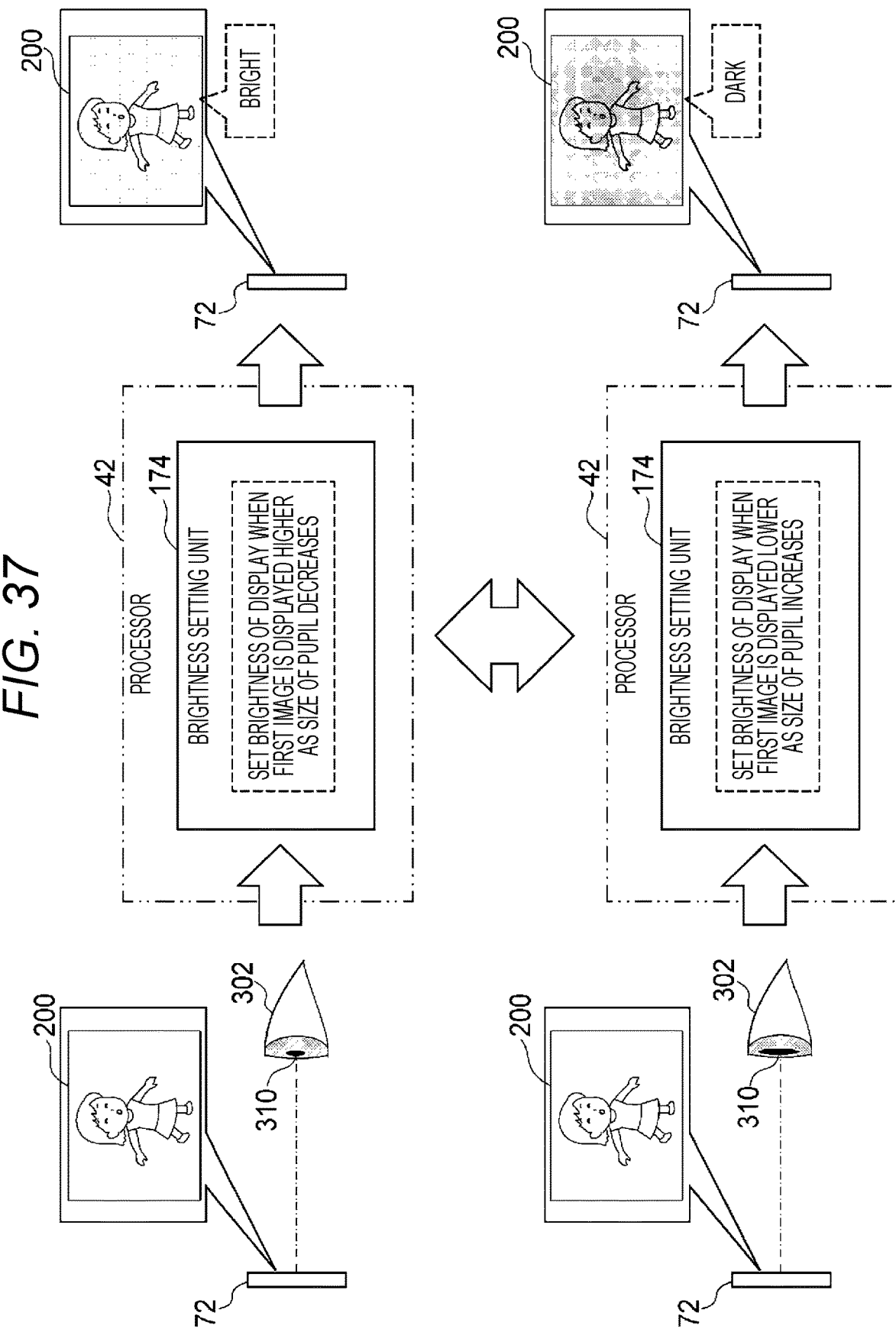
FIG. 37 is an explanatory diagram showing an example of a second operation of the CPU according to the tenth embodiment.
Figure 38:
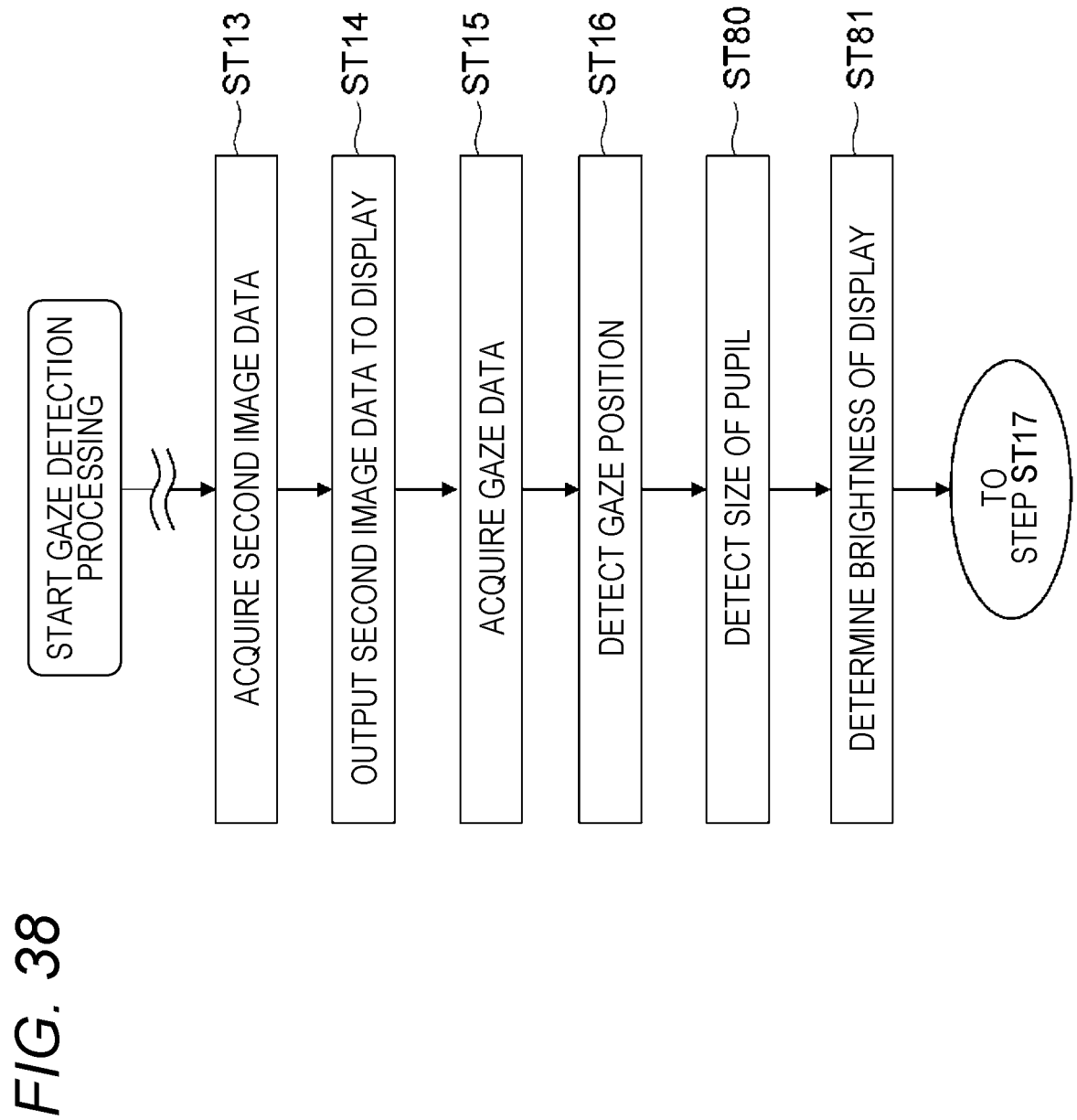
FIG. 38 is a flowchart showing an example of a flow of gaze detection processing according to the tenth embodiment.

FIGS. 36 to 38 show the tenth embodiment. The tenth embodiment is changed as follows from the first embodiment. As shown in FIG. 36 as an example, the processor 42 operates as a pupil size detector 172 and a brightness setting unit 174.

The pupil size detector 172 detects the size of the pupil 310 of the eye 302 based on the gaze data. The size of the pupil 310 may be detected based on the area of the pupil 310 represented in the image indicated by the gaze data, or may be detected based on the diameter of the pupil 310 represented in the image indicated by the gaze data. The size of the pupil 310 changes in accordance with the brightness of the environment where the imaging device 10 is used.

The brightness setting unit 174 sets the brightness of the display 72 in which the first image 200 is displayed based on the result of the detection of the size of the pupil 310 by the pupil size detector 172.

As shown in FIG. 37 as an example, the brightness setting unit 174 sets the brightness of the display 72 in which the first image 200 is displayed to be higher as the size of the pupil 310 becomes smaller. The brightness setting unit 174 sets the brightness of the display 72 in which the first image 200 is displayed to be lower as the size of the pupil 310 increases. When the brightness of the display 72 is set by the brightness setting unit 174, the brightness of the display 72 in which the first image 200 is displayed is adjusted to the brightness set by the brightness setting unit 174.

Next, an action of the imaging device 10 according to the tenth embodiment will be described with reference to FIG. 38. FIG. 38 shows an example of a flow of gaze detection processing according to the tenth embodiment.

In the gaze detection processing according to the tenth embodiment shown in FIG. 38, steps ST80 to ST81 are executed in the gaze detection processing according to the first embodiment described above (see FIG. 10). Step ST80 is executed after step ST16. In the gaze detection processing according to the tenth embodiment shown in FIG. 38, the processing in and before step ST16 is similar to the gaze detection processing according to the first embodiment described above.

In step ST80, the pupil size detector 172 detects the size of the pupil 310 of the eye 302 based on the gaze data. After the processing of step ST80 is executed, the gaze detection processing proceeds to step ST81.

In step ST81, the brightness setting unit 174 sets the brightness of the display 72 in which the first image 200 is displayed based on the result of the detection of the size of the pupils 310 by the pupil size detector 172. After the processing of step ST81 is executed, the gaze detection processing proceeds to step ST17 (see FIG. 10). In the gaze detection processing according to the tenth embodiment shown in FIG. 38, the processing in and after step ST17 is similar to the gaze detection processing according to the first embodiment described above.

As described above, in the tenth embodiment, the processor 42 detects the size of the pupil 310 based on the gaze data, and adjusts the brightness of the display 72 based on a result of the detection of the size of the pupil 310. Accordingly, the brightness of the display 72 can be adjusted in accordance with light adaptation and/or dark adaptation, for example.

Although the first to tenth embodiments have been described above, the above embodiments and modification examples can be combined with each other as long as no contradiction arises. In a case where the above embodiments and modification examples are combined, when there are a plurality of overlapping steps, priorities may be given to the plurality of steps in accordance with various conditions or the like.

In the above embodiments, a digital camera is exemplified as the imaging device 10, but the technology of the present disclosure is not limited thereto. For example, a terminal device (for example, a tablet terminal, a smart device, or a wearable terminal) functioning as the imaging device 10 may be used. The digital camera serving as the imaging device 10 may be any of various digital cameras such as a compact digital camera, a mirrorless single-lens reflex camera, and a digital single-lens reflex camera. The digital camera may be a lens-interchangeable digital camera or a lens-fixed digital camera. The technology of the present disclosure may be applied to various information processing devices other than the imaging device 10 (for example, a cell observation device, an ophthalmic observation device, a surgical microscope, or the like).

In the above embodiments, the gaze position of one eye is detected, but the gaze positions of both eyes may be detected.

The processor 42 has been exemplified in each of the embodiments, but at least one other CPU, at least one GPU, and/or at least one TPU may be used instead of the processor 42 or together with the processor 42.

In each of the embodiments, an example of an embodiment in which the gaze detection program 100 is stored in the NVM 44 has been described, but the technology of the present disclosure is not limited thereto. For example, the gaze detection program 100 may be stored in a portable non-transitory computer-readable storage medium such as an SSD or a USB memory (hereinafter, simply referred to as a "non-transitory storage medium"). The gaze detection program 100 stored in the non-transitory storage medium is installed in the computer 20 of the imaging device 10, and the processor 42 executes processing in accordance with the gaze detection program 100.

Alternatively, the gaze detection program 100 may be stored in a storage device such as another computer or a server device connected to the imaging device 10 via a network, and the gaze detection program 100 may be downloaded in response to a request from the imaging device 10 and installed on the computer 20.

It is not necessary to store the entire gaze detection program 100 in a storage device such as another computer or a server device connected to the imaging device 10, or the NVM 44, and a part of the gaze detection program 100 may be stored.

Although the computer 20 is incorporated in the imaging device 10, the technology of the present disclosure is not limited thereto. For example, the computer 20 may be provided outside the imaging device 10.

Although the computer 20 including the processor 42, the NVM 44, and the RAM 46 has been shown in each of the embodiments, the technology of the present disclosure is not limited thereto. Instead of the computer 20, a device including at least one of an ASIC, an FPGA, and/or a PLD may be applied. Alternatively, a combination of a hardware configuration and a software configuration may be used instead of the computer 20.

The following various processors can be used as a hardware resource that executes the gaze detection processing described in each of the embodiments. Examples of the processor include a CPU that is a general-purpose processor functioning as a hardware resource that executes the gaze detection processing by executing software, that is, a program. Examples of the processor include a dedicated electrical circuit such as an FPGA, a PLD, or an ASIC that is a processor having a circuit configuration dedicatedly designed to execute a specific type of processing. A memory is incorporated in or connected to any processor, and any processor executes the gaze detection processing by using the memory.

The hardware resource that executes the gaze detection processing may be constituted by one of these various processors or may be constituted by a combination of two or more processors of the same type or different types (for example, a combination of a plurality of FPGAs or a combination of a CPU and an FPGA). The hardware resource that executes the gaze detection processing may be one processor.

As an example where the hardware resource is constituted by one processor, first, there is a form in which one processor is constituted by a combination of one or more CPUs and software, and the processor functions as the hardware resource that executes the gaze detection processing. Secondly, as represented by SoC, there is a form in which a processor that implements one function of all systems including a plurality of hardware resources executing the gaze detection processing with one IC chip is used. As described above, the gaze detection processing is implemented by using one or more of the above various processors as hardware resources.

As a hardware structure of these various processors, specifically, an electrical circuit in which circuit elements such as semiconductor elements are combined can be used. The above gaze detection processing is merely an example. Therefore, needless to say, unnecessary steps may be deleted, new steps may be added, or the processing order may be changed without departing from the gist of the present disclosure.

The contents of the description and the contents of the drawings are detailed descriptions for parts according to the technology of the present disclosure and are merely one example of the technology of the present disclosure. For example, the above description regarding the configuration, function, action, and effect is a description regarding an example of the configuration, function, action, and effect of the parts according to the technology of the present disclosure. Accordingly, needless to say, deletion of unnecessary parts, addition of new elements, or replacement are permitted in the contents of the description and the contents of the drawings without departing from the gist of the technology of the present disclosure. In order to avoid complication and facilitate understanding of the parts according to the technology of the present disclosure, description of common technical knowledge and the like that does not need to be described to enable implementation of the technology of the present disclosure is omitted in the contents of the description and the contents of the drawings indicated above.

In the specification, "A and/or B" has the same meaning as "at least one of A or B". That is, "A and/or B" means that only A may be included, only B may be included, or a combination of A and B may be included. In the specification, when three or more matters are expressed by "and/or" in combination, a similar concept to "A and/or B" is applied.

All the documents, patent applications, and technical standards described in the specification are herein incorporated by reference to the same extent as if each individual publication, patent application, or technical standard was specifically and individually indicated to be incorporated by reference.

What is claimed is:

1. An information processing device comprising:
   a display;
   a gaze sensor, and
   a processor,
   wherein the processor is configured to:
      acquire first image data from an imaging device,
      output, on the display, the first image data which has been captured for an eye to observe on the display,
      output a second image data to the display for the eye to observe after outputting the first image on the display, where the second image data is an achromatic image,
      acquire, from the gaze sensor, gaze data in a period in which the second image data is output to the display and the eye is watching the display, and
      detect a gaze position of the eye with respect to the display based on the gaze data.

2. The information processing device according to claim 1,
   wherein the processor is configured to not detect the gaze position in a period in which the first image data is output to the display.

3. The information processing device according to claim 1,
   wherein the gaze detection image includes an image region and an achromatic region, and
   the processor is configured to change a position of the image region and a position of the achromatic region for each frame of the gaze detection image.

4. The information processing device according to claim 3,
   wherein the processor is configured to set the position of the image region based on the gaze position for each frame of the gaze detection image.

5. The information processing device according to claim 1,
   wherein the achromatic image is an entirely black image or an entirely grey image.

6. The information processing device according to claim 1, further comprising:
   a light source that emits light to the eye that is a gaze detection target,
   wherein the processor is configured to:
      output, when an object is absent at a position through which the light passes, the second image data to the display in a state where the light is emitted from the light source, and
      output, when the object is present, the second image data to the display in a state where the emission of the light from the light source is stopped.

7. The information processing device according to claim 6,
   wherein the second image data is image data including a pattern for detecting the gaze position with respect to the display.

8. The information processing device according to claim 6,
   wherein the processor detects the gaze position based on a degree of difference between first gaze data as the gaze data acquired when the object is present and the eye is closed and second gaze data as the gaze data acquired when the object is present and the eye is open.

9. The information processing device according to claim 1,
   wherein the processor is configured to:
      detect a first gaze direction of a subject appearing in a first image indicated by the first image data, and
      acquire third image data obtained by imaging performed based on a second gaze direction corresponding to the gaze position and the first gaze direction.

10. The information processing device according to claim 9,
    wherein the processor is configured to acquire the third image data when the first gaze direction and the second gaze direction match each other.

11. The information processing device according to claim 1,
    wherein a first frame number that is a frame number of the first image data output to the display per unit time is larger than a second frame number that is a frame number of the second image data output to the display per unit time.

12. The information processing device according to claim 11,
    wherein the processor is configured to set a ratio of the first frame number and the second frame number per unit time in accordance with reliability related to a detection result of the gaze position.

13. The information processing device according to claim 1,
    wherein the processor is configured to set luminance of a third image indicated by the second image data in accordance with luminance of a second image indicated by the first image data.

14. The information processing device according to claim 1, further comprising:
    an acceleration sensor,
    wherein the processor is configured to generate orientation information related to an orientation of the information processing device based on acceleration data of the acceleration sensor and the gaze position.

15. The information processing device according to claim 14,
    wherein the processor is configured to add the orientation information to fourth image data.

16. The information processing device according to claim 1, further comprising:
a touch panel,
wherein the processor is configured to:
execute first determination processing of determining whether a left eye or a right eye is a gaze detection target based on the gaze data, and second determination processing of determining an orientation of the left eye or the right eye determined to be the gaze detection target in the first determination processing based on the gaze position, and
set a valid region and/or an invalid region of the touch panel based on a first determination result by the first determination processing and a second determination result by the second determination processing.

17. The information processing device according to claim 1,
wherein the processor is configured to:
detect a size of a pupil based on the gaze data, and
adjust brightness of the display based on a detection result of the size of the pupil.

18. The information processing device according to claim 1, wherein the information processing device is an imaging device.

19. An information processing method executed by a processor of an information processing device having a display, a gaze sensor, and the processor, the method comprising:
acquiring first image data from an imaging device;
outputting, on the display, the first image data which has been captured for an eye to observe on the display;
outputting the second image data to the display for the eye to observe after outputting the first image on the display, wherein the second image data is an achromatic image;
acquiring, from the gaze sensor, gaze data in a period in which the second image data is output to the display and the eye is watching the display; and
detecting a gaze position of the eye with respect to the display based on the gaze data.

20. A non-transitory computer-readable storage medium storing a program that causes an information processing device having a display, a gaze sensor, and a processor to execute a process by the processor comprising:
acquiring first image data from an imaging device;
outputting, on the display, the first image data which has been captured for an eye to observe on the display;
outputting the second image data to the display for the eye to observe after outputting the first image on the display, wherein the second image data is an achromatic image;
acquiring, from the gaze sensor, gaze data in a period in which the second image data is output to the display and the eye is watching the display; and
detecting a gaze position of the eye with respect to the display based on the gaze data.

* * * * *